(12) United States Patent
Ishida

(10) Patent No.: US 7,802,946 B2
(45) Date of Patent: Sep. 28, 2010

(54) THROWAWAY INSERT AND MILLING TOOL EQUIPPED WITH THE SAME

(75) Inventor: Takuya Ishida, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 453 days.

(21) Appl. No.: 11/576,337

(22) PCT Filed: Sep. 29, 2005

(86) PCT No.: PCT/JP2005/018033

§ 371 (c)(1),
(2), (4) Date: Feb. 5, 2008

(87) PCT Pub. No.: WO2006/035910

PCT Pub. Date: Apr. 6, 2006

(65) Prior Publication Data

US 2008/0260476 A1    Oct. 23, 2008

(30) Foreign Application Priority Data

| Sep. 29, 2004 | (JP) | ............................ 2004-283561 |
| Mar. 14, 2005 | (JP) | ............................ 2005-070423 |
| Mar. 31, 2005 | (JP) | ............................ 2005-104789 |
| Jul. 27, 2005 | (JP) | ............................ 2005-216862 |
| Aug. 22, 2005 | (JP) | ............................ 2005-239689 |

(51) Int. Cl.
*B23C 5/20* (2006.01)
*B26D 1/12* (2006.01)

(52) U.S. Cl. ........................................ 407/113; 407/66

(58) Field of Classification Search ......... 407/113–116, 407/66, 67
See application file for complete search history.

(56) References Cited

U.S. PATENT DOCUMENTS

| 5,192,171 A | 3/1993 | Ther et al. |
| 5,221,164 A | 6/1993 | Allaire |
| 5,282,703 A | 2/1994 | Itaba et al. |

(Continued)

FOREIGN PATENT DOCUMENTS

JP    0253305 U    4/1990

(Continued)

OTHER PUBLICATIONS

Japanese language office action and its English language translation for corresponding Japanese application No. 2005216862.

(Continued)

*Primary Examiner*—Will Fridie, Jr.
(74) *Attorney, Agent, or Firm*—Hogan Lovells US LLP

(57) ABSTRACT

A throwaway insert enabling the use of a holder for a long period and having excellent chip evacuation is provided. The throwaway insert is formed in a substantially polygonal plate shape and includes a rake face formed on an upper surface thereof, a relief face formed on a side surface thereof, a main cutting edge formed along a ridge representing an intersection of the rake face and the relief face, which is divided into a plurality of main cutting edge divisions by at least one groove formed on the relief face, and a projection formed so as to protrude from the rake face in correspondence with each of the main cutting edge divisions.

29 Claims, 24 Drawing Sheets

U.S. PATENT DOCUMENTS

| | | | |
|---|---|---|---|
| 5,791,832 A * | 8/1998 | Yamayose | 407/113 |
| 5,839,857 A * | 11/1998 | Paya | 407/114 |
| 6,328,504 B1 | 12/2001 | Kinukawa | |
| 7,182,555 B2 * | 2/2007 | Kitagawa et al. | 407/113 |
| 2008/0260476 A1 * | 10/2008 | Ishida | 407/114 |

FOREIGN PATENT DOCUMENTS

| | | | |
|---|---|---|---|
| JP | 6-091410 A | 4/1994 |
| JP | 06170613 A | 6/1994 |
| JP | 06190623 A | 7/1994 |
| JP | 07299636 A | 11/1995 |
| JP | 08-108310 A | 4/1996 |
| JP | 08118135 A | 5/1996 |
| JP | 08257822 A | 10/1996 |
| JP | 09057519 A | 3/1997 |
| JP | 2000280104 A | 10/2000 |
| JP | 2003-025135 A | 1/2003 |
| JP | 2004148424 A | 5/2004 |
| JP | 2004160620 A | 6/2004 |

OTHER PUBLICATIONS

Office Action for corresponding PCT patent application No. PCT/JP2005/018033 and its English translation list the reference above.

Japanese language office action and its English language translation for corresponding Japanese application 2005-216862 lists the reference above.

Korean Language office action and its English translation for Corresponding Korean application No. 2007-7007792.

English translation of Japanese office action for corresponding Japanese application No. 2005-216862 lists the reference above.

Chinese language office action and English language translation for corresponding Chinese application 200580033040.5 lists the reference above.

* cited by examiner

FIG. 16
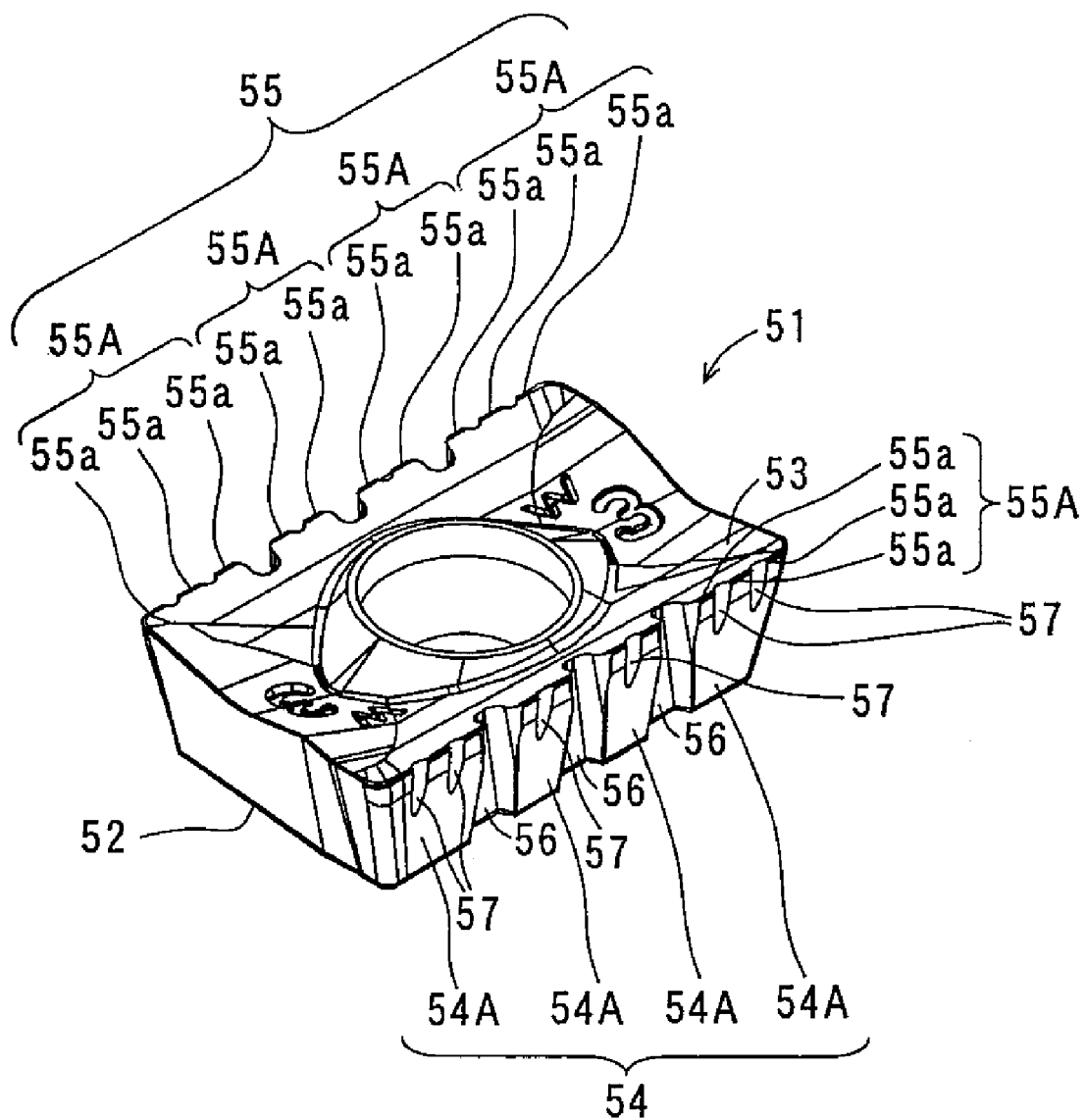
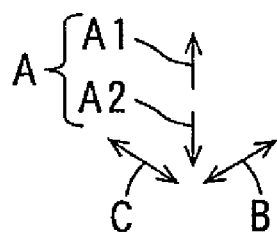

FIG.27
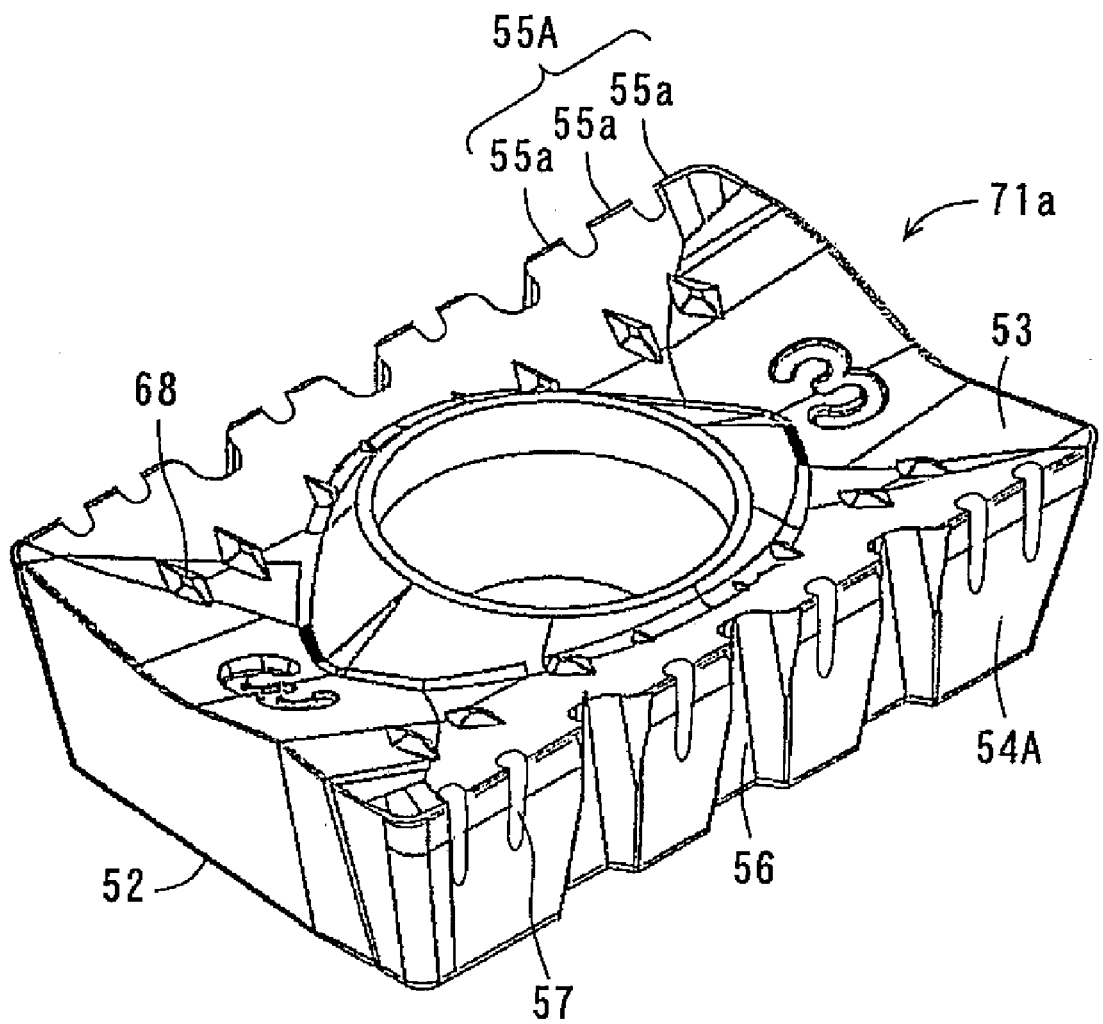
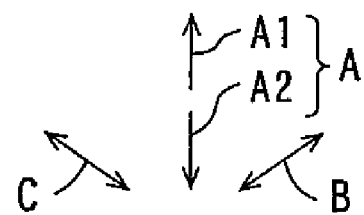

THROWAWAY INSERT AND MILLING TOOL EQUIPPED WITH THE SAME

TECHNICAL FIELD

The present invention relates to a throwaway insert designed for use in a milling tool such as a face mill and an end mill.

BACKGROUND ART

FIG. 28 is a perspective view showing a throwaway insert 101 (hereafter abbreviated as "insert 101"). FIG. 29 is a side view showing the insert 101. The insert 101 is made attachable to a holder having substantially a cylindrical shape. The holder fitted with the insert 101 is used as a milling tool for milling a workpiece. For example, the insert 101 is attached to a milling tool such as a face mill and an end mill, and especially a milling tool having a long cutting-edge length to which are attached a multiplicity of cutting edges.

There has heretofore been known the insert 101 as shown in FIG. 28. In this construction, a rake face 104 which connects to a main cutting edge 103 has a positive rake angle, and a relief face 105 and the main cutting edge 103 are divided into pieces by grooves 106 (for example, refer to Japanese Unexamined Patent Publication JP-A 7-299636 (1995)). Such an insert 101 is used mainly for a heavy cutting-adaptable milling tool. In a heavy cutting, large amounts of chips are evacuated at a single cutting operation. Moreover, the depth of cut and the feed are so high that the process needs to be carried out under strict cutting conditions, and thus the milling tool receives application of a great cutting resistance from a workpiece. In the insert 101, since the main cutting edge 103 is divided into a plurality of main cutting edge divisions 103a by the grooves 106, it follows that chips produced in the cutting are broken into pieces. This helps reduce cutting resistance and thus improve the biteability of the insert on the workpiece, wherefore chattering can be suppressed during the cutting.

FIG. 30 is a perspective view showing a milling tool 112 fitted with the prior art insert 101 shown in FIG. 28. FIG. 31 is a schematic diagram of a cross section of part of the milling tool 112 to which is attached the insert 101, illustrating how a chip 116 is produced. The chip 116 originating from the workpiece in the course of heavy cutting is large in thickness, namely cross-sectional area, and has high rigidity and is thus less prone to deformation. Therefore, the chip 116 produced by the action of the main cutting edge 103 of the milling tool 112 runs on the rake face 104 centrally of a holder 111 and then bumps against a holder wall 114 of a chip pocket 113. Next, the chip 116 is evacuated out of the chip pocket 113 through the holder wall 114 acting as a guide. In this case, however, the chip 116 comes into collision with the holder wall 114, which gives rise to a problem of friction between the holder wall 114 and the chip 116. If the workpiece is subjected to the cutting repeatedly in this situation, as the process proceeds, so the holder wall 114 of the chip pocket 113 receives wear and is eventually chipped off. The chips 116 find their way into the chipped-off region of the wall, thus causing deterioration in chip evacuation.

This problem is causative of chipping-off of the insert 101 and reduced rigidity of the holder 111, which leads to poor processing accuracy. In a heavy cutting in particular, the thicker is the chip 116, the more likely it is that the holder wall is subjected to severe abrasion. After all, quite inconveniently, the damaged holder ill will have to be replaced with the new one early.

DISCLOSURE OF INVENTION

The invention has been devised in an effort to solve the above-described problems, and accordingly its object is to provide a throwaway insert characterized by avoiding packing of chips in a chip pocket with enhanced chip evacuation, as well as to provide a milling tool fitted with the throwaway insert.

The invention provides a throwaway insert formed in substantially a plate shape comprising:

a rake face formed on one thicknesswise surface thereof;

a relief face formed on a side surface thereof;

a main cutting edge formed along a ridge representing an intersection of the rake face and the relief face, which is divided into a plurality of main cutting edge divisions; and a projection formed so as to protrude from the rake face in correspondence with each of the main cutting edge divisions.

In the invention, it is preferable that a main cutting edge-sided part of the projection is so shaped that its height diminishes gradually with approach toward the corresponding main cutting edge division.

In the invention, it is preferable that a main cutting edge-sided part of the projection is so shaped that its width diminishes gradually with approach toward the corresponding main cutting edge division.

In the invention, it is preferable that a main cutting edge-sided part of the projection is formed into such a tapered shape that its width and height diminish gradually with approach toward the corresponding main cutting edge division.

In the invention, it is preferable that a main cutting edge-sided part of the projection has two projection side surfaces, a distance between which is decreased gradually in an upward direction, and that an intersecting ridge formed at an intersection of the two projection side surfaces is so shaped that a distance to the rake face is decreased gradually with approach toward the corresponding main cutting edge division.

In the invention, it is preferable that at least one of the projections is so disposed as to extend in a direction substantially perpendicular to the main cutting edge division.

In the invention, it is preferable that at least one of the projections is pointed to a midportion of the main cutting edge division.

In the invention, it is preferable that the projection is so disposed as to lie in a substantially perpendicular bisector of the main cutting edge division.

In the invention, it is preferable that a through hole is formed substantially centrally of the rake face so as to pass through in the direction of thickness of the insert, and that an annular protuberance is formed around the through hole.

In the invention, it is preferable that the projection is so formed as to pair up with the main cutting edge division.

In the invention, it is preferable that at one corner of the rake face is formed a corner R cutting edge which connects to a corner-sided main cutting edge division located near to the corner, and that the projection formed so as to pair up with the main cutting edge division other than the corner R cutting edge-sided main cutting edge division is so disposed as to extend in a direction substantially perpendicular to the main cutting edge division.

In the invention, it is preferable that at one corner of the rake face is formed a corner R cutting edge which connects to a corner-sided main cutting edge division located near to the corner, and that the projection formed so as to pair up with the corner R cutting edge-sided main cutting edge division is so shaped that its width and height diminish gradually with approach toward the corner R cutting edge.

In the invention, it is preferable that the projection formed so as to pair up with the corner R cutting edge-sided main cutting edge division is so disposed as to extend along a virtual straight line such that an inclination angle with respect to the corner-sided main cutting edge division falls in a range of from 60° to 85°.

In the invention, it is preferable that one or more projections are formed in correspondence with each of the main cutting edge divisions.

In the invention, it is preferable that at one corner of the rake face is formed a corner R cutting edge which connects to a corner-sided main cutting edge division located near to the corner, and that the projection corresponding to the main cutting edge division other than the corner R cutting edge-sided main cutting edge division is so disposed as to extend in a direction substantially perpendicular to the main cutting edge division.

In the invention, it is preferable that at one corner of the rake face is formed a corner R cutting edge which connects to a corner-sided main cutting edge division located near to the corner, that projections are formed in correspondence with the corner R cutting edge-sided main cutting edge division, and that, of these projections, the one disposed nearest to the corner R cutting edge is so shaped that its width and height diminish gradually with approach toward the corner R cutting edge.

In the invention, it is preferable that the projection disposed nearest to the corner R cutting edge is so disposed as to extend along a virtual straight line such that an inclination angle with respect to the corner-sided main cutting edge division falls in a range of from 60° to 85°.

In the invention, it is preferable that at one corner of the rake face is formed a corner R cutting edge which connects to a corner-sided main cutting edge division located near to the corner, that projections are formed in correspondence with the corner R cutting edge-sided main cutting edge division, and that, of these projections, the one other than the projection disposed nearest to the corner R cutting edge is so disposed as to extend in a direction substantially perpendicular to the main cutting edge division.

The invention provides a throwaway insert comprising:
a rake face formed on one thicknesswise surface of a main body formed into a substantially plate shape;
a bottom surface formed on another thicknesswise surface of the main body;
a relief face formed on a side surface of the main body;
a main cutting edge formed along a ridge representing an intersection of the rake face and the relief face; and
a main groove formed on the relief face, which has its one end reached the rake face and the other end reached the bottom surface,
wherein the main cutting edge and the relief face are divided into a plurality of first main cutting edge divisions and a plurality of relief face divisions, respectively, by the main groove,
and wherein the first main cutting edge division is divided into a plurality of second main cutting edge divisions by a sub-groove which is formed on the relief face division abreast of the main groove, one end of the sub-groove being reached the rake face.

In the invention, it is preferable that the sub-groove is made smaller in width than the main groove.

In the invention, it is preferable that the length of the sub-groove is made smaller than the thickness of the main body.

In the invention, it is preferable that the sub-groove is made smaller in depth than the main groove.

In the invention, it is preferable that the sub-groove is so disposed as to divide the first main cutting edge division into substantially equal portions.

In the invention, it is preferable that the rake face has, in its several positions each facing the second main cutting edge division, at least one or more projections corresponding to the second main cutting edge division.

In the invention, it is preferable that a through hole is formed centrally of the rake face so as to pass through in the direction of thickness of the insert, and that an annular protuberance is formed around the through hole.

In the invention, it is preferable that at one corner of the rake face is formed a corner R cutting edge which connects to a corner-sided main cutting edge division located near to the corner, a bottom surface positioned opposite the rake face is placed in abutment with a holder, and that the main cutting edge division is gradually inclined in a direction away from the bottom surface with approach toward the corner R cutting edge.

The invention provides a milling tool equipped with the throwaway insert mentioned above and a holder to which are attached a plurality of the throwaway inserts.

BRIEF DESCRIPTION OF DRAWINGS

FIG. 16 is a general perspective view showing an insert in accordance with a fifth embodiment of the invention;

FIG. 27 is a general perspective view showing an insert 71a of an example of a modified form of the insert of the seventh embodiment;

BEST MODE FOR CARRYING OUT THE INVENTION

Figure 1:
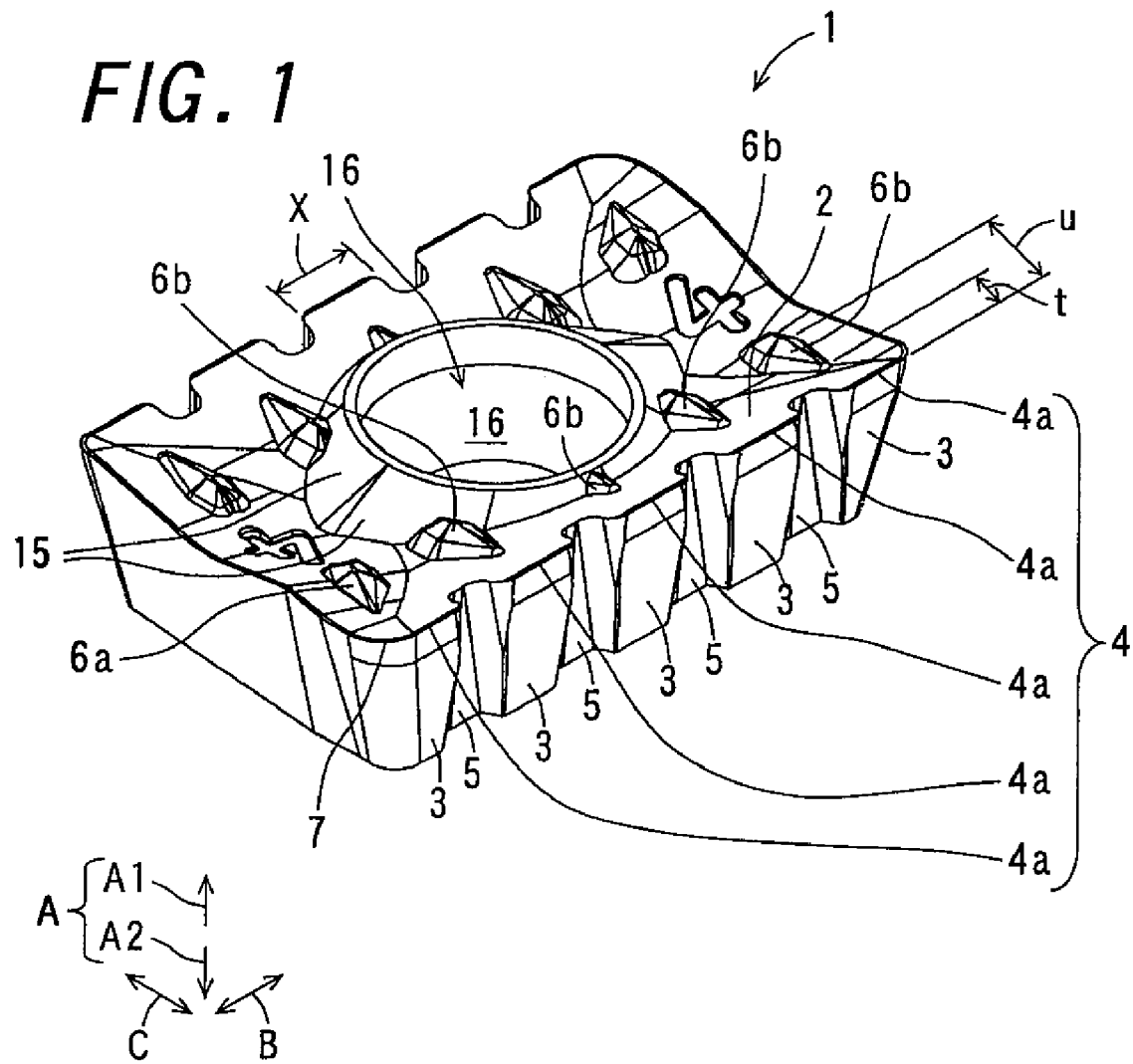
FIG. 1 is a general perspective view showing a throwaway insert 1 in accordance with a first embodiment of the invention.

Now referring to the drawings, preferred embodiments of the invention are described below.

First Embodiment

FIG. 1 through 4 are views showing a throwaway insert 1 (hereafter abbreviated as "insert 1") in accordance with a first embodiment of the invention. The insert 1 of this embodiment is formed in substantially a polygonal plate shape, to be more specific, substantially a parallelogram plate shape. A rake face 2 and a relief face 3 are formed on a top surface and a side surface, respectively, of the insert 1. Along a ridge representing the intersection of the rake face 2 and the relief face 3 is formed a main cutting edge 4 which is divided into a plurality of main cutting edge divisions 4a by one or more grooves 5 created on the relief face 3. Moreover, at one acute-angled corner of the insert 1, a corner R cutting edge 7 is formed along a ridge representing the intersection of the side surface and the rake face 2. The corner R cutting edge 7 connects to one of the main cutting edge divisions 4a nearest to the corner R cutting edge 7. Moreover, the rake face 2 has, in several positions adjacent to the individual main cutting edge divisions 4a, a projection 6 arranged face to face with the main cutting edge division 4a. In this embodiment, on the rake face 2 is formed the projection 6 so as to pair up with the main cutting edge division 4a.

The insert 1 has a cylindrical-shaped through hole 16 passed through in its thickness direction A. The through hole 16 is provided to secure the insert 1 to a holder. The through hole 16 is formed centrally of the insert 1 in both of the length direction B and the width direction C of the insert 1. The insert 1 is designed in a rotationally symmetrical manner about the axis of the through hole 16 under rotation of a 180° turn, namely under rotation of two turns. Accordingly, when projected on a virtual plane in a given direction, the outline of the insert 1 in its initial position and the outline of the insert 1 rotated 180° about the axis of the through hole 16 are identical. Since the insert 1 has a 180° rotationally symmetrical shape, there may be cases where, of the two symmetrical sections thereof, only one of them will be described and a description as to the other will be omitted.

Along the edge of the top surface, namely the edge of one thicknesswise surface of the insert 1, are formed the main cutting edge 4 extending in the length direction B and the circularly arcuate corner R cutting edge 7 which connects to one end of the main cutting edge 4. In a state in which the insert 1 is mounted in the holder, the main cutting edge 4 extends substantially in parallel with the axis of the holder and protrudes from the outer peripheral surface of the holder in a direction radially of the holder. Moreover, the corner R cutting edge 7 merging with the main cutting edge 4 is positioned in the holder's front end-sided part of the insert 1.

As seen from the foregoing, in this embodiment, the insert 1 is formed in substantially a parallelogram plate shape, and the outline thereof as projected on a plane perpendicular to the thickness direction A has substantially a parallelogram shape. Hereinafter, there may be cases where the direction of thickness of the substantially parallelogram plate shape is defined as an insert thickness direction A, the direction longitudinally of the substantially parallelogram plate shape is defined as an insert length direction B, and the direction perpendicular to both the insert thickness direction A and the insert length direction B is defined as an insert width direction C. In the insert 1, the rake face 2 is formed on the surface corresponding to one thickness direction A1, and the bottom surface conforms to the opposite surface corresponding to the other thickness direction A2. The insert 1 also has the relief face 3 formed at its end face in the insert width direction C. A ridge representing the intersection of the rake face 2 and the relief face 3 extends in the length direction B of the insert 1. Accordingly, the main cutting edge 4 formed along the intersecting ridge extends in the insert length direction B. In this embodiment, the main cutting edge 4 extends along a plane perpendicular to the insert thickness direction A. Moreover, the insert 1 is made attachable to and detachable from the holder. The insert 1 is mounted in the holder, with its bottom surface kept in abutment with a seating surface formed in the holder.

At the end of the insert 1 in the width direction C is formed the groove 5 so as to nick the widthwise end face in the insert width direction C. The groove 5 extends in the insert thickness direction A. In this embodiment, a plurality of grooves 5 are spacedly arranged side by side in the insert length direction B. The grooves 5 are each formed so as to extend from the rake face 2 to the bottom surface of the insert 1. The groove 5 is so shaped that its widthwise dimension, namely the dimension in the insert length direction B is increased gradually with approach toward the bottom surface. Moreover, the depthwise dimension of the groove 5, namely the dimension thereof in the insert width direction C, is adjusted to be greater than the maximum feed per tooth of the milling tool operating under the conditions customarily adopted in a heavy cutting. In a state in which the insert 1 is mounted in the holder, the groove 5 extends circumferentially of the holder 11 on a plane perpendicular to the rotation axis of the holder.

The main cutting edge 4 and the relief face 3 are each divided into pieces by the grooves 5 in the insert length direction B. Accordingly, the main cutting edge 4 is composed of a plurality of main cutting edge divisions 4a arranged spacedly side by side in the insert length direction B. Similarly, the relief face 3 is composed of a plurality of relief face divisions arranged spacedly side by side in the insert length direction B. In this embodiment, since the insert 1 is provided with 4 pieces of the grooves 5 arranged in the insert length direction B, it follows that the main cutting edge 4 includes 5 pieces of the main cutting edge divisions 4a and the relief face 3 includes 5 pieces of the relief face divisions. The grooves 5 are substantially identical in shape and arranged substantially equidistantly in the insert length direction B.

Moreover, in this embodiment, a plurality of projections 6 are formed on the rake face 2 so as to protrude therefrom in the insert thickness direction A. The projection 6 is so formed as to pair up with the main cutting edge division 4a in an oriented manner. The main cutting edge division-sided part of the projection 6 is tapered; that is, so shaped that its width and height diminish gradually with approach toward the corresponding main cutting edge division 4a in the insert width direction C. Herein, the height of the projection 6 refers to the dimension of the projection 6 with respect to the rake face 2 in the insert thickness direction A. Moreover, the width of the projection 6 refers to the dimension of the projection 6 in the insert length direction B.

The main cutting edge division-sided part of the projection 6 has one projection side surface formed exposedly on insert length direction B-wise one side thereof and the other projection side surface formed exposedly on insert length direction B-wise other side thereof. The two projection side surfaces are each so shaped that the insert length direction B-wise dimension diminishes gradually in one insert thickness direction A1. Moreover, the two projection side surfaces intersect each other at the one insert thickness direction A1-wise end of the main cutting edge division-sided part of the projection thereby forming an intersecting ridge. The intersecting ridge of the projection 6 formed at the intersection of the two projection side surfaces is so shaped that the distance to the rake face 2 in the insert thickness direction A is decreased gradually with approach toward the corresponding main cutting edge division 4a.

Figure 2:
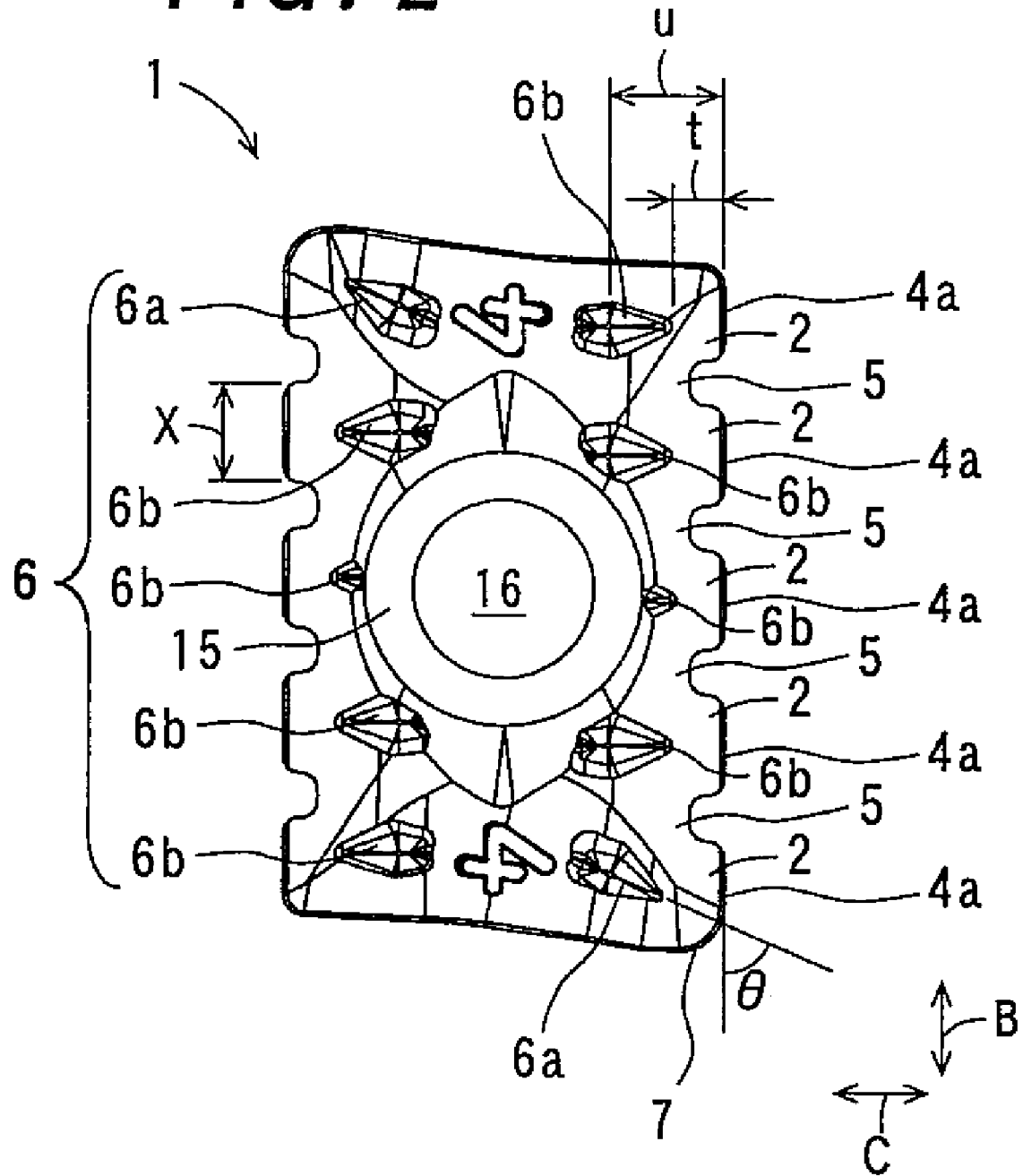
FIG. 2 is a plan view showing the insert 1.
Figure 3:
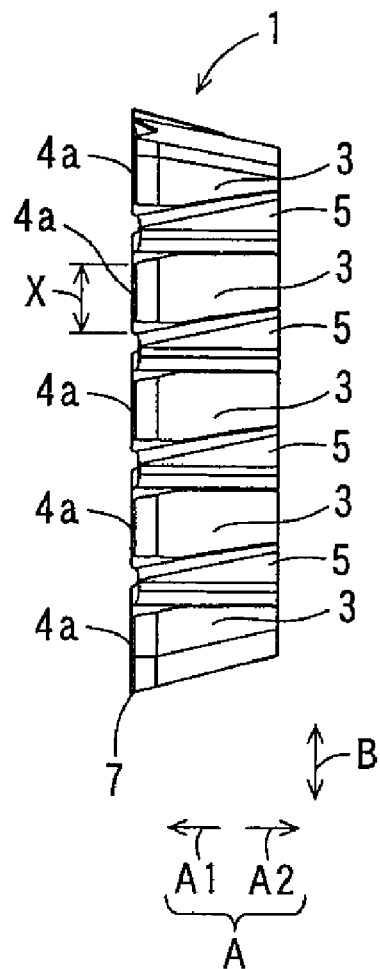
FIG. 3 is a side view of the insert 1, looking from the longer side thereof.
Figure 4:
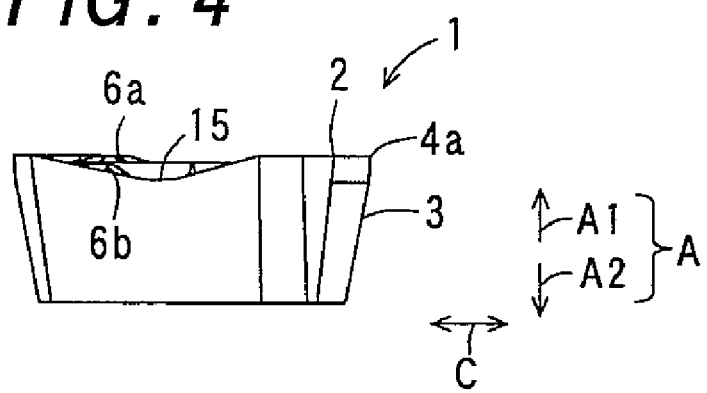
FIG. 4 is a side view of the insert 1, looking from the shorter side thereof.

As shown in FIG. 2, a distance t between the main cutting edge division 4a and the projection 6 in the insert width direction C is so adjusted as to be shortest in the midportion of the main cutting edge division 4a in the insert length direction B. Moreover, the shortest distance t between the projection 6 and its respective main cutting edge division 4a is set to fall in a range of from 0.5 mm to 5.0 mm. By setting the shortest distance t at or above 0.5 mm, even in the case of using the insert 1 for heavy cutting, it is possible to avoid occurrence of excessive impact at the time when a chip comes into collision with the projection 6. On the other hand, by setting the shortest distance t at or below 5.0 mm, it is possible to cause a chip to curve sufficiently, and thereby attain enhanced chip evacuation.

Figure 7:
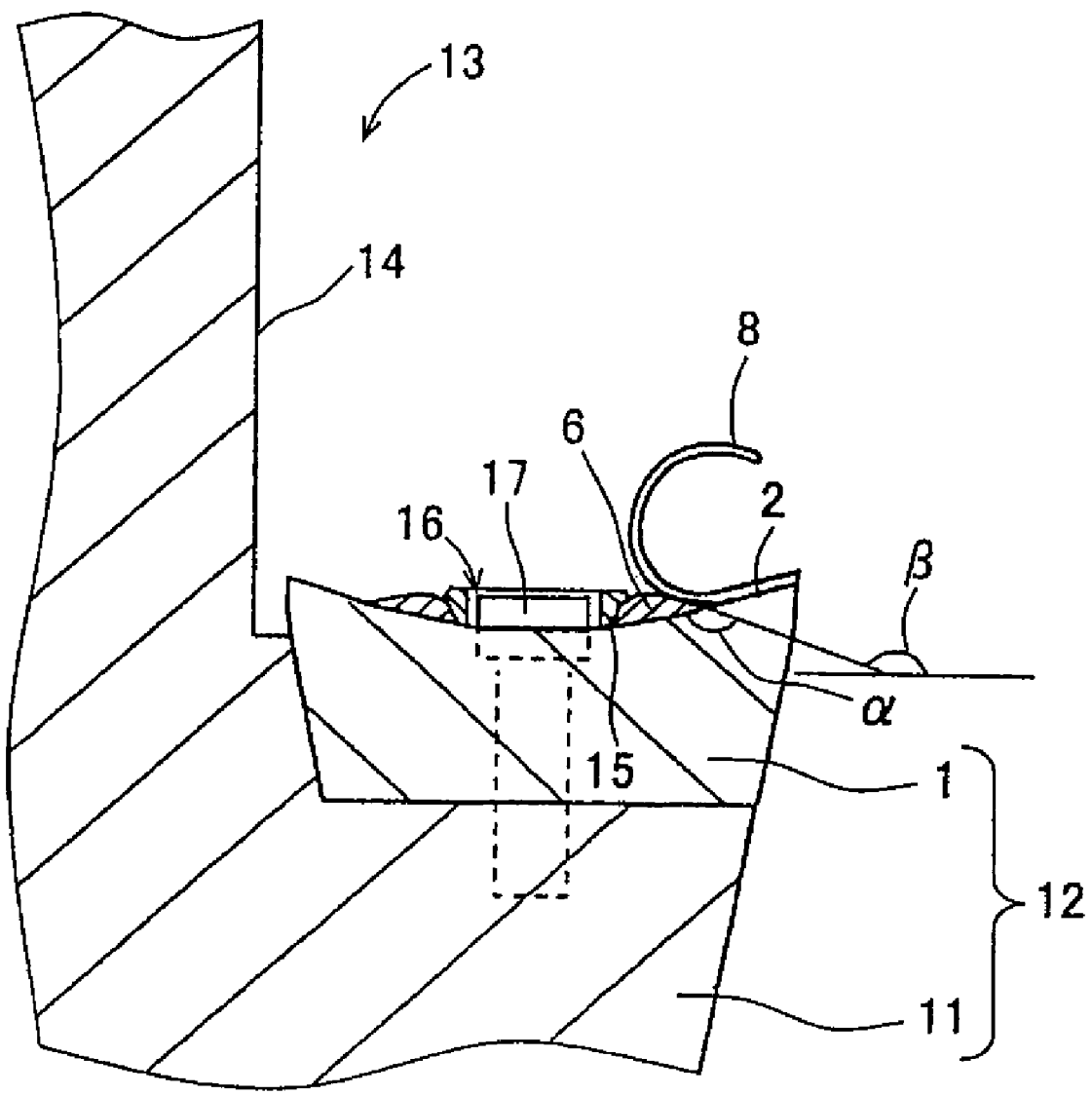
FIG. 7 is a sectional view of the milling tool 12 taken along the line S1-S1 of FIG. 6.

In this embodiment, a length X of the main cutting edge division 4a is set at 5.2 millimeters, and the shortest distance t is set at 2.3 mm. Moreover, as shown in FIG. 7 which will be explained later, a projection angle α which the rake face 2 forms with the ridge line of the projection 6 should preferably be set to fall in a range of from 90° to 170°. In this embodiment, the projection angle α is selected as approximately 165°. If the projection angle α is set to be smaller than 90°, chips tend to cause clogging. On the other hand, if the projection angle α exceeds 170°, a chip remains straight without being curvedly deformed; In this embodiment, by selecting the projection angle α as approximately 165°, it is possible to allow chips to curve smoothly without causing clogging.

Moreover, an angle β which the ridge line of the projection 6 forms with the bottom surface is selected as approximately 150°, and a distance u between the main cutting edge division 4a and the vertex of the projection 6 is selected as 3.0 mm. Thus, the height and width of the projection 6 and the distance from the main cutting edge division to the front end of the projection are deemed to be important factors in terms of configuration of the projection 6. For example, the maximum width of the projection 6 is set to be smaller than the length X of the main cutting edge division 4a.

Of the projections 6, the one corresponding to the main cutting edge division 4a connects to the corner R cutting edge 7 is defined as a corner R projection 6a, and all other projections 6 than the corner R projection 6a are each defined as an orthogonal projection 6b. The orthogonal projection 6b is so disposed as to lie in the substantially perpendicular bisector of its respective main cutting edge division 4a. That is, the orthogonal projection 6b is pointed to substantially the center of its respective main cutting edge division 4a in the lengthwise direction and extends along a virtual straight line perpendicular to the main cutting edge division 4a. Expressed differently, the ridge line of the orthogonal projection 6b lies in the perpendicular bisector of the corresponding main cutting edge division 4a. Moreover, the main cutting edge division-sided front ends of the orthogonal projections 6b are substantially identical in shape. Herein, the perpendicular bisector of the main cutting edge division 4a refers to a straight line which divides the main cutting edge division 4a into two equal portions in the insert length direction B and extends perpendicularly with respect to the main cutting edge division 4a.

The corner R projection 6a is so shaped that its width and height diminish gradually with approach toward the corner R cutting edge 7. In other words, in the corner R projection 6a as viewed from the top of the insert, an inclination angle θ which the ridge line of the intersecting ridge forms with the main cutting edge division is less than 90°. Moreover, it is preferable that the corner R projection 6a is so disposed that its ridge line extends along a virtual straight line such that the inclination angle θ with respect to the main cutting edge division 4a as viewed from the top of the insert falls in a range of from 60° to 85°. In this embodiment, the inclination angle θ is set at 65°.

The rake face 2 also has an island-like portion, to be more specific, an annular protuberance 15 formed around the through hole 16 created centrally thereof. The protuberance 15 protruding from the rake face 2 in one insert thickness direction A1 is so shaped that its width and height diminish gradually with approach toward the main cutting edge 4. The height of the protuberance 15 refers to the dimension of the protuberance 15 with respect to the rake face 2 in the insert thickness direction A. Moreover, the width of the protuberance 15 refers to the dimension of the protuberance 15 in the insert length direction B. The protuberance 15 is formed more centrally of the insert in the insert width direction C than the main cutting edge division-sided part of the projection 6. Moreover, in a state in which the insert 1 is attached to the mounting portion of the holder with a screw member 17, the protuberance 15 protrudes beyond the head of the screw member 17 in the insert thickness direction A. In this embodiment, of the projections 6 formed in the insert 1, the one arranged in the midportion of the insert in the insert length direction unites with the protuberance 15. The intersecting ridge of the projection 6 united with the protuberance 15 smoothly with one thicknesswise end of the protuberance. By forming the projection 6 united with the protuberance 15, it is possible to avoid chipping-off of the projection 6.

In a state in which the bottom surface of the insert 1 is kept in abutment with the seating surface formed in the holder, the through hole 16 formed in the insert 1 and a cylindrical-shaped attachment hole formed in the mounting portion of the holder are disposed in substantially coaxial relation. In this state, the screw member 17 having an exterior screw is inserted into the through hole 16 of the insert 1 so as to be threadedly engaged with the attachment hole of the holder thereby fastening the insert 1 to the mounting portion of the holder. In this way, the attachment of the insert 1 to the mounting portion of the holder is completed.

At the front end of the holder is formed a concavity so as to hollow the outer peripheral surface and the axial end face of the holder. The concavity is provided to form an insert setting space for setting the insert 1 and also a chip pocket for temporarily accommodating chips originating from a workpiece. The insert housing space and the chip pocket are arranged side by side in a direction circumferentially of the holder.

Figure 5:
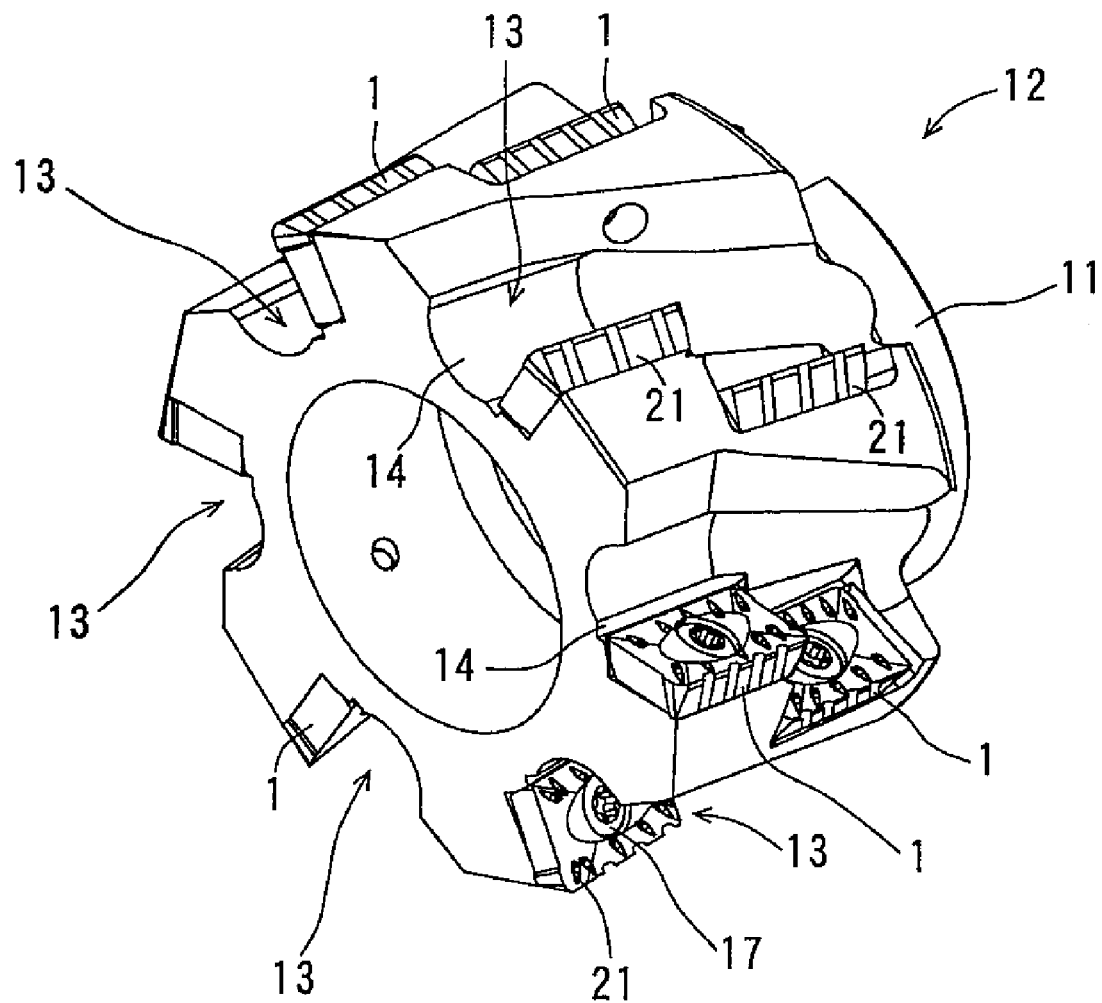
FIG. 5 is a general perspective view showing a milling tool 12 employing the insert 1, 21 of the invention.
Figure 6:
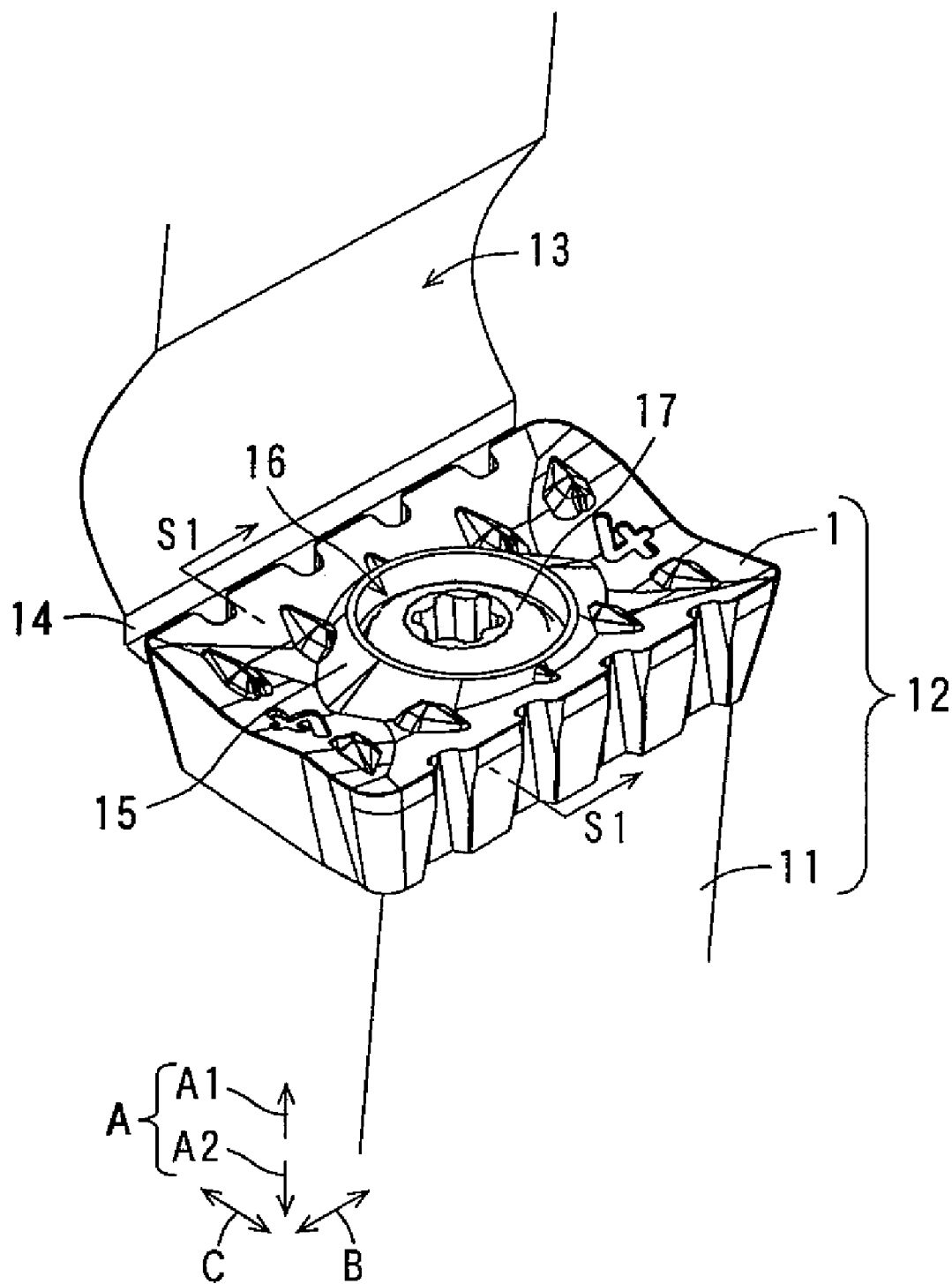
FIG. 6 is an enlarged perspective view showing the milling tool 12 of the invention fitted with the insert.

FIG. 5 through 7 are views showing a milling tool 12 employing the insert (1, 21) of the invention. The milling tool 12 is composed of the insert 1 and the substantially cylindrical-shaped holder 11 to which is detachably attached the insert 1. In this embodiment, the holder 11 is designed to receive, at its outer periphery, attachment of a plurality of, for example 6 pieces of inserts 1 which are spacedly arranged side by side in a direction circumferentially of the holder. Moreover, in this embodiment in which a combination of a plurality of circumferentially-aligned inserts 1 is fitted in the holder 11, there are provided a plurality of, for example, 2 arrays of the combinations in a direction axially of the holder. The milling tool 12 such as suggested herein is used for a heavy cutting, in other words a rough cutting, in which the depth of cut per revolution of a single insert 1 is large.

The holder 11 has formed at its axial base end a to-be-held portion for permitting the holder 11 to be retained in a milling machine via an arbor acting as a connecting member. Moreover, the holder 11 has formed at its axial front end the mounting portion for mounting the insert 1 in such a way that the main cutting edge is kept projected from the outer peripheral surface of the holder. The milling machine includes movably driving means for effecting relative movement between the workpiece in a clamped state and the milling tool 12 retained therein and rotatably driving means for driving the retained milling tool 12 to rotate about the axis of the holder 11. The milling tool 12 is rotated about the axis of the holder 11 while making contact with the workpiece, during which period the workpiece is subjected to interrupted cutting by the main cutting edge 4, of the insert 1. In this way, the workpiece can be machined to a predetermined shape. With use of the milling tool 12, it is possible to perform, for example, a shoulder milling, a groove milling, or a ramp or butt milling on the workpiece. When the main cutting edge 4 of the insert 1 receives wear and is eventually chipped off, the insert 1 is detached from the milling tool and rotated 180° about the axis of the attachment hole created in the holder 11, whereupon the insert 1 is ready for reattachment. Alternatively, the insert 1 can simply be replaced with the new one. A recovery in the cutting performance of the milling tool 12 can be achieved in that way.

As has already been described, a plurality of chip pockets 13 are formed along the front end of the outer periphery of the holder 11. In adjacent to the chip pocket 13 is present the insert setting space in which is mounted the insert 1. More specifically, the insert 1 is so mounted that the rake face 2 points in the direction of rotation and the main cutting edge 4 faces outermost. The main cutting edge 4 is rotated together with the holder 11 to effect cutting.

In the milling tool 12 thus constructed, a chip 16 produced by the action of the main cutting edge 4, or to be exact the main cutting edge division 4a, runs on the rake face 2 of the insert 1 from the outer periphery toward the center of the holder 11, namely toward a holder wall 14 within the chip pocket 13.

Figure 31:
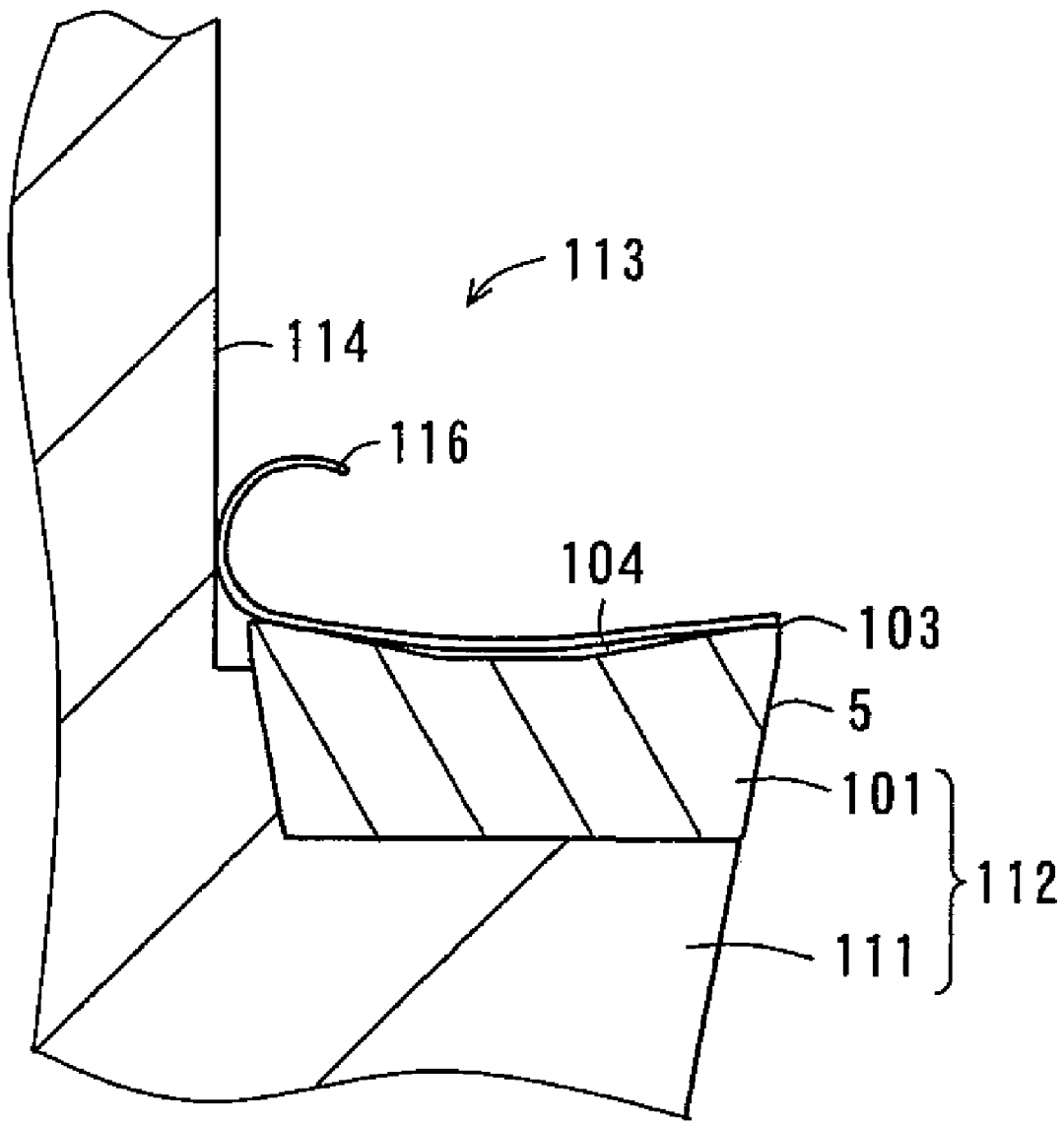
FIG. 31 is a schematic diagram of a cross section of part of the milling tool 112 to which is attached the insert 101, illustrating how a chip 116 is produced.

As shown in FIG. 31, according to the construction employing the insert 101, the produced chip 116 is moved just in the direction in which it is produced and then bumps against the holder wall 114 disposed ahead, thus causing curling of the chip. In this case, the holder wall 114 is gradually worn away by friction with the chip 116.

By way of contrast, as shown in FIG. 7, according to the insert 1 of the first embodiment of the invention, the projection 6 is formed on the rake face 2 so as to adjoin the main cutting edge division 4a. In this case, the narrow chip 8 produced by the action of the main cutting edge division 4a comes into collision with the projection 6, thus giving small curl to the chip B. As a result, the chip 8 is evacuated to the outside without abutting against the holder wall 14. This construction helps protect the holder wall 14 within the chip pocket 13 from abrasion, and consequently the life of the holder 11 can be prolonged. As another advantage, since the chip 8 can be made smaller in curl diameter and thus in size, it is possible to ensure smooth discharge of the chip from the chip pocket 13 to the outside. Accordingly, the insert 1 itself enjoys a longer life without suffering from chipping-off or the like problem caused by biting of the chip into the main cutting edge 4.

Moreover, in this embodiment, as shown in FIGS. 1 and 2, the main cutting edge-sided part of the projection 6 is so shaped that its width and height diminish gradually with approach toward the corresponding main cutting edge division 4a. Correspondingly, the ridge portion of the projection 6 which makes contact with the chip 8 is so shaped that its height diminishes gradually with approach toward the main cutting edge division 4a, in other words, the ridge portion of the projection 6 is so shaped that its height increases gradually with distance from the main cutting edge division 4a. This makes it possible to achieve smooth contact between the projection 6 and the chip 8, and thereby avoid an undesired increase in cutting resistance. Moreover, the projection 6 is so shaped that its width increases gradually with distance from the main cutting edge division 4a. With such a broad configuration, the projection 6 exhibits higher strength and is thus resistant to chipping-off caused by a collision with the chip. This renders possible the long-term use of the insert 1. Further, since the projections 6 are arranged spacedly side by side in the insert length direction B, it follows that the chip 8 produced by the action of the main cutting edge division 4a is guidedly abutted against only a single projection 6. In this case, in contrast to the case where the chip 8 is guidedly abutted against a plurality of projections 6 all at once, the projection 6-induced cutting resistance can be reduced successfully. In addition, even if the projection 6 is worn away by friction with the chip 8, or there arises some deviation from the direction in which the chip 8 is produced, the chip 8 is allowed to make contact with the ridge portion of a single, corresponding projection 6.

Moreover, as shown in FIG. 2, the distance t between the main cutting edge division 4a and the projection 6 is so adjusted as to be shortest in substantially the center of the length X of the main cutting edge division 4a. This allows the chip 8 produced by the action of the main cutting edge division 4a to make contact with the projection 6 at its substantially midportion in the insert length direction B. Accordingly, the chip 8 can be curled in a predetermined direction without wobbling from side to side, wherefore excellent chip evacuation can be attained.

Moreover, regarding at least one of the projections 6, to be specific the orthogonal projection 6b other than the corner R projection 6a, the ridge line of the main cutting edge-sided part thereof and the corresponding main cutting edge division 4a are disposed in substantially perpendicular relation to each other as viewed from the top of the insert. The chip 8 produced by the action of each of the main cutting edge divisions 4a arranged face to face with the projections except for the corner R projection 6a, namely the orthogonal projections 6b, respectively, runs in a direction substantially perpendicular to the corresponding main cutting edge division 4a. In this case, since the orthogonal projection 6b is so disposed as to extend in a direction substantially perpendicular to the main cutting edge division 4a, it is possible to reduce the cutting resistance generated between the chip 3 moving on the rake face 2 and the orthogonal projection 6b, as well as to maintain the chip 8's running momentum thereby curling the chip 8 in a predetermined direction in the most efficient manner.

Moreover, with regard to the insert length direction B, the orthogonal projection 6b is pointed to the midportion of the corresponding main cutting edge division 4a. Expressed differently, the orthogonal projection 6b is pointed to the lengthwise midportion of the corresponding main cutting edge division 4a. The chip 8 produced by the action of the main cutting edge division 4a has substantially the same width as that of the main cutting edge division 4a. In this case, the orthogonal projection 6b makes contact with the widthwise midportion of the chip 8. Accordingly, the chip 8 can be guided by the orthogonal projection 6b in a direction substantially perpendicular to the main cutting edge division 4a without wobbling from side to side. As another advantage, a plurality of chips 8 that have been produced by the actions of the individual main cutting edge divisions 4a can be kept out of contact with one another thereby avoiding packing of the chips 8 in the chip pocket 13.

Moreover, as will be explained later, in the case of a cutting with use of the holder 11 having mounted therein two types of inserts that differ from each other in placement position of the main cutting edge divisions 4a, that part of the chip 8 which corresponds to the midportion of the main cutting edge division 4a is larger in cross-sectional area. In this embodiment, since the projection 6 is pointed to the midportion of the main cutting edge division 4a, it is possible for that part of the chip 8 which has a larger cross-sectional area to abut against the projection 6, wherefore the chip 8 can be guided more smoothly. Accordingly, the chip 8 can be curvedly deformed with lesser projection 6-induced cutting resistance.

Moreover, according to the invention, the projection 6 is so formed as to pair up with the main cutting edge division 4a. That is, a single projection 6 is assigned to each of the main cutting edge divisions 4a. Accordingly, the chip 8 produced by the action of the main cutting edge division 4a is guidedly abutted against only a single projection 6. In this case, in contrast to the case where the chip 8 is guidedly abutted against a plurality of projections 6 all at once, the projection 6-induced cutting resistance can be reduced successfully.

Moreover, since the corner R cutting edge-sided main cutting edge division 4a connects to the corner R cutting edge 7, it follows that the chip 8 produced by the action of the corner R cutting edge-sided main cutting edge division 4a connects to the chip 8 produced by the action of the corner R cutting edge 7 in the shape of circular arc. The circularly arcuate chip 8 is moved on the rake face 2 with inclination with reference to the main cutting edge division 4a. As has already been described, the corner R projection 6a is so shaped that its width and height diminish gradually with approach toward the corner R cutting edge 7. In this case, the chip 8 produced by the action of the corner R cutting edge 7, the section of which is partly circularly arcuate shaped, can be curled in a predetermined direction in the most efficient manner. As another advantage, since the chip 8 produced by the action of the corner R cutting edge 7 as well as the main cutting edge division 4a connecting is smoothly abutted against the corner R projection 6a, it is possible to reduce the corner R projection 6a-induced cutting resistance.

Moreover, it is preferable that, when viewed from the top of the insert, the inclination angle θ which the ridge line of the corner R projection 6a forms with the main cutting edge division 4a falls in a range of from 60° to 85° from the standpoint of giving small curl to the chip 8 produced by the action of the corner R cutting edge 7 more reliably. If the inclination angle θ is less than 60°, packing of the chips 8 tends to occur, which could lead to an undesired increase in the projection-induced cutting resistance. On the other hand, if the inclination angle θ is greater than 85°, the chip 8 cannot be easy to be curled readily, which could lead not only to a failure of protecting the holder wall 14 from abrasion but also to deterioration in chip evacuation due to the size of the chip 8 being oversize. There is also a possibility of occurrence of chipping-off of the cutting edge caused by biting of the chip 8.

In this embodiment, the inclination angle θ which the ridge line of the corner R projection 6a forms with the main cutting edge division is set to fall in a range of from 60° to 85°, to be more specific, set at 65° to avoid the above-described problems. Accordingly, the chip 8 produced by the action of the corner R cutting edge 7 as well as the main cutting edge division 4a connecting can be curvedly deformed more reliably with lesser corner R projection 6a-induced cutting resistance.

Moreover, around the through hole 16 created centrally of the rake face 2 is formed the island-like portion, to be specific the annular protuberance 15. In this case, the chip 8 can be curled properly without fail even under the condition that the projection 6 fails to give curl to the chip 8 satisfactorily. As shown in FIGS. 6 and 7, in a state in which the insert 1 is mounted in the holder 11, the head of the screw member 17 for clamping is hidden behind the annular protuberance 15; that is, the head of the screw member 17 is located below the top of the annular protuberance 15. This helps protect the head of the screw member 17 from abrasion caused by a collision with the chip 8. Moreover, since the groove 5 is so shaped that its width increases gradually in the other insert thickness direction A2, it is possible to avoid abutting of part of the workpiece left unmachined against the wall surface of the groove 5, and thus reduce the grooves 5-induced cutting resistance.

As described hereinabove, according to this embodiment, the narrow chip 8 produced by the action of the main cutting edge division 4a is brought into contact with the projection (6a, 6b) formed on the rake face 2, whereupon the chip 8 is curvedly deformed while its radius of curvature is decreased. The chip 8 undergoes rupture before making contact with the holder wall 14 formed in the holder 11 and then moves out of the chip pocket 13. Accordingly, the holder wall 14 can be protected from damage resulting from a collision with the chip 8. Moreover, since the holder 11 is free from a decline in rigidity, it is difficult that a machining operation has a high quality surface finish. Further, by virtue of the holder 11 having a life long enough to withstand long-term use, it is possible to realize the insert 1 which is excellent in cost/performance ratio and also the milling tool 12 in which is mounted the insert 1.

Moreover, when the chip 8 is brought into contact with the projection 6, its radius of curvature is decreased, and correspondingly the size of the chip 8 is reduced. The small-sized chip 8 in the chip pocket 13 is able to move smoothly out of the holder thereby attaining enhanced chip evacuation. Accordingly, occurrence of problems such as packing of the chips 8 in the chip pocket 13 and biting of the chips 8 can be decreased. Moreover, since the chip 8 is narrowed by the main cutting edge division 4a before coming into collision with the projection 6, it is possible to avoid an undesired increase in the cutting resistance caused by the projection 6 at the time of collision. Accordingly, a cutting can be carried out smoothly, and also chipping-off of the projection 6 can be decreased even under a heavy cutting. For example, in the case of using the insert of the present embodiment, the expected chip evacuation, namely the volumetric rate at which the workpiece is machined per minute, will be given as: 1000 cc/min.

Second Embodiment

Figure 8:
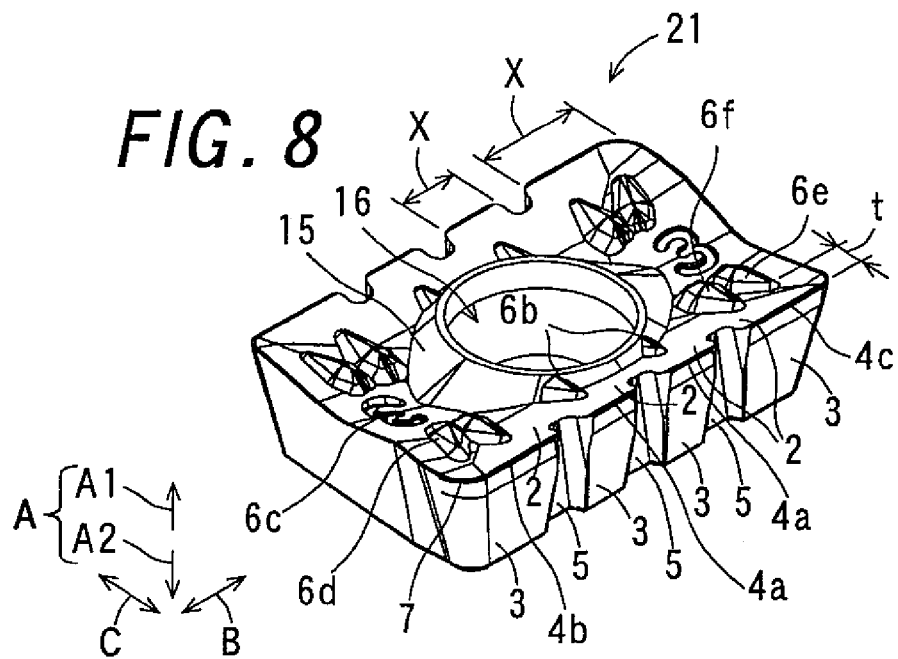
FIG. 8 is a general perspective view showing an insert 21 in accordance with a second embodiment of the invention.
Figure 9:
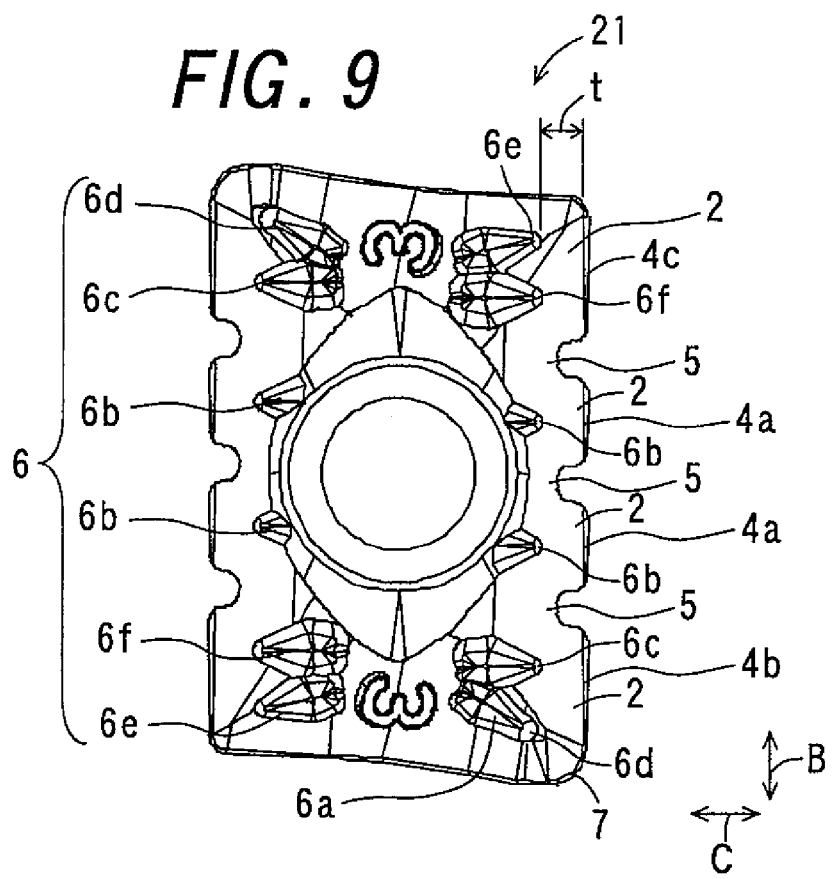
FIG. 9 is a plan view showing the insert 21.

FIGS. 8 and 9 are views showing an insert 21 in accordance with a second embodiment of the invention. In the insert 1 of the first embodiment of the invention as shown in FIG. 1, the main cutting edge 4 is divided into five main cutting edge divisions 4a by four grooves 5. On the other hand, in the insert 21 of the second embodiment of the invention, as shown in FIG. 8, the main cutting edge 4 is divided into four main cutting edge divisions 4a by three grooves 5. Such an insert as differs from the insert of the first embodiment in the number and arrangement of the grooves 5 is intended as within the scope of the invention, as a matter of course.

In the inserts 1 and 21 of the first and second embodiments, respectively, of the invention in each of which the grooves 5 are created in the main cutting edge 4, the grooves 5 are not responsible for a cutting. Therefore, in the case of using the holder 11 to which are attached a plurality of inserts of the same type, part of a machined wall surface of a workpiece will be left unmachined. In this regard, the first insert 1 exemplified as the first embodiment and the second insert 21 exemplified as the second embodiment, namely the inserts (1, 21) that differ from each other in the positioning of the grooves 5, are arranged in an alternating manner on a common circumferential surface of the holder 11. Thereby, even if a part of the machined wall surface of the workpiece is left unmachined following the completion of a cutting effected by the first insert 1 owing to the grooves 5, the main cutting edge divisions 4a of the second insert 21 deal with this yet-to-be machined region, in consequence whereof there results no incompleteness in cutting which is ascribable to the grooves 5. This helps decrease occurrence of difference in level on the entire machined wall surface of the workpiece after the cutting. FIG. 5 shows the milling tool 12 in which the insert 1 of the first embodiment and the insert 21 of the second embodiment are arranged circumferentially in an alternating manner.

Next, the insert 21 of the second embodiment of the invention will be explained with reference to FIGS. 8 and 9. Note that the components that play the same or corresponding roles as in the insert 1 of the first embodiment shown in FIG. 1 will be identified with the same reference symbols, and overlapping descriptions will be omitted. The insert 21 of the second embodiment differs from the insert 1 of the first embodiment shown in FIG. 1 in the positioning of the grooves 5. This makes it possible to cope with incompleteness in cutting which is ascribable to the grooves 5 of the insert 1 of the first embodiment.

Moreover, in the insert 21, the main cutting edge divisions 4a and 4b and 4c differ from each other in length. Depending on the length of the main cutting edge division (4a to 4c), the number of the projection 6 to be assigned thereto is varied; that is, a larger number of the projections 6 are assigned to the main cutting edge division of longer length. Bay doing so, even if a chip of wider width is produced by the action of the long main cutting edge division (4b, 4c) for performing cutting on part of the machined wall surface of the workpiece left unmachined following the completion of a cutting effected by the insert 1 of the first embodiment, the chip can be curled properly without fail.

Expressed differently, the insert 21 of the second embodiment is provided with a plurality of main cutting edge divisions 4a through 4c, of which the main cutting edge divisions 4b and 4c are made larger in length, whereas the main cutting edge division 4a is made smaller in length. The short main cutting edge division 4a corresponds to the projection 6b. The long main cutting edge division 4b corresponds to the projections 6c and 6d. Another long main cutting edge division 4c corresponds to the projections 6e and 6f. That is, the long main cutting edge division is brought into correspondence with a larger number of the projections compared to the short main cutting edge division. In this way, the number of the projection corresponding to the main cutting edge division (4a to 4c) may be increased according to the length of its respective main cutting edge division. This allows the chip 8 of wider width produced by the action of the long main cutting edge division (4b, 4c) to be curvedly deformed more reliably. In addition, the projections 6c and 6d corresponding to the long main cutting edge division 4b are avoided being chipped off due to a collision with the chip 8 of wider width, and so are the projections 6e and 6f corresponding to another long main cutting edge division 4c.

In this embodiment, a plurality of projections 6b through 6f are formed on the rake face 2 so as to protrude therefrom in the insert thickness direction A. The projection (6b to 6f) is formed in correspondence with the main cutting edge division (4a to 4c). One or more projections are disposed for the corresponding main cutting edge division in an oriented manner. Moreover, the main cutting edge division-sided part of the projection 6 is tapered; that is, so shaped that its width and height diminish gradually with approach toward the corresponding main cutting edge division (4a to 4c) in the insert width direction B.

The main cutting edge division-sided part of the projection 6 has one projection side surface formed exposedly on insert length direction B-wise one side thereof and the other projection side surface formed exposedly on insert length direction B-wise other side thereof. Each of the two mutually opposed projection side surfaces is so shaped that its insert length direction B-wise dimension diminishes gradually in one insert thickness direction A1. Moreover, the two projection side surfaces intersect each other at insert thickness direction-wise one end of the main cutting edge division-sided part of the projection thereby forming an intersecting ridge. The intersecting ridge of the projection 6 formed at the intersection of the two projection side surfaces is so shaped that the distance to the rake face 2 in the insert thickness direction A is decreased gradually with approach toward the corresponding main cutting edge division (4a to 4c). Moreover, as shown in FIGS. 8 and 9, the distance t between the main cutting edge division (4a to 4c) and the projection 6 in the insert width direction is so adjusted as to be shortest in substantially the center of the main cutting edge division 4a in the insert length direction. Further, the maximum width of the projection (6b to 6f) is set to be smaller than the insert length direction B-wise dimension of the corresponding main cutting edge division (4a to 4c).

The first corner-sided main cutting edge division 4b connecting to the corner R cutting edge 7 and the second corner-sided main cutting edge division 4c positioned opposite the corner R cutting edge 7 are made larger in insert length direction-wise dimension than others, namely the main cutting edge divisions 4a. Moreover, two projections 6c and 6d are disposed in correspondence with the first corner-sided main cutting edge division 4b. Similarly, two projections 6e and 6f are disposed in correspondence with the second corner-sided main cutting edge division 4c. Accordingly, the first and second corner-sided main cutting edge divisions 4b and 4c face a pair of projections 6c and 6d and a pair of projections 6e and 6f, respectively.

Of a plurality of projections 6c and 6d disposed in correspondence with the first corner-sided main cutting edge division 4b, the one disposed nearest to the corner R cutting edge 7 is defined as the first projection 6d, whereas the other projection than the first projection 6d is defined as the second projection 6c. The first projection 6d is so shaped that its width and height diminish gradually with approach toward the corner R cutting edge 7. In other words, in the first projection 6d as viewed from the top of the insert, an inclination angle $\theta$ which the ridge line of the intersecting ridge forms with the main cutting edge division 4b is less than 90°. It is preferable that the inclination angle $\theta$ falls in a range of from 60° to 85°. In this embodiment, the inclination angle $\theta$ is set at 65°. Moreover, the second projection 6c is disposed with its ridge line extending substantially perpendicularly with respect to the first corner-sided main cutting edge division 4b. A plurality of projections 6c and 6d disposed in correspondence with the first corner-sided main cutting edge division 4b are so arranged that their insert width direction C-wise front ends are substantially symmetrically located with respect to the perpendicular bisector of the first corner-sided main cutting edge division 4b.

Moreover, a plurality of projections 6 disposed in correspondence with the second corner-sided main cutting edge division 4c are defined as the third projections 6f and 6e. Each of the third projections 6f and 6e is disposed face to face with the second corner-sided main cutting edge division 4c, with its ridge line extending substantially perpendicularly with respect to the second corner-sided main cutting edge division 4c. A plurality of projections 6e and 6f disposed in correspondence with the second corner-sided main cutting edge division 4c are so arranged that their insert width direction C-wise front ends are substantially symmetrically located with respect to the perpendicular bisector of the second corner-sided main cutting edge division 4c. Moreover, the projection 6 corresponding to the main cutting edge division 4a other than the corner-sided main cutting edge divisions 4b and 4c is defined as the fourth projection 6b. Each of the fourth projections 6b is pointed to the midportion of its respective main cutting edge division 4a in the insert length direction, with its ridge line extending substantially perpendicularly with respect to the main cutting edge division 4a. That is, each of the fourth projections 6b is so disposed as to extend along the perpendicular bisector of its respective main cutting edge division 4a.

The first projection 6d arranged nearest to the corner R cutting edge 7 is inclined relative to the first corner-sided main cutting edge division 4b. In this case, the chip 8 of wider width, the sectional profile of which is composed of a straight line segment and a circularly arcuate segment, produced by the action of the first corner-sided main cutting edge division 4b connecting to the corner R cutting edge 7 as well as the corner R cutting edge 7 can be curvedly deformed in the most efficient manner. More specifically, of the section of the chip 8, the circularly arcuate segment is curved by the first projection 6d, whereas the straight line segment is curved by the second projection 6c other than the first projection 6d.

Further, at one of both ends of the main cutting edge 4 positioned opposite the corner R cutting edge 7 are disposed two projections 6e and 6f in correspondence with the second corner-sided main cutting edge division 4c. However, since the corner positioned opposite the corner having the corner R cutting edge 7 is not responsible for a cutting, it follows that a chip produced by the action of the second corner-sided main cutting edge division 4c is substantially rectilinear in cross section and free of any circularly arcuate segment. Therefore, the third projection (6e, 6f) corresponding to the second corner-sided main cutting edge division is so disposed that the main cutting edge division-sided ridge line and the second corner-sided main cutting edge division 4c are disposed in substantially perpendicular relation to each other. Thereby, the produced chip 8 of wider width can be curled in a predetermined direction more reliably without wobbling from side to side.

As described hereinabove, according to the present embodiment, one or more projections 6 are formed in correspondence with each of the main cutting edge divisions. In this case, the chip 8 is abutted against a single or a plurality of projections (6b to 6f) and it can thereupon be curvedly deformed. Since there are provided a plurality of projections 6 against which the chip 8 is abutted thereby to cause curved deformation, even if the chip 8 is large in cross-sectional area and is high in rigidity, an impactive force exerted by such a chip 8 can be distributed among a plurality of projections 6. This helps decrease chipping-off of the projection 8, wherefore the chip 8 can be curvedly deformed satisfactorily.

In the case where, just like this embodiment, a plurality of main cutting edge divisions are classified into two groups: long length of main cutting edge divisions and short length of main cutting edge divisions, by setting the number of the projection (6c, 6d; 6e, 6f) corresponding to the long main cutting edge division (4b, 4c) to be larger than the number of the projection (6b) corresponding to the short main cutting edge division (4a), it is possible for the chip of wider width produced by the action of the long main cutting edge division (4b, 4c) to be curvedly deformed more reliably. Moreover, the projection (6c, 6d; 6e, 6f) corresponding to the long main cutting edge division (4b, 4c) can be avoided being chipped off due to a collision with the chip 8 of wider width. Further, since an undesired increase in the number of the projection 6 corresponding to the short main cutting edge division 4a can be avoided, it is possible to reduce the projection-induced cutting resistance.

the chip produced by the action of the main cutting edge division (4a, 4c) other than the corner R cutting edge 7-sided main cutting edge division (4b) is moved in a direction substantially perpendicular to the corresponding main cutting edge division (4a, 4c). In this embodiment, apart from the corner R cutting edge 7-sided main cutting edge division 4b, the projection 6b corresponding to the main cutting edge division 4a and the projections 6e and 6f corresponding to the main cutting edge division 4c are each so disposed as to extend in a direction substantially perpendicular to the corresponding main cutting edge divisions (4a and 4c). In this case, the chip moving in a direction substantially perpendicular to the main cutting edge division (4a, 4c) can be abutted against the projection (6b, 6e, 6f) with lesser projection-induced cutting resistance. Moreover, for example, in the case where the projection (6b, 6e, 6f) is pointed to the midportion of its respective main cutting edge division (4a, 4c) in the insert length direction, the chip can be moved in a direction substantially perpendicular to the main cutting edge division without wobbling from side to side. This makes it possible to avoid making contact with a plurality of chips one another, in consequence whereof there results a decline of packing of chips in the chip pocket.

Since the corner R cutting edge 7-sided main cutting edge division 4b connects to the corner R cutting edge 7, it follows that the chip produced by the action of the corner R cutting edge 7-sided main cutting edge division 4b merges with the chip produced by the action of the corner R cutting edge 7 in the shape of circular arc. The circularly arcuate chip is moved on the rake face 2 with inclination with reference to the main cutting edge division 4a. In this embodiment, of a plurality of projections 6c and 6d corresponding to the corner R cutting edge 7-sided main cutting edge division 4b, the first projection 6d arranged nearest to the corner R cutting edge 7 is so shaped that its width and height diminish gradually with approach toward the corner R cutting edge 7. In this case, the chip produced by the action of the corner R cutting edge 7 as well as the main cutting edge division 4b connecting can be smoothly abutted against the first projection 6d with lesser first projection 6d-induced cutting resistance. As another advantage, the chip produced by the action of the corner R cutting edge 7 as well as the main cutting edge division 4b merging therewith can be curvedly deformed smoothly.

Moreover, the first projection 6d is so disposed as to extend along an imaginary straight line inclined at an angle of 60° to 85° (the inclination angle θ) relative to the corner R cutting edge 7-sided main cutting edge division 4b. In this case, not only it is possible to reduce the first projection 6d-induced cutting resistance, but it is also possible to cause the chip produced by the action of the corner R cutting edge 7 to become curvedly deformed more reliably. For example, if the inclination angle θ is less than 60°, the chips tend to cause clogging, which could lead to an undesired increase in the first projection 6d-induced cutting resistance. On the other hand, if the inclination angle θ is greater than 85°, the chip cannot be easy to be curvedly deformed readily, which could lead not only to a failure of protecting the holder wall 14 from abrasion but also to a decline in chip evacuation due to the size of the chip being oversize. There is also a possibility of occurrence of chipping-off of the cutting edge caused by biting of the chip.

In addition, if the inclination angle θis less than 60°, when the chip portion produced by the action of the main cutting edge division 4b connecting to the corner R cutting edge 7 is abutted against the first projection 6d, an unduly high cutting resistance is generated. On the other hand, if the inclination angle θ is greater than 85°, when the chip portion produced by the action of the corner R cutting edge 7 is abutted against the first projection 6d, an unduly high cutting resistance is generated.

In this embodiment, the inclination angle θ is set to fall in a range of from 60° to 85°. Accordingly, the chip produced by the action of the corner R cutting edge 7 can be curvedly deformed more reliably without causing any problem such as stated above.

Moreover, it is possible to, just like this embodiment, increase the number of the projection 6 corresponding to the main cutting edge division (4a to 4c) according to the length of its respective main cutting edge division. For example, in the case of providing the main cutting edge divisions of varying length, depending on the length of the main cutting edge division, the number of the projection 6 to be assigned thereto is varied; that is, a larger number of the projections 6 are assigned to the main cutting edge division of longer length (4b, 4c) compared to the main cutting edge division of shorter length (4a). The high-rigidity chip produced by the action of the long main cutting edge division (4b, 4c) comes into collision with a plurality of projections (6c, 6d; 6e, 6f). Depending on the rigidity of the chip, a force exerted by the chip can be distributed among a plurality of projections 6 or received by a single projection 6, wherefore it can be decreased of chipping-off of the projection.

It is also possible to increase the number of the projection 6 corresponding to the main cutting edge division (4a to 4c) under the condition that the length of its respective main cutting edge division falls outside a predetermined range of length. In this case, however, if the projection 6 corresponding to the main cutting edge division (4a to 4c) is too many in number, the projection-induced cutting resistance could be increased, and the chip could be caught in the projections. On the other hand, if the projection 6 corresponding to the main cutting edge division (4a to 4c) is too few in number, chipping-off of the projection could take place, depending on its size.

Note that, in FIG. 8, only the two corner-sided main cutting edge divisions 4b and 4c constituting both ends of the main cutting edge 4 are assigned with a plurality of projections 6c and 6d and a plurality of projections 6e and 6f, respectively. However, to achieve a similar effect, any of other main cutting edge divisions in the insert may also be assigned with a plurality of projections so long as it has an adequate length.

Third Embodiment

Figure 10:
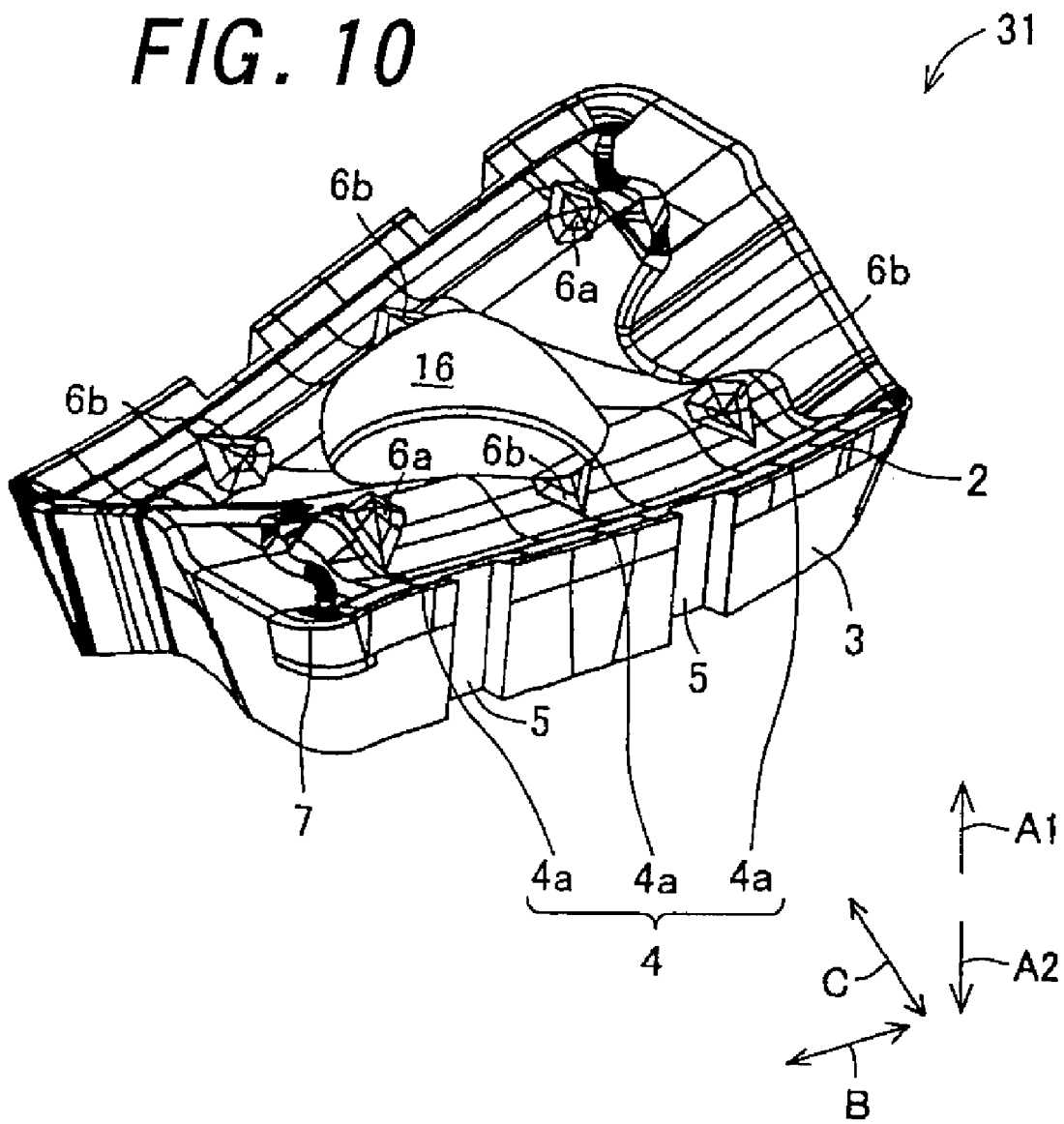
FIG. 10 is a general perspective view showing an insert 31 in accordance with a third embodiment of the invention.
Figure 11:
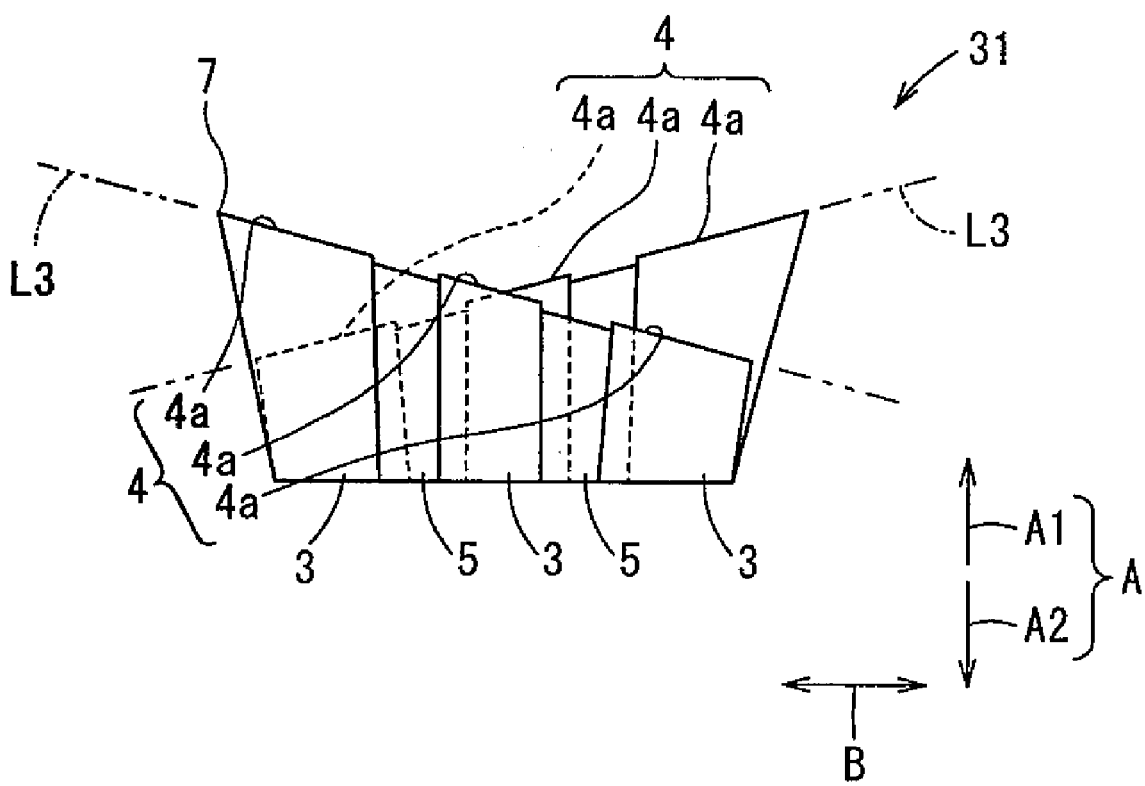
FIG. 11 is a side view of the insert 31 shown in simplified form, looking from the longer side thereof.

FIGS. 10 and 11 are views showing an insert 31 in accordance with a third embodiment of the invention. In the third embodiment, the main cutting edge divisions 4a are each so formed as to extend with an inclination with reference to a plane perpendicular to the insert thickness direction A. Otherwise, the third embodiment is analogous to the first embodiment, and therefore the components that play the same or corresponding roles as in the first embodiment will be identified with the same reference symbols, and overlapping descriptions will be omitted. The main cutting edge divisions 4a are each gradually inclined in a direction away from the bottom surface of the insert, with respect to the insert thickness direction A, with approach toward the corner R cutting edge 7 in one lengthwise direction. In this embodiment, the main cutting edge division 4a is formed so as to extend along a predetermined imaginary straight line.

In this embodiment, the main cutting edge 4 is divided into a plurality of main cutting edge divisions 4a in the insert length direction B. Accordingly, a chip of small widthwise dimension is produced. Moreover, since the length of the main cutting edge can be made smaller than the lengthwise dimension of the insert as a whole, it is possible to achieve a cutting-resistance reduction in the cutting. Further, since the main cutting edge division 4a is inclined relative to the bottom surface of the insert 1, it is possible to impart a positive axial rake to the milling tool 12 to which is attached the insert 1. This helps improve the biteability of the insert on a workpiece to be machined even further and thus reduce the cutting resistance exerted by the workpiece. Accordingly, even in the case of performing a heavy cutting, an undesired increase in cutting resistance can be decreased, wherefore chattering can be suppressed more reliably during the cutting.

Moreover, also in this embodiment, just like the preceding embodiments, there are provided the projections 6. Being brought into contact with the projection 6, the chip can be curvedly deformed and small-sized. Thereby, the chip is inhibited from coming into collision with the holder wall 14 and is thus able to get out of the chip pocket 13 readily, which leads to enhanced chip evacuation. Moreover, in this embodiment, since the main cutting edge division 4a is inclined, the produced chip is allowed to move in a direction toward the base end of the holder to eventually get out of the chip pocket readily. This helps enhance the chip evacuation even further. Note that the ridge line of the projection 6 should preferably extend in the direction in which the chip is evacuated. In this case, the chip can be curled smoothly.

Moreover, in this embodiment, the main cutting edge division 4a is inclined relative to the bottom surface of the insert 1 thereby imparting an axial rake angle. This eliminates the need to bring the seating surface formed in the holder 11 into sharp inclination with reference to the holder axis in a direction circumferentially of the holder, wherefore several advantages are gained: an undesired reduction in the thickness of the holder 11 can be avoided; the holder 11 is free from a decline in rigidity; and the life of the holder 11 can be prolonged. In addition, since the biteability of the insert on the workpiece can be improved, it is possible to reduce the cutting resistance exerted by the workpiece. Accordingly, even in the case of performing a heavy cutting in which the depth of cut at a single cutting operation is high, there is difficulty to increase in cutting resistance, wherefore chattering can be suppressed more reliably during the cutting.

Moreover, in this embodiment, the main cutting edge divisions 4a are aligned in one predetermined imaginary straight line L3. In this case, the chip produced by the action of one of the two main cutting edge divisions 4a juxtaposed in the insert length direction B is avoided coming into collision with the other main cutting edge division 4a. Accordingly, the chip to be evacuated is moved vigorously toward the holder base end, which leads to further enhancement in chip evacuation.

Figure 12:
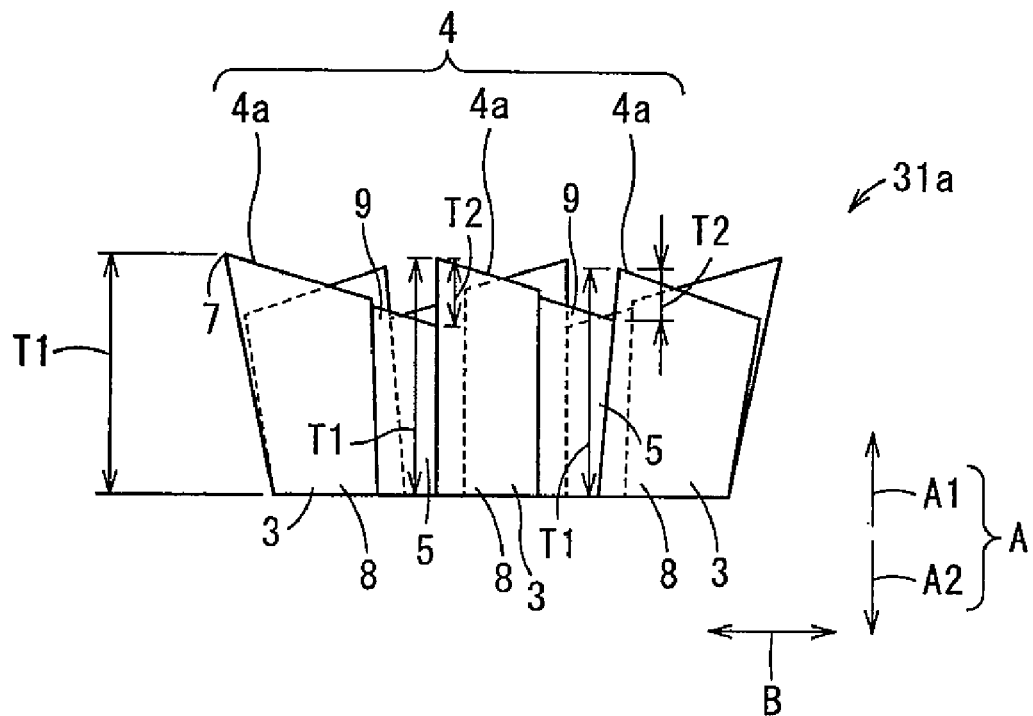
FIG. 12 is a side view of an insert 31a shown in simplified form, looking from the longer side thereof, which insert 31a is an example of a modified form of the insert 31.

FIG. 12 is a side view of an insert 31a shown in simplified form, looking from the longer side thereof, which insert 31a is an example of a modified form of the insert 31 of the third embodiment of the invention. The insert 31a is analogous to the insert 31 of the third embodiment shown in FIGS. 10 and 11, and therefore the components that play the same or corresponding roles as in the third embodiment will be identified with the same reference symbols, and overlapping descriptions will be omitted.

As shown in FIG. 12, in the insert 31a of modification example, when viewed from one side in the insert width direction C, the end face is provided with a main cutting edge division-constituting portion 8 for constituting the main cutting edge division 4a and an inter-cutting edge portion 9 interposed between the adjacent main cutting edge divisions 4a. The main cutting edge division 4a conforms to the one insert thickness direction A1-wise edge of the main cutting edge division-constituting portion 8. The main cutting edge divisions 4a are so formed as to extend in parallel with one another. Moreover, the main cutting edge divisions 4a are made uniform in the distance between its lengthwise one end and the bottom surface of the insert, namely in thicknesswise dimensions T1. Further, the one insert thickness direction A1-wise edge of the inter-cutting edge portion 9 is inclined in the insert thickness direction A in such a way that the distance to the bottom surface is gradually decreased with distance from the corner R cutting edge 7 in the insert length direction B. The insert 31a of modification example such as shown herein offers the same effects as achieved in the previously-described insert 1. Moreover, the main cutting edge division-constituting portion 8 can be made thick-walled in its thicknesswise direction, wherefore the main cutting edge can be avoided being chipped off. Further, it is possible to make large the difference in level between the inter-cutting edge portion 9 and the main cutting edge division-constituting portion located farther away from the corner R cutting edge 7 than the inter-cutting edge portion 9 in the lengthwise direction. This stepped portion acts as a chip breaker for breaking a chip into small pieces. Being small-sized in that way, the chip can be evacuated with higher evacuation.

Figure 13:
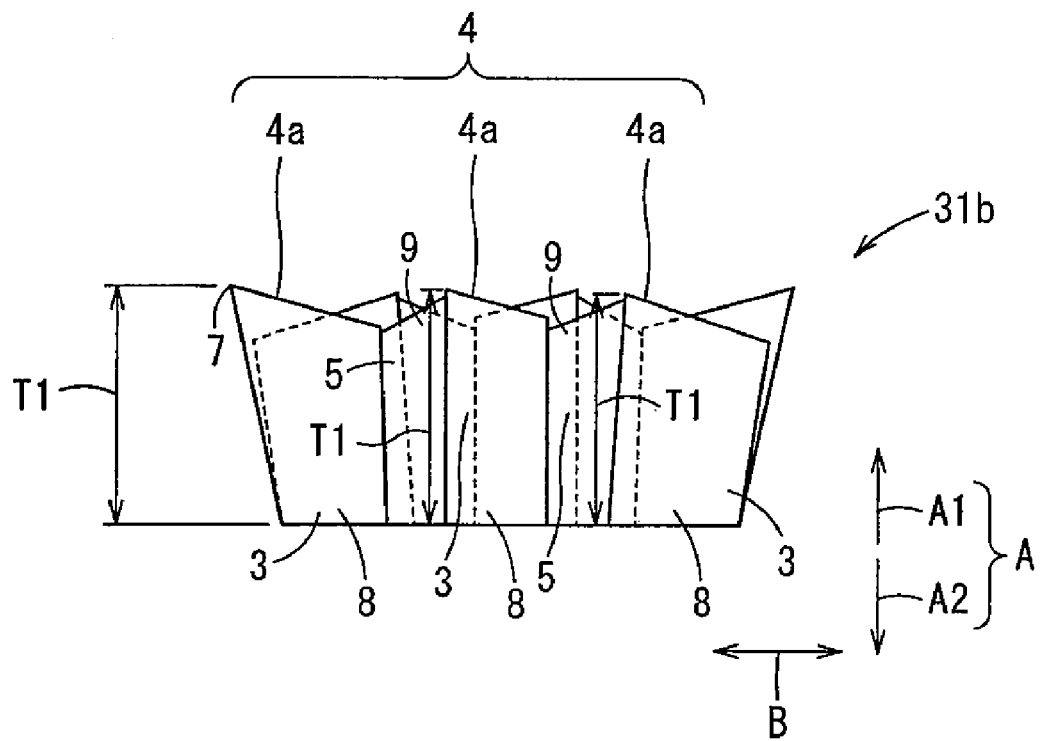
FIG. 13 is a side view of an insert 31b shown in simplified form, looking from the longer side thereof, which insert 31b is another example of a modified form of the insert 31.

FIG. 13 is a side view of an insert 31b shown in simplified form, looking from the longer side thereof, which insert 31b is another example of a modified form of the insert 31 of the third embodiment of the invention. The insert 31b is analogous to the insert 31 of the third embodiment shown in FIGS. 10 and 11, and therefore the components that play the same or corresponding roles as in the third embodiment will be identified with the same reference symbols, and overlapping descriptions will be omitted.

As shown in FIG. 13, in the insert 31b of another modification example, when viewed from one side in the insert width direction C, the end face is provided with a main cutting edge division-constituting portion 8 for constituting the main cutting edge division 4a and an inter-cutting edge portion 9 interposed between the adjacent main cutting edge divisions 4a. The main cutting edge division 4a conforms to the one insert thickness direction A1-wise edge of the main cutting edge division-constituting portion 8. The main cutting edge divisions 4a are so formed as to extend in parallel with one another. Moreover, the main cutting edge divisions 4a are made uniform in the distance between its lengthwise one end and the bottom surface of the insert, namely in thicknesswise dimensions T1. Further, the one insert thickness direction A1-wise edge of the inter-cutting edge portion 9 is inclined in the thicknesswise direction in such a way that the distance to the bottom surface is gradually increased with distance from the corner R cutting edge 7 in the insert length direction B. The insert 31b of another modification example such as shown herein offers the same effects as achieved in the previously-described insert 1. Moreover, the main cutting edge division-constituting portion 8 can be made thick-walled in its thicknesswise direction, wherefore the main cutting edge can be avoided being chipped off. Further, it is possible to make small the difference in level between the inter-cutting edge portion 9 and the main cutting edge division-constituting portion 8 located farther away from the corner R cutting edge 7 than the inter-cutting edge portion 9 in the lengthwise direction. This helps protect the main cutting edge from chipping-off more reliably. Moreover, a chip is slightly deformed curvedly when it climbs over this stepped portion. Being small-sized in that way, the chip is able to get out of the chip pocket 13 readily, which leads to enhanced chip evacuation.

Fourth Embodiment

Figure 14:
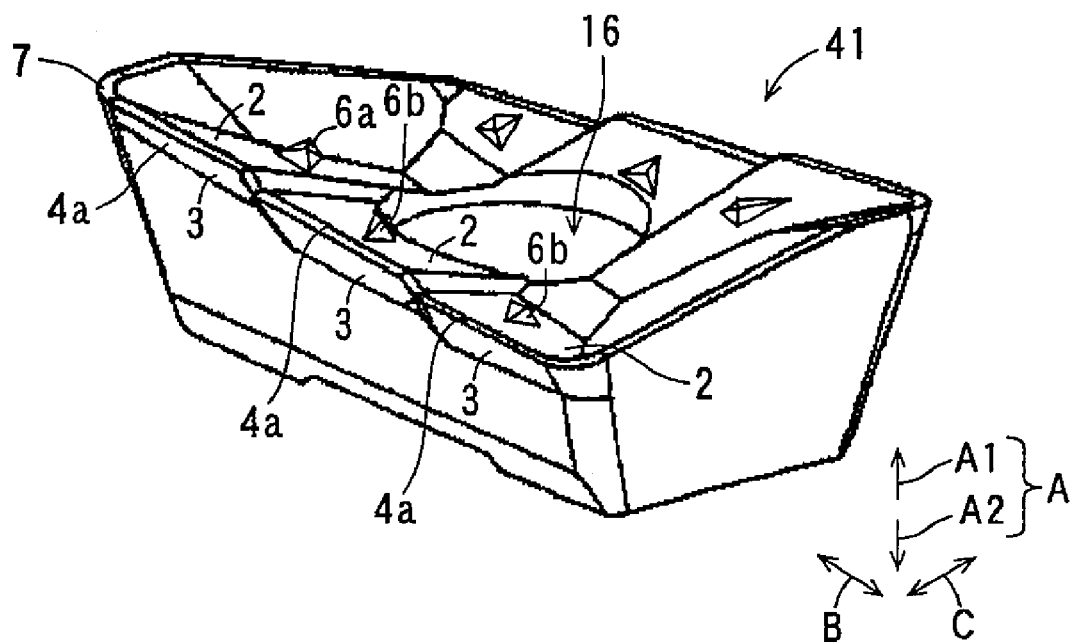
FIG. 14 is a general perspective view showing an insert in accordance with a fourth embodiment of the invention.
Figure 15:
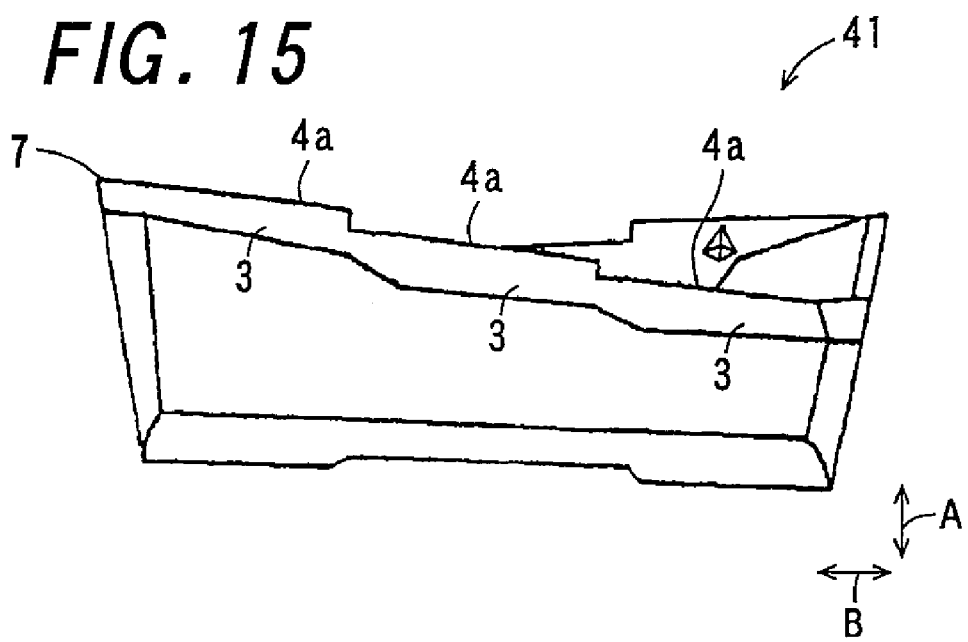
FIG. 15 is a side view of the insert 41, looking from the longer side thereof.

FIGS. 14 and 15 are views showing an insert 41 in accordance with a fourth embodiment of the invention. The insert 41 is analogous to the previously-described insert 1 of the first embodiment, and therefore the components that play the same or corresponding roles as in the insert 1 will be identified with the same reference symbols, and overlapping descriptions will be omitted.

As has already been described, the insert 1 of the first embodiment is provided with a plurality of main cutting edge divisions 4a obtained by cutting part of the rake face 2 to create one or more grooves 5. On the other hand, in the insert 41 of the fourth embodiment, the main cutting edge 4 is composed of a plurality of main cutting edge divisions 4a juxtaposed in the insert length direction B. Strictly speaking, the main cutting edge divisions 4a are so disposed that they are displaced in relation to one another in the insert thickness direction A. In this way, the main cutting edge has a stepped configuration; that is, the main cutting edge divisions 4a differ from one another in level in the thickness direction A. Since a plurality of main cutting edge divisions 4a do not connect to one another, it follows that a chip is produced by the action of each of the main cutting edge divisions 4a on an individual basis. Accordingly, the produced chip can be narrowed thereby achieving a cutting-resistance reduction.

Moreover, in this embodiment, just like the previously-described insert 1 of the preceding embodiment, there are provided projections 6 that are formed on the rake face 2 so as to protrude therefrom in correspondence with the individual main cutting edge divisions 4*a*. The shape and arrangement of the projections 6 are similar to those in the preceding embodiment, and therefore no description will be given therefor. By forming the projections 6 in correspondence with the individual main cutting edge divisions 4*a*, a chip of narrow width produced by the action of each of the main cutting edge divisions 4*a* can be curvedly deformed by the corresponding projection 6. This helps decrease the chip making contact with the holder wall 13. Moreover, being made smaller in radius of curvature, the chip is able to get out of the chip pocket 13 smoothly, which leads to enhanced chip evacuation. Moreover, in this embodiment, each of the main cutting edge divisions 4*a* is inclined in such a way that the distance to the bottom surface of the insert is gradually increased with approach toward the corner R cutting edge 7. However, in this embodiment, the configuration of the main cutting edge division is not limited thereto, and therefore each of the main cutting edge divisions 4*a* may be formed in parallel with the bottom surface. In another alternative, part of a plurality of main cutting edge divisions 4*a* may be inclined differently from others. In the case where the main cutting edge division 4*a* is inclined relative to the bottom surface, it is preferable that the ridge line of the projection 6 is formed along the direction in which the chip produced by the action of the main cutting edge division 4*a* is moved.

Also in the case of attaching the insert 31 of the third embodiment and the insert 41 of the fourth embodiment to the holder 11, it is necessary to make a difference in the positioning of the main cutting edge divisions between them. This makes it possible to cope with incompleteness in cutting which is ascribable to the groove 5. Moreover, the number and arrangement of the projection 6 corresponding to the main cutting edge division may be selected arbitrarily according to the length of its respective main cutting edge division.

Fifth Embodiment

FIG. 16 through 19 are views showing an insert 51 in accordance with a fifth embodiment of the invention.

The insert 51 of the fifth embodiment of the invention shown in FIG. 16 has a main body formed in substantially a polygonal plate shape. The main body has a bottom surface 52 formed on its lower surface, a rake face 53 formed on its upper surface, and a relief face 54 formed on its side surface. Moreover, along a ridge representing the intersection of the rake face 53 and the relief face 54 is formed a main cutting edge 55.

On the relief face 54 is created a main groove 56, the opposite ends of which reach the rake face 53 and the bottom surface 52, respectively. The main cutting edge 55 is divided into a plurality of first main cutting edge divisions 55A by the main grooves 56. Similarly, the relief face 54 is divided into a plurality of relief face divisions 54A by the main grooves 56. Moreover, on the relief face division 54A is created a sub-groove 57 abreast of the main groove 56. One end of the sub-groove 57 reaches the rake face 53. The first main cutting edge division 55A is divided into a plurality of second main cutting edge divisions 55*a* by the one end of the sub-groove 57.

The insert 51 of the fifth embodiment, which has a structure similar to that of the insert 21 of the second embodiment, differs from the insert 21 of the second embodiment in that there is no projection and the sub-grooves 57 are formed. The main groove 56 of the insert 51 of the fifth embodiment is formed in conformity with the groove 5 formed in the insert 21 of the second embodiment. That is, the main groove 56 and the groove 5 have basically the same configuration. Note that no description will be given as to the components of the insert 51 of the fifth embodiment that play the same or corresponding roles as in the insert 21 of the second embodiment, and the following description will center on the sub-groove 57 which is not provided in the insert 21 of the second embodiment.

As shown in FIGS. 16 through 19, the insert 51 of the fifth embodiment is provided with the main groove 56 and the sub-groove 57 which is made smaller than the main groove 56. The main groove 56 is formed at the end of the insert 51 in its widthwise direction so as to nick the widthwise end face in the insert width direction C and to extend in the insert thickness direction A. The main groove 56 is so formed as to extend from the rake face 53 to the bottom surface 52 of the insert 51, with its insert length direction B-wise width increasing gradually from the rake face 53 to the bottom surface 52. In other words, the main groove 56 extends across the rake face 53 and the bottom surface 52.

The main cutting edge 55 is divided into pieces in the insert length direction B by the main grooves 56, and so is the relief face 54. That is, the main cutting edge 55 is composed of a plurality of first main cutting edge divisions 55A arranged spacedly side by side in the insert length direction B, and the relief face 54 is composed of a plurality of relief face divisions 54A arranged spacedly side by side in the insert length direction B. In this embodiment, the insert 51 is provided with three main grooves 56 aligned in the insert length direction B, and correspondingly the main cutting edge 55 includes four first main cutting edge divisions 55A, and the relief face 54 includes four relief face divisions 54A. The main grooves 56 are substantially identical in shape and arranged substantially equidistantly in the insert length direction B. The shape, arrangement, and number of the main groove 56 may be selected arbitrarily so long as the strength of the cutting edge is maintained sufficiently high.

The sub-groove 57 is formed at the end of the insert 51 in its widthwise direction so as to nick the widthwise end face in the insert width direction C and to extend in the insert thickness direction A. The sub-groove 57 is so formed as to extend from the rake face 53 of the insert 51 in the insert thickness direction A. Moreover, the sub-groove 57 is made smaller in the degree of depression in the insert 51, namely depth, than the main groove 56.

The insert width direction C-wise dimension of each of the main groove 56 and the sub-groove 57 is adjusted to be greater at least than the predetermined maximum feed per tooth of the milling tool 12. In this embodiment, the insert width direction C-wise dimension of the main groove 56 is so determined that a decline in cutting resistance reaches a state of criticality. On the other hand, the insert width direction C-wise dimension of the sub-groove 57 is set at a maximum value of the predicted feed. Moreover, the insert length direction-wise dimension, the insert width direction-wise dimension, and the insert thickness direction-wise dimension of the main groove 56 are each so determined as to maintain the strength of the insert 1.

In this embodiment, a relief angle is secured in the insert 51. The relief face 54 is so shaped as to nick gradually inwardly in the insert width direction C from the rake face 53-sided end to the bottom surface 52-sided end in the insert thickness direction A. On the relief face 54, the bottom of the sub-groove 57 is positioned in the region projecting beyond the region intersecting the bottom surface 52 in the insert width direction C. That is, the sub-groove 57 is created at the widthwise end of the insert 51 so as to lie in the region other than the bottom surface 52-sided region, namely on the rake face 53-sided region. Moreover, the insert width direction-wise wall surface of the sub-groove 57 extends substantially in parallel with the insert thickness direction A.

Note that the sub-groove 57 is made smaller in at least one of depth, width, and length than the main groove 56. That is, the sub-groove 57 may be made smaller than the main groove 56 in terms of only depth or width, or in terms of both depth and width. Incidentally, in this embodiment, the sub-groove 57 is made smaller in depth, width, and length than the main groove 56. The sub-groove 57 is created between the two adjacent main grooves 56 in the insert length direction B, between the main groove 56 and insert length direction-wise one end face of the insert, and between the main groove 56 and insert length direction-wise other end face of the insert. Accordingly, the sub-grooves 57 are positioned so as to subdivide the main cutting edge; that is, to divide the first main cutting edge division 55A obtained by dividing the main cutting edge by the main groove 56 into a plurality of portions.

In this embodiment, the main cutting edge 55 is composed of the first main cutting edge divisions of varying length in the insert length direction: the long length of first main cutting edge division and the short length of first main cutting edge division. The long first main cutting edge division is divided into three second main cutting edge divisions by two sub-grooves 57. The short first main cutting edge division is divided into two second main cutting edge divisions by a single sub-groove 57. In this way, the second main cutting edge division can be made short regardless of the length of the first main cutting edge division to which it belongs. That is, the sub-groove 57 is positioned so as to divide the first main cutting edge division into two or three equal portions.

As described hereinabove, according to the present embodiment, the number of the main groove 56 for dividing the relief face 54 including the main cutting edge 55 is so determined that the strength of the cutting edge is maintained sufficiently high. In order to achieve a further reduction in cutting resistance, the first main cutting edge division 55A is divided into a plurality of second main cutting edge divisions 55a by the sub-groove 57 which is smaller than the main groove 56. In this construction, a cutting-resistance reduction can be achieved while maintaining the strength of the cutting edge constituting the main cutting edge. As a result, for example, even in the case of performing a heavy cutting involved with considerable depth of cut, it is difficult that the insert 51 suffers from chipping-off and chattering.

Figure 17:
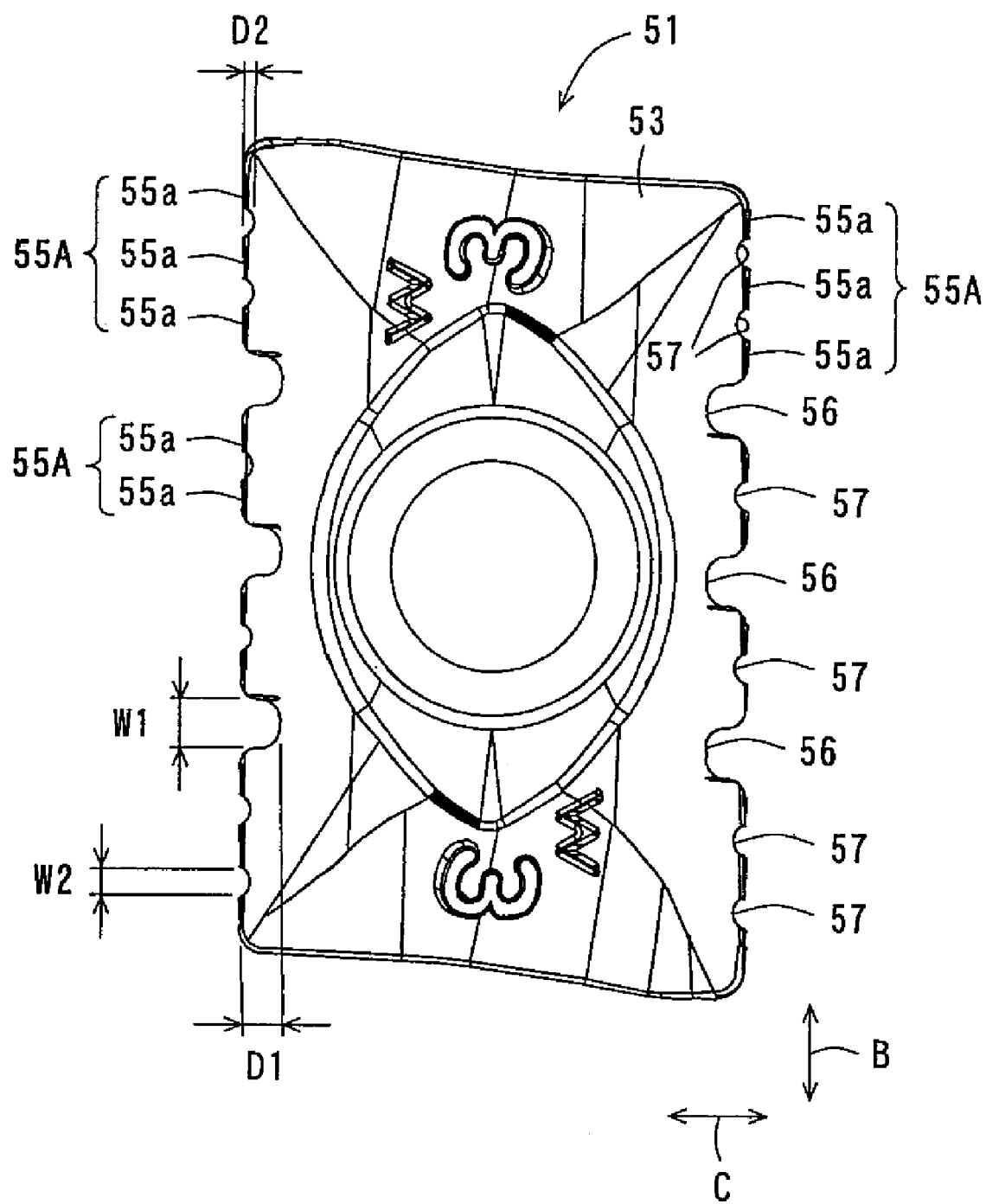
FIG. 17 is a plan view showing the insert 51.

As will be explained below, in designing the sub-groove 57 and the main groove 56 specific to this embodiment, a width W, a depth D, and a length L are deemed to be important factors. As shown in FIG. 17, the width (W1, W2) of the groove (56, 57) refers to the insert length direction B-wise dimension of the groove (56, 57); that is, the distance between two points of intersection of a ridge representing the intersection of the rake face 53 and the wall surface of the groove (56, 57) and an imaginary straight line of the main cutting edge 5. Expressed differently, the width (W1, W2) refers to the distance between the insert length direction-wise wall surfaces of the groove (56, 57) in the insert length direction.

Moreover, the depth (D1, D2) of the groove (56, 57) refers to the insert width direction C-wise dimension of the groove (56, 57); that is, the maximum distance between the imaginary straight line of the main cutting edge 55 and the intersecting ridge of the groove in the insert width direction C. Expressed differently, the depth (D1, D2) refers to the distance between part of the relief face 54 in the vicinity of the rake face 53 and the insert width direction-wise wall surface of the groove (56, 57) in the insert width direction C.

Figure 18:
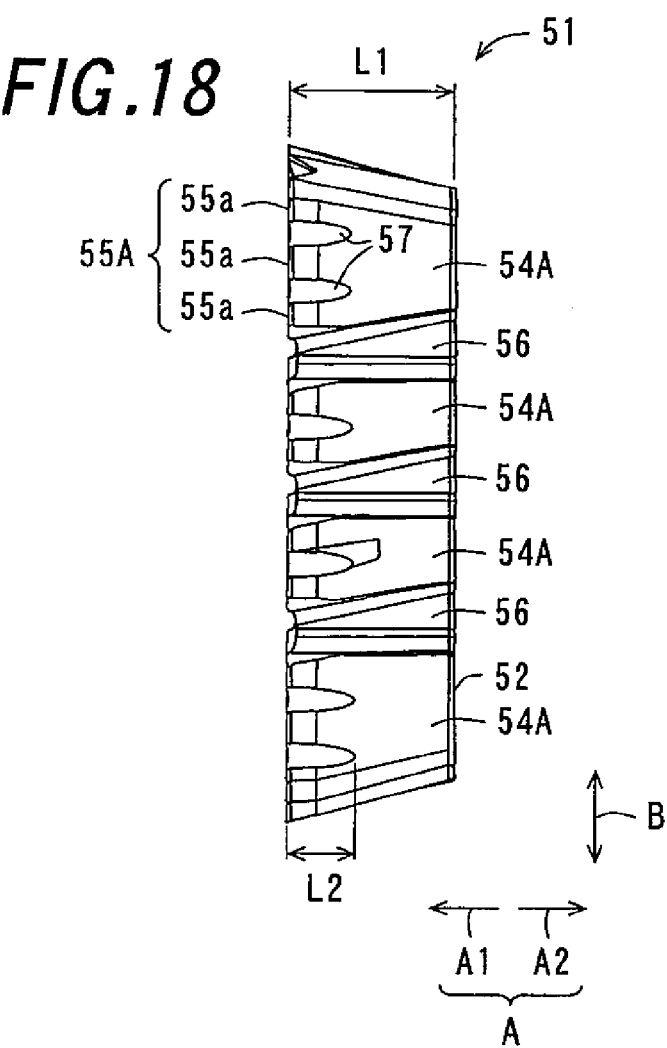
FIG. 18 is a side view of the insert 51, looking from the longer side thereof.
Figure 19:
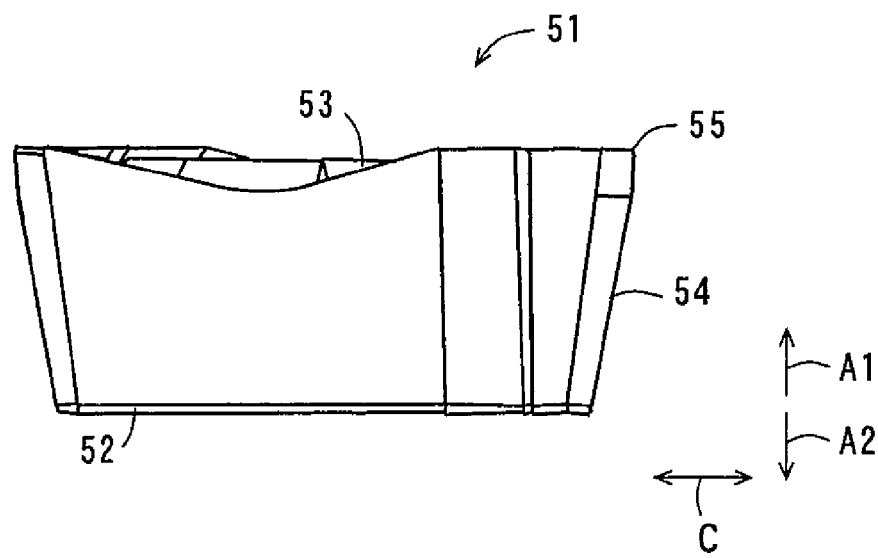
FIG. 19 is a side view of the insert 51, looking from the shorter side thereof.

Further, as shown in FIG. 18, the length (L1, L2) of the groove (56, 57) refers to the insert thickness direction A-wise dimension of the groove (56, 57). That is, in a state in which the insert 51 is settled on a flat surface with its bottom surface 52 down, the length (L1, L2) refers to the minimum distance between one end reaching the rake face 53 to the other end of the groove (56, 57) in the insert thickness direction A.

Herein, it is particularly preferable that the width W2 of the sub-groove 57 is adjusted to be ⅙ to ⅚ part of the width W1 of the main groove 56 from the standpoint of striking an excellent balance between a reduction in cutting resistance and maintaining of cutting edge strength. If the width W2 of the sub-groove 57 is smaller than ⅙ part of the width W1 of the main groove 56, a satisfactory cutting-resistance reducing effect cannot be difficult to be attained. On the other hand, if the width W2 of the sub-groove 57 is larger than ⅚ part of the width W1 of the main groove 56, it is difficult to impart sufficient strength to the cutting edge portions. By adjusting the width W2 of the sub-groove 57 within the aforementioned range, it is possible to secure an appropriate cutting edge length for the second main cutting edge division 55a. This is effective in decreasing occurrence of chipping off, breakage, or other damage to the cutting edge.

Moreover, it is particularly preferable that the depth D2 of the sub-groove 57 is adjusted to be ⅙ to ⅚ part of the depth D1 of the main groove 56. If the depth D2 of the sub-groove 57 is smaller than ⅙ part of the depth D1 of the main groove 56r the depth D2 of the sub-groove 57 tends to be smaller than the feed set for a heavy cutting, and thus a chip cannot be difficult to be broken into pieces properly. This leads to a failure of a reduction in cutting resistance. Furthermore, the chip in an unbroken state will be brought into contact with the groove wall surface of the sub-groove 57, which results in an increase in cutting resistance. On the other hand, if the depth D2 of the sub-groove 57 is larger than ⅚ part of the depth D1 of the main groove 56, it is difficult to impart sufficient strength to the cutting edge portions, which leads to a decline in the strength of the insert main body as a whole.

In this embodiment, while the length L1 of the main groove 56 is substantially identical with the thicknesswise dimension of the insert 1, the length L2 of the sub-groove 57 is smaller than the thicknesswise dimension of the insert 51. The other end of the sub-groove 57 is located on the relief face division 54A. This construction is free from a decline in the strength of the cutting edge and thus a decline in the strength of the insert main body that are associated with the case of increasing the number of only the main groove 56 whose other end reaches the bottom surface 52.

More specifically, in this embodiment, the width W1 of the main groove 56 is set at 1.6 mm; the depth D1 of the main groove 56 is set at 1.2 mm; and the length L1 of the main groove 56 is set at 6.4 mm. On the other hand, the width W2 of the sub-groove 57 is set at 0.6 mm; the depth D2 of the sub-groove 57 is set at 0.4 mm; and the length L2 of the sub-groove 57 is set at 2.4 mm.

Figure 20:
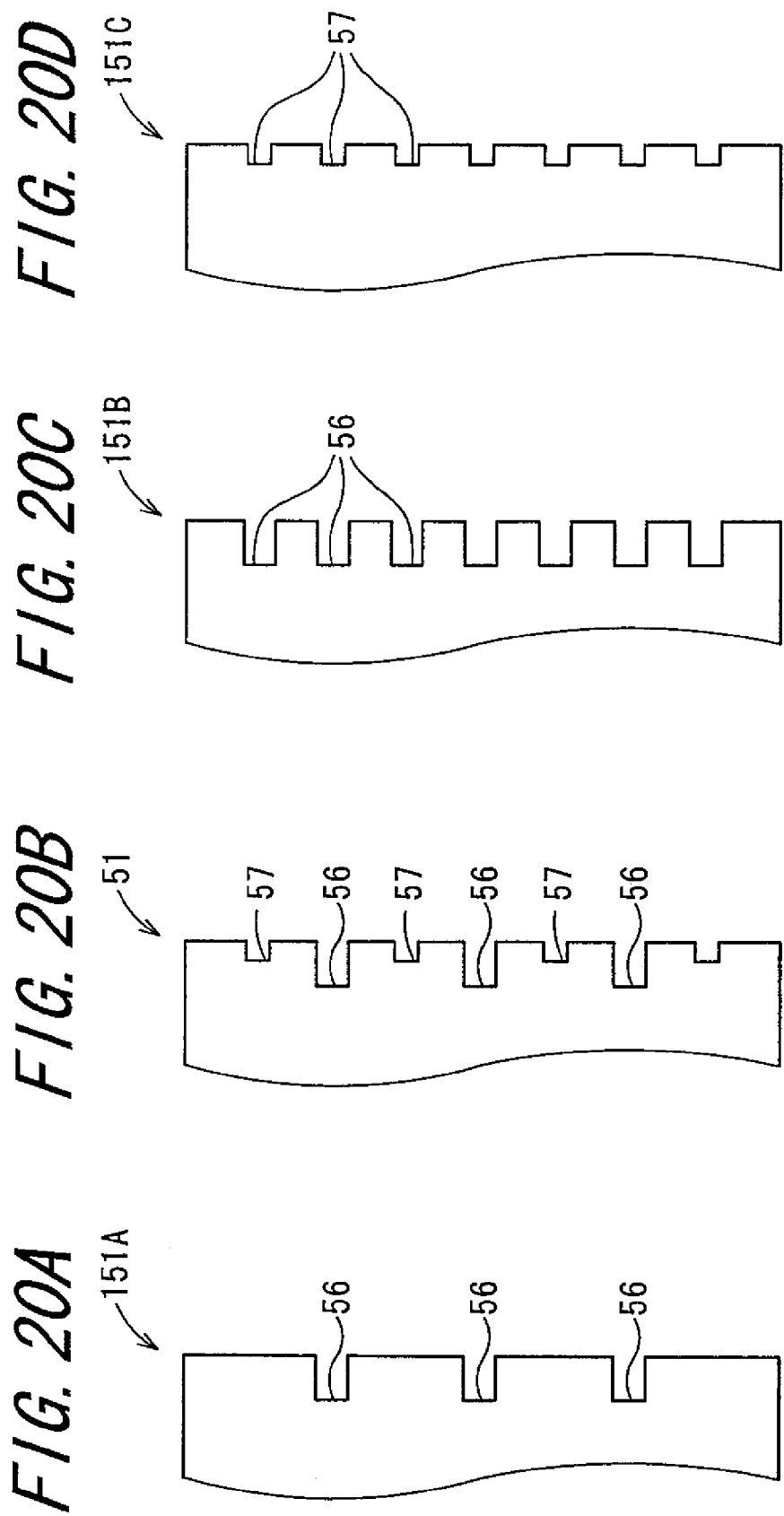
FIGS. 20A through 20D are plan views of experimental inserts of varying cutting-edge configuration shown in simplified form, illustrating the insert 51 of the fifth embodiment and inserts 151A, 151B, and 151C of comparative examples.

Subsequently, a description will be given as to the experiment that has been conducted to examine the cutting performance of the insert of the present embodiment. FIGS. 20A through 20D are plan views of experimental inserts of varying cutting-edge configuration shown in simplified form, illustrating the insert 51 of the fifth embodiment and inserts 151A, 151B, and 151C of comparative examples. As shown in FIG. 20(B), the insert 51 of the fifth embodiment has three main grooves 56 and four sub-grooves 57. On the other hand, as shown in FIG. 20(A), the insert 151A of the first comparative example has three main grooves 56. Moreover, as shown in FIG. 20(C), the insert 151B of the second comparative example has seven main grooves 56. Further, as shown in FIG. 20(D), the insert 151C of the third comparative example has seven sub-grooves 57. The sizes of the main groove 56 and the sub-groove 57 are common to all of the insert 51 of the fifth embodiment and the inserts 151A, 151B, and 151C of the first to third comparative examples.

In the insert 151A of the first comparative example, the main cutting edge is divided substantially into four main cutting edge divisions by three main grooves 56. The insert 51 of the fifth embodiment is obtained by creating the sub-grooves 57 additionally in the insert 151A of the first comparative example. That is, the main cutting edge division obtained by dividing the main cutting edge by the groove 56 is divided into two portions by the sub-groove 57. In the insert 151B of the second comparative example, the main cutting edge is divided substantially into eight equal main cutting edge divisions by seven main grooves 56. In the insert 151C of the third comparative example, the main cutting edge is divided substantially into eight equal main cutting edge divisions by seven sub-grooves 57.

Cutting resistance is increased in proportion to the area of contact between the insert and a workpiece, namely the sum total of the lengths of the main cutting edge divisions formed in the insert. Accordingly, the larger is the number of the grooves 56 and 57, the smaller is the cutting resistance. As compared with the insert 151A of the first comparative example, the insert 51 of the fifth embodiment has a larger number of grooves, namely the sub-grooves 57, and exhibits lower cutting resistance correspondingly. Moreover, as will be understood from the cutting resistance data on the insert 151C of the third comparative example, the rate of cutting-resistance reduction in the case of increasing the number of the sub-groove 57 is not so large as the case of increasing the number of the main groove 56. This is not only because the sum total of the lengths of the main cutting edge divisions formed in the insert having many sub-grooves alone is larger than that of the insert having many main grooves alone, but also because the sub-groove 57 is small in depth D and width W. That is, part of the workpiece left unmachined tends to be brought into contact with the wall surface of the sub-groove 57. Inconveniently, this makes difficult an effective reduction of cutting resistance. In addition, in the case of providing

TABLE 1

| | FIRST COMPARATIVE EXAMPLE (NORMAL NICK ARRANGEMENT) | FIFTH EMBODIMENT (DOUBLE-NICK ARRANGEMENT) | SECOND COMPARATIVE EXAMPLE (MANY-NICK (MAIN) ARRANGEMENT) | THIRD COMPARATIVE EXAMPLE (MANY-NICK (SUB) ARRANGEMENT) |
|---|---|---|---|---|
| CUTTING RESISTANCE | 3528 N | 2964 N | 2541 N | 3281 N |
| CUTTING RESISTANCE RATIO TO FIRST COMPARATIVE EXAMPLE | 100% | 84% | 72% | 93% |
| CUTTING EDGE STRENGTH (CRITICAL FEED: mm/t) | 0.7 | 0.65 | 0.35 | 0.65 |
| CUTTING EDGE STRENGTH RATIO TO FIRST COMPARATIVE EXAMPLE | 100% | 93% | 50% | 93% |
| FINISHED SURFACE CONDITION | LARGE ASPERITIES | FEW ASPERITIES | FEW ASPERITIES | RELATIVELY LARGE ASPERITIES |

In order to make performance comparisons among the experimental inserts in terms of cutting resistance, cutting edge strength, and finished surface condition, with use of a workpiece of SS400 (according to JIS), machining tests were carried out by means of dry cutting at a cutting speed V of 200 m/min, under conditions of a depth of cut in the holder axial direction of 15 mm and a depth of cut in the holder radial direction of 5 mm. Moreover, in the measurement of cutting resistance and finished surface condition, a feed: f per tooth of the insert was set at 0.2 mm/t. Listed in Table 1 are the results of the tests. Note that cutting resistance measurement was carried out under the aforementioned conditions with use of a cutting resistance measurement device manufactured by Kistler Corporation. The value of the obtained principal force was listed in the table as the cutting resistance. Moreover, regarding cutting-edge strength measurement, the feed was increased by degrees so as for a load imposed on the insert to become heavier gradually until the insert was chipped off. The value of the critical feed at which the chipping-off of the insert took place was listed in the table as the cutting-edge strength. Specifically, the feed per tooth of the insert was increased by degrees, and the value of the feed at which the insert was chipped off was taken as the cutting-edge strength.

neither the main groove 56 nor the sub-groove 57, cutting resistance of approximately 5000 N will be observed.

Cutting-edge strength is increased in proportion to the length of the main cutting edge division. In other words, the shorter is the main cutting edge division, the lower is the cutting-edge strength. Accordingly, as compared with the insert 151A of the first comparative example, the insert 151B of the second comparative example exhibits lower cutting-edge strength because of its having a larger number of the main grooves 56. In this regard, with the provision of the sub-grooves 57 each of which is smaller than the main groove 56, the cutting-edge strength of the insert 51 of the fifth embodiment is not so low as that of the insert 151B of the second comparative example relatively to the insert 151A of the first comparative example.

Moreover, in the case where the depth D2 of the sub-groove 57 is smaller than a holder cutting extent f per tooth (f>D2), part of the workpiece left unmachined tends to be brought into contact not only with the insert length direction-wise walls but also with the insert width direction-wise wall of the sub-groove 57. In this case, the area of contact between the insert and the workpiece is further increased, which results in an undesired increase in cutting resistance. After all, the cutting edge is prone to chipping-off due to poor strength. In light of this, the insert 51 of the fifth embodiment is so designed that the depth D2 of the sub-groove 57 is greater than a maximum value fmax of a predicted feed per tooth of the insert. This helps avoid an increase in cutting resistance which is ascribable to the sub-grooves 57, and thus avoid a decline in the cutting-edge strength with lesser cutting resistance. For example, in this embodiment, the maximum value fmax of the predicted feed is set at 0.3 mm/t.

On the finished surface of the workpiece that has undergone a cutting, the level of asperities is highly dependent on cutting resistance. As has already been described, the insert 51 of the fifth embodiment is lower in cutting resistance than the insert 151A of the first comparative example. That is in contrast to the insert 151A of the first comparative example, the insert 51 of the fifth embodiment is able to give the workpiece a smooth surface finish with lesser asperities.

Thus, in an effort to accomplish a heavy cutting under strict cutting conditions, by increasing the number of the main grooves 56 with respect to the insert 151A of the first comparative example, it is certainly possible to achieve a cutting-resistance reduction, but simultaneously the cutting-edge strength is reduced by one-half. Such an insert is not adaptable to a heavy cutting. Moreover, just as is the case with the insert 151C of the third comparative example described above, by providing a plurality of sub-grooves 57 alone, it is certainly possible to avoid a decline in the cutting-edge strength, but simultaneously the cutting resistance cannot be reduced satisfactorily. After all, such an insert is also not adaptable to a heavy cutting.

By way of contrast, just like the insert 51 of the fifth embodiment, in the construction obtained by forming the smaller-than-main groove 56 sub-grooves 57 additionally in the insert 151A of the first comparative example, a cutting-resistance reduction can be achieved while maintaining the cutting-edge strength. It will thus be seen that the insert 51 of the fifth embodiment is adaptable to a heavy cutting that must be carried out under strict cutting conditions.

Although the above-described embodiment deals with the case where the sub-groove 57 is so configured that its other end does not reach the bottom surface 52, the invention is not limited thereto. The other end of the sub-groove 57 may reach the bottom surface 52 so long as a sufficiently high strength can be secured in the insert main body by adjusting properly the relief angle of the relief face 54, the thickness of the insert main body, and the width W2 and the depth D2 of the sub-groove 57. It is needless to say that, in this case, it is possible to achieve the same effects as achieved in the present embodiment.

Moreover, the sub-groove 57 is so disposed as to divide the first main cutting edge division 55A into substantially equal portions thereby forming the second main cutting edge divisions 55a. In this way, the cutting resistance can be distributed equally among the second main cutting edge divisions 55a, wherefore a decline in the cutting-edge strength can be minimized with lesser cutting resistance. Herein, although this embodiment deals with the case where the first main cutting edge division 55A is divided into two equal portions, as well as three equal portions, by the sub-groove 57, the invention is not limited thereto. The first main cutting edge division 55A may arbitrarily be divided into two equal portions, three equal portions, four equal portions, or the like to form a plurality of second main cutting edge divisions 55a of substantially equal length. It is needless to say that, in this case, it is possible to achieve the same effects as achieved in the present embodiment.

According to this embodiment, the first main cutting edge division 55A, which is obtained by dividing the main cutting edge by the main grooves 56, is divided into a plurality of second main cutting edge divisions 55a by the sub-groove 57. The width of the chip 8 to be generated substantially coincides with the length of the second main cutting edge division 55a. That is, the chip 8 is made smaller in size and lighter in weight, and is thus able to get out of the chip pocket 13 formed in the holder 11 readily, which leads to enhanced chip evacuation. Accordingly, occurrence of problems such as packing of the chips 8 in the chip pocket 13 and biting of the chips 8 can be decreased, wherefore the insert 51 and the holder 11 can be used for a longer time. Moreover, being lighter in weight, the chip 8 evacuated to the outside from the chip pocket 13 is moved without being piled up around the workpiece. This helps protect the workpiece from a flaw caused by the chip. Further, since the accumulation of the chips around the workpiece can be decreased, it is possible to suppress biting of the chips 8 into the cutting edge. In this way, the chips can be evacuated with higher evacuation in the course of heavy cutting.

Moreover, the first main cutting edge division 55A is further divided into pieces by the sub-groove 57. In this case, the cutting resistance exerted on the main cutting edge can be reduced, and also, since the sub-groove 57 is made smaller than the main groove 56, a significant decline in the cutting-edge strength as observed in the case of forming the main grooves 56 can be suppressed. That is, by virtue of the coexistence of the main groove 56 and the sub-groove 57, a decline in the cutting-edge strength can be suppressed, and also a cutting-resistance reduction can be achieved in accompaniment with a decrease in the area of contact between the insert 51 and the workpiece. This makes it possible to suppress chattering in the cutting, and thus achieve a heavy cutting that must be carried out under strict cutting conditions.

Moreover, in this embodiment, the sub-groove 57 is made smaller in width than the main groove 56. That is, two types of grooves (56, 57) of different width can be formed. With the provision of the broad main grooves 56, the proportion of the first main cutting edge divisions 55A to the insert as a whole can be decreased. This makes it possible to ensure chatter-free operation with lesser cutting resistance. On the other hand, with the provision of the narrow sub-grooves 57, the chip can be further small-sized, and also a decline in the strength of the first main cutting edge division 55A can be avoided. In this way, the life of the insert 51 can be prolonged without causing chipping-off of the main cutting edge. Accordingly, the insert 51 of this embodiment succeeds in achieving a cutting-resistance reduction while suppressing a cutting-edge strength decline, and is thus suitable for use in a heavy cutting.

Moreover, according to this embodiment, the length of the sub-groove 57 is set to be smaller than the thickness of the insert main body. The relief face 54A located between the two main grooves 56 is divided into a plurality of portions by the sub-groove 57. A plurality of relief face divisions 54A connect to each other at their bottom surface-sided regions. In this way, the relief face division sandwiched between the two main grooves 56 or the relief face division sandwiched between the main groove 56 and the sub-groove 57 can be protected from chipping-off, wherefore the cutting-edge strength can be increased.

Moreover, according to this embodiment, the sub-groove 57 is made smaller in depth than the main groove 56. In this way, the rake face portion sandwiched between the two main grooves 56 or the rake face portion sandwiched between the main groove 56 and the sub-groove 57 can be protected from chipping-off, wherefore the cutting-edge strength can be increased.

Moreover, according to this embodiment, since the depth of the main groove 56 is set at a critical value above which it is not desirable to go because no further cutting-resistance reduction effect can be expected, it is possible to reduce the cutting resistance insofar as possible. Moreover, since the depth of the sub-groove 57 is set at a value which is equal to or above the value corresponding to the maximum feed, it is possible to narrow the width of the chip by the sub-groove 57 without fail. Further, since the sub-groove 57 is made smaller in depth than the main groove 56, a decline in the cutting-edge strength can be suppressed. In addition, since the sub-groove 57 is so disposed as to divide the first main cutting edge division 55A into substantially equal portions thereby forming the second main cutting edge divisions 55a, it is possible to distribute the cutting resistance equally among the second main cutting edge divisions 55a. Accordingly, a decline in the cutting-edge strength can be suppressed with lesser cutting resistance.

Further, according to this embodiment, just like the first embodiment, a protuberance 15 is formed around the through hole 16. This facilitate curling of the chip. Moreover, since the head of the screw member threadedly engaged with the through hole 16 is hidden behind the protuberance 15, it is difficult that the chip and the screw head of the screw member make contact with each other, wherefore the head of the screw member is free from abrasion.

Sixth Embodiment

Figure 21:
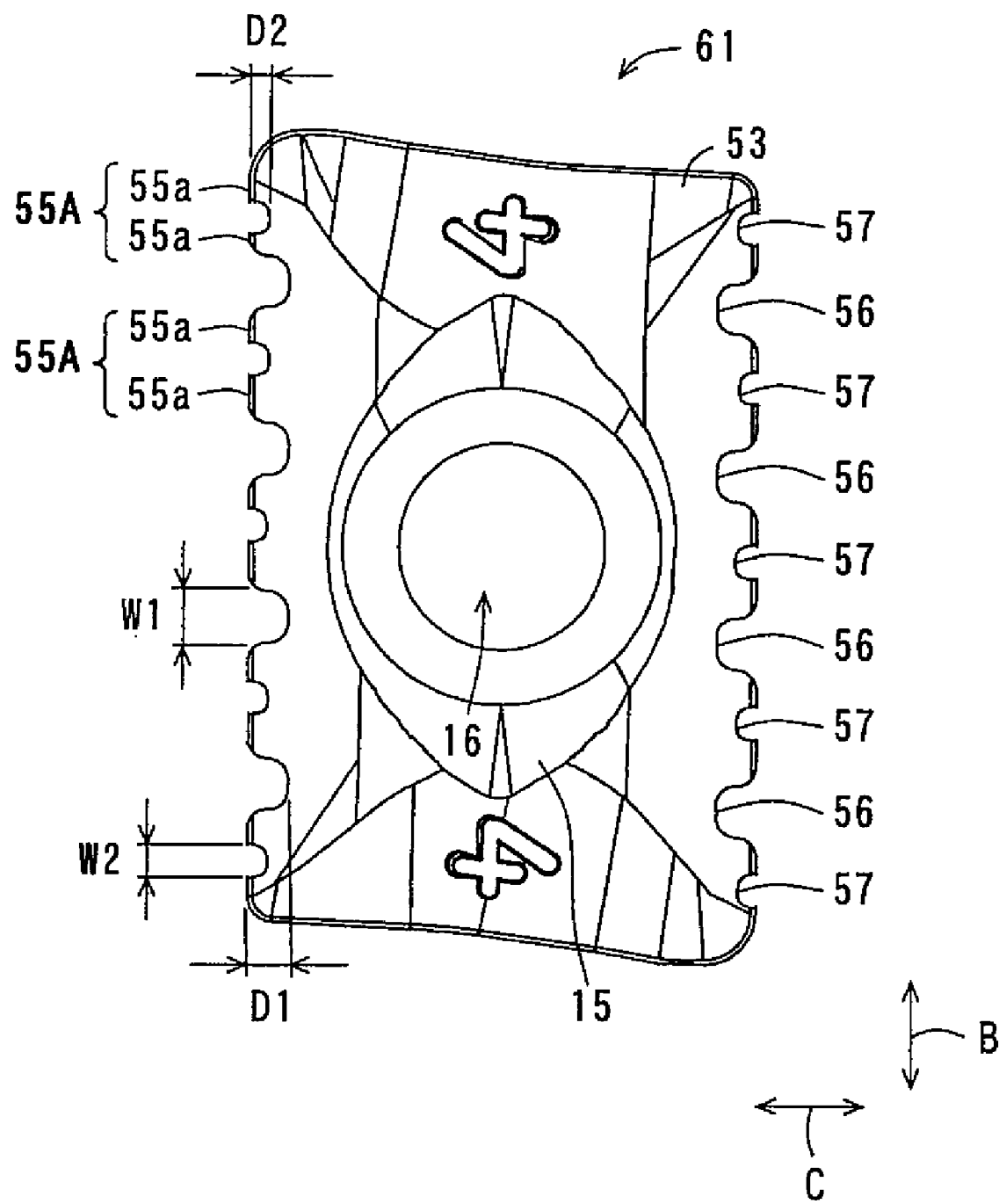
FIG. 21 is a plan view showing the insert 61 in accordance with the sixth embodiment of the invention.
Figure 22:
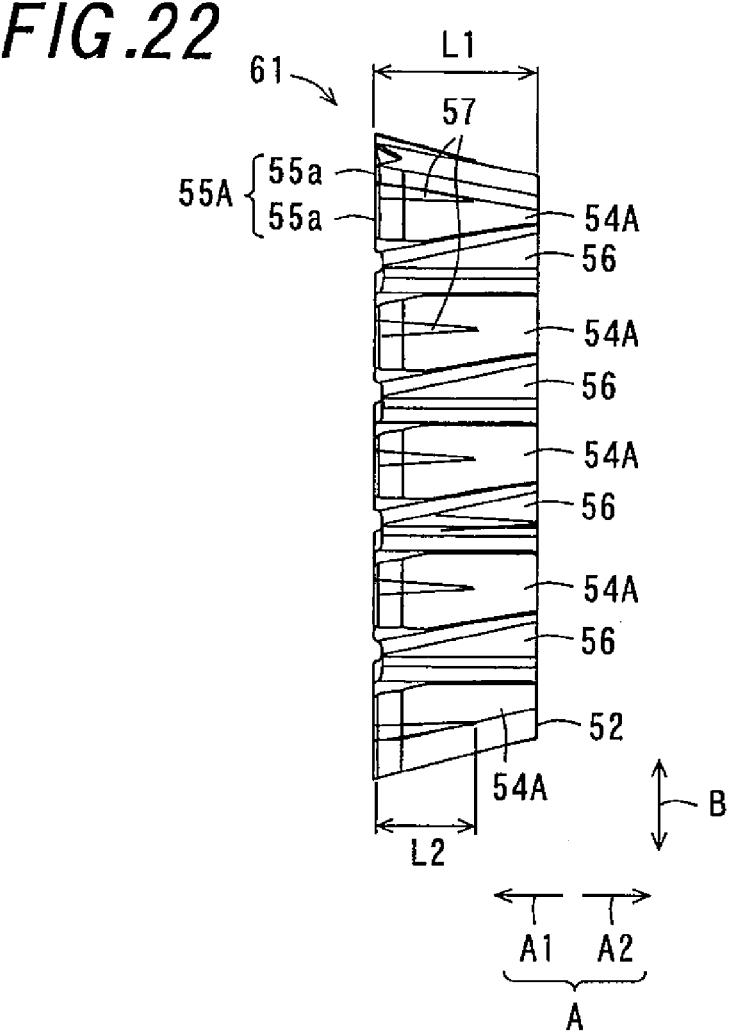
FIG. 22 is a side view of the insert 61, looking from the longer side thereof.
Figure 23:
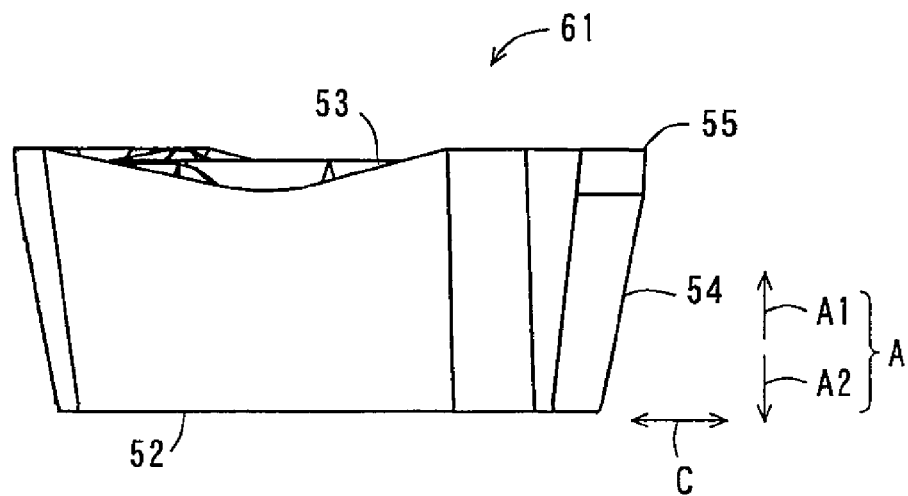
FIG. 23 is a side view of the insert 61, looking from the shorter side thereof.

Shown in FIGS. 16 through 19 is the insert 51 in which the main cutting edge 5 is divided into pieces by three main grooves 56. Meanwhile, as a sixth embodiment of the invention, FIGS. 21 through 23 show an insert 61 in which the main cutting edge 55 is divided into pieces by four main grooves 56. FIG. 21 is a plan view showing the insert 61 in accordance with the sixth embodiment of the invention. FIG. 22 is a side view of the insert 61, looking from the longer side thereof. FIG. 23 is a side view of the insert 61, looking from the shorter side thereof.

The insert 61 of the sixth embodiment, although it has a structure similar to that of the insert 1 of the first embodiment, differs from the insert 1 in its having no projection and having the sub-grooves 57. The main groove 56 of the insert 61 of the sixth embodiment is formed in conformity with the groove formed in the insert 1 of the first embodiment shown in FIG. 1. Moreover, the main groove 56 and the sub-groove 57 of the insert 61 of the sixth embodiment are configured basically in the same manner as in the insert 51 of the fifth embodiment.

The insert 61 of the sixth embodiment differs from the insert 51 of the fifth embodiment in the arrangements of the main grooves 56 and the first main cutting edge divisions 55A. The insert 61 of the sixth embodiment is provided with four main grooves 56. Correspondingly, the main cutting edge 55 is divided into five pieces of the first main cutting edge divisions 55A. The sub-groove 57 is so formed as to divide the first main cutting edge division 55A into two equal portions thereby forming the second main cutting edge divisions 55a. Accordingly, there are provided five pieces of the sub-grooves 57.

In the case where the insert 51 of the fifth embodiment and the insert 61 of the sixth embodiment are arranged side by side along the outer periphery of the holder 11 in a circumferential direction, the main-groove 56 positioning of the insert (51, 61) is determined in a manner so as to insure that the range of passage of the main groove 56 of the insert 51 of the fifth embodiment is included in the range of passage of the first main cutting edge division 55A of the insert 61 of the sixth embodiment, and that the range of passage of the main groove 56 of the insert 61 of the sixth embodiment is included in the range of passage of the first main cutting edge division 55A of the insert 51 of the fifth embodiment.

Figure 24:
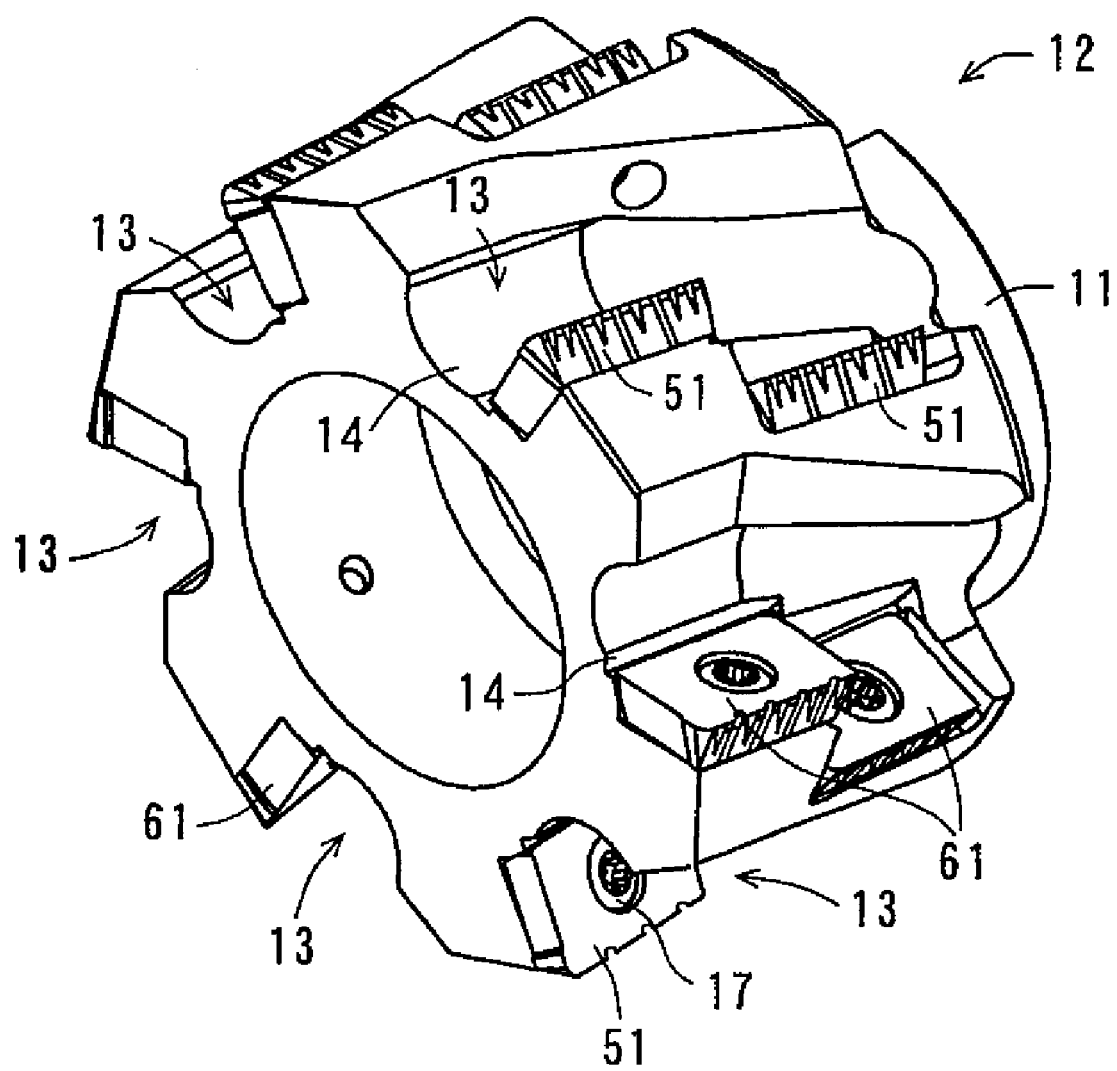
FIG. 24 is a perspective view showing the milling tool fitted with the inserts 51 and 61 of the invention.

FIG. 24 is a perspective view showing the milling tool 12 fitted with the inserts 51 and 61 of the invention. Herein, a plurality of chip pockets 13 are formed along the front end of the outer periphery of the holder 11. The insert (51, 61) is attached to the outer peripheral position inside the chip pocket 13. More specifically, the insert (51, 61) is so mounted that the rake face 53 points in the direction of rotation and the main cutting edge 55 faces outermost. The main cutting edge 55 is rotated together with the holder 11 to effect cutting.

In the case of using such a milling tool 12, in general, the holder 11 is subjected to a bending stress in the cutting. The bending stress is causative of an appreciable deflection. In order to avoid this, the holder 11 is designed to have a certain rigidity. However, during a cutting in reality, the magnitude of bending stress exerted on the holder 11 varies according to cutting conditions and so forth. Therefore, in the case where cutting is carried out under heavy load, the rigidity of the holder 11 may be insufficient, thus causing an appreciable deflection. As a result, chattering may be induced in the cutting. For example, in a heavy cutting in particular, because of its large depth of cut, there may arise a significant increase in cutting resistance and thus occurrence of chattering is more likely.

In view of the foregoing, in the milling tool 12 such as shown hereinabove, to achieve a cutting-resistance reduction, it has heretofore been widely practiced to use a combination of a plurality of inserts in each of which its relief face including a main cutting edge is divided into pieces by grooves. The groove has its one end reached the rake face of the insert and the other end reached the bottom surface thereof. That is, in such an insert, since a chip to be produced can be made smaller in width, it is possible to ensure chatter-free operation with lesser cutting resistance. However, if the number of grooves of conventional configuration is simply increased in an effort to render possible a heavy cutting that must be carried out under strict cutting conditions, the strength of the cutting edge portion obtained by dividing the cutting edge by the groove is decreased, which results in occurrence of problems such as chipping-off. After all, there is a limit to a cutting-resistance reduction.

As has already been described, in this embodiment, with the provision of the main groove 56 and the sub-groove 57, a decline in the cutting-edge strength can be suppressed with lesser cutting resistance. As a result, even in a heavy cutting or the like process with considerable depth of cut, chattering can be suppressed without causing chipping-off of the insert (51, 61).

In the case of using the insert 51 of the fifth embodiment shown in FIGS. 16 through 19 alone for a cutting, since the main cutting edge 55 is provided with the main grooves 56, part of a wall surface of a workpiece will inevitably be left unmachined following the completion of cutting. In order to avoid such an incompleteness in cutting which is ascribable to the main grooves 56, before effecting a cutting, as shown in FIG. 24, the inserts (51, 61) that differ from each other in the arrangement of the main grooves 65, for example, the insert 51 of the fifth embodiment and the insert 61 of the sixth embodiment, are arranged in an alternating manner on a common circumferential surface of the holder 11. In this way, even if part of the workpiece is left unmachined following the completion of a cutting effected by one of the inserts (51) owing to its grooves (56, 57), the main cutting edge 55 of the other insert (61) deals with this yet-to-be machined region. Accordingly, there will be little irregularity on the machined wall surface of the workpiece. In the case of using a combination of two types of inserts (51, 61) in that way, the inserts (51, 61) are made substantially identical in the width of the main groove 56 and in the distance (dimension) between the adjacent main grooves. Just like the third embodiment, in each of the insert 51 of the fifth embodiment and the insert 61 of the sixth embodiment, the main cutting edge division may be inclined in such a way that the distance to the bottom surface of the insert is gradually decreased with distance from the corner R cutting edge in the insert length direction.

Seventh Embodiment

Figure 25:
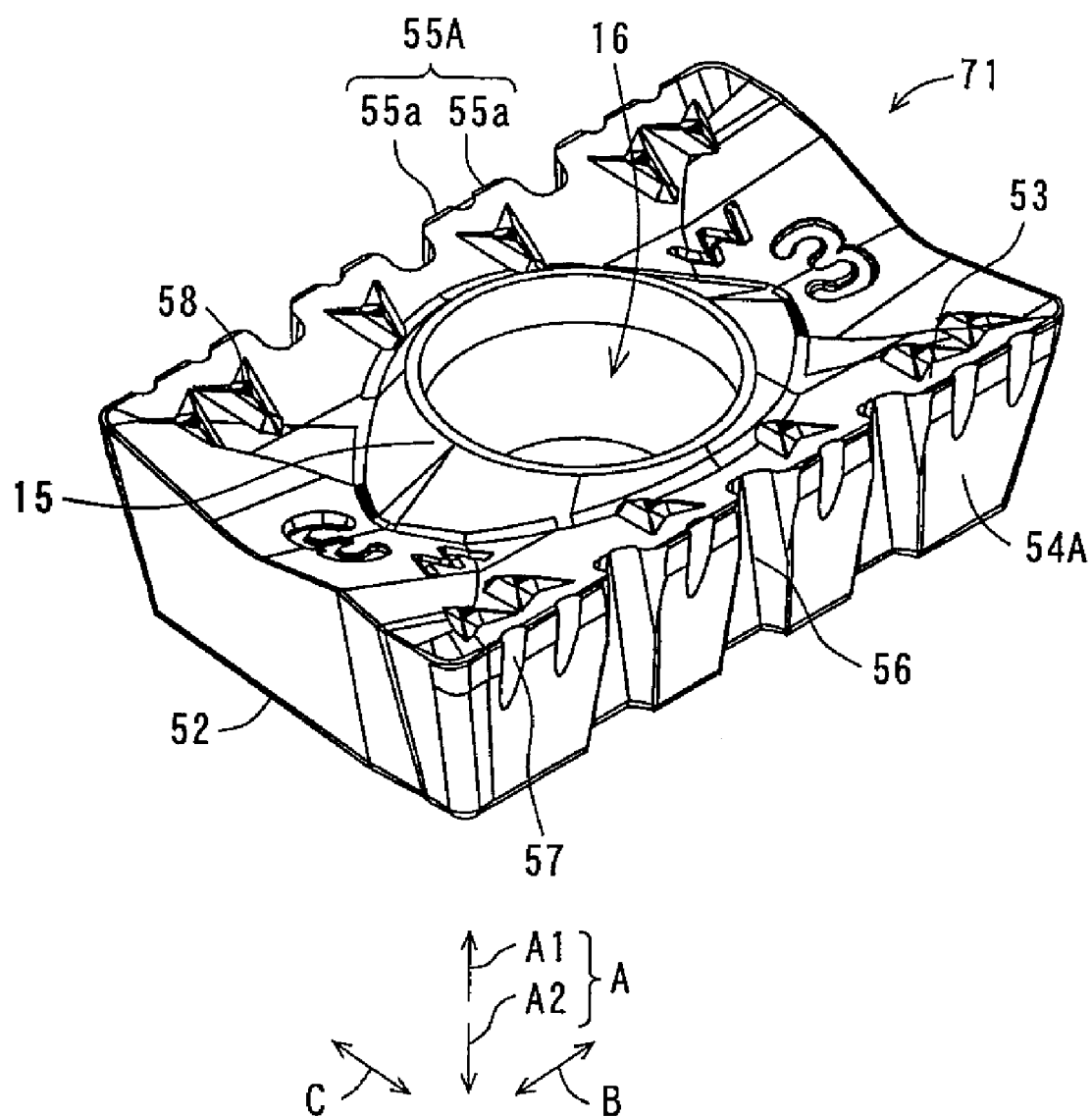
FIG. 25 is a general perspective view showing an insert 71 in accordance with a seventh embodiment of the invention.
Figure 26:
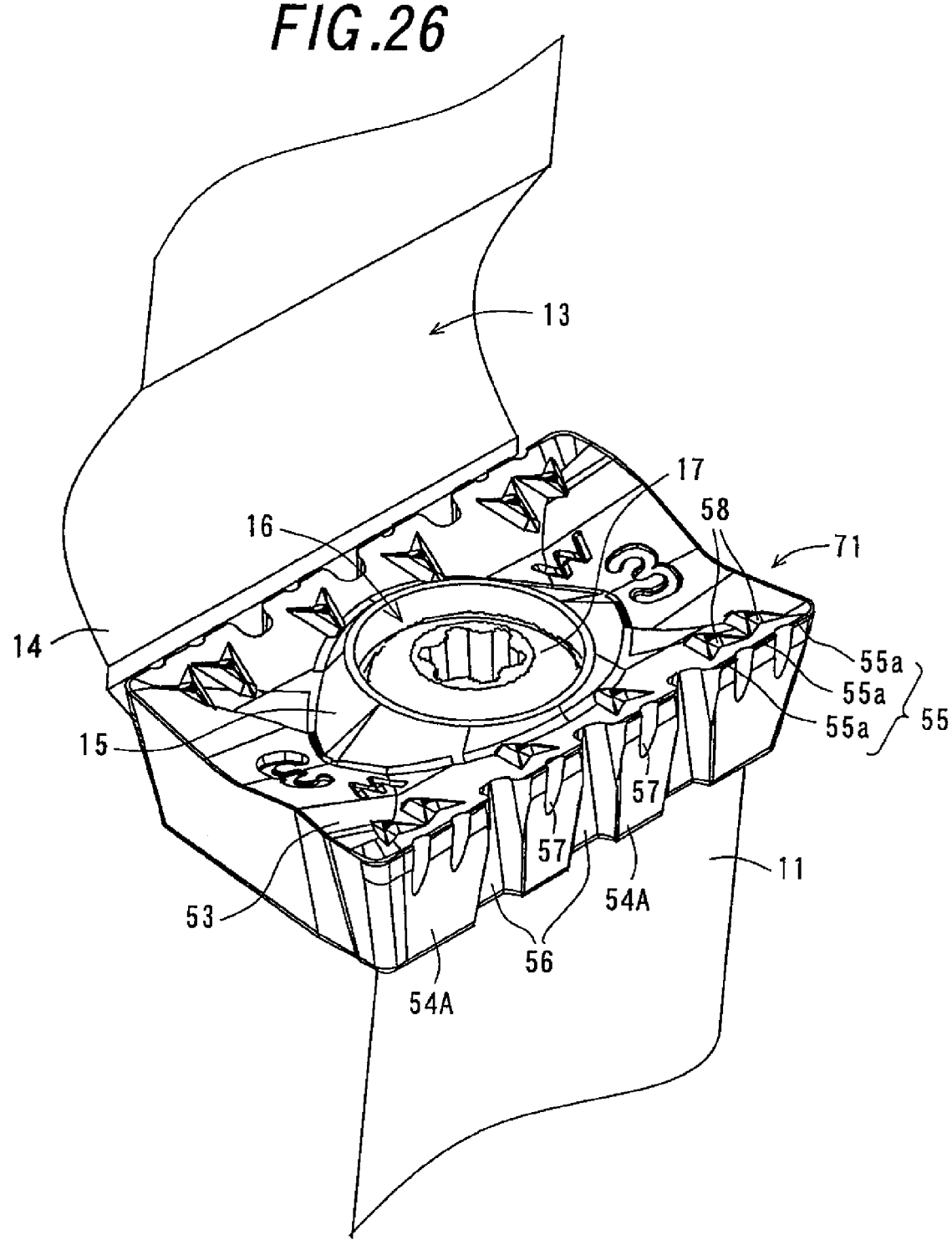
FIG. 26 is an enlarged perspective view showing the milling tool 12 of the invention fitted with the insert.
Figure 28:
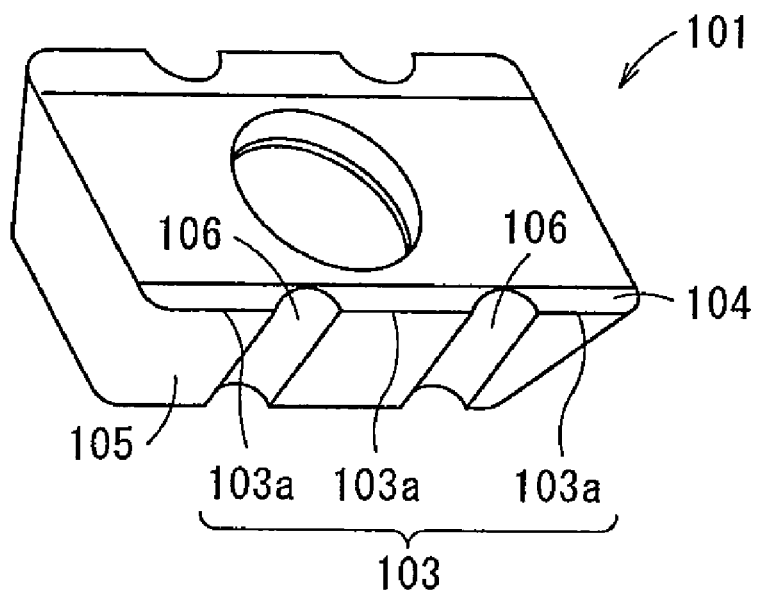
FIG. 28 is a perspective view showing a insert 101.
Figure 29:
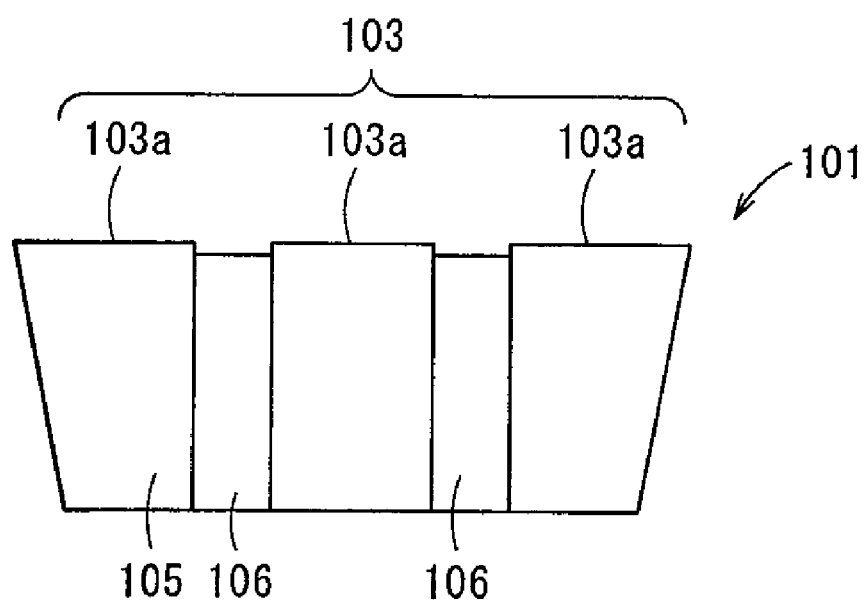
FIG. 29 is a side view showing the insert 101.
Figure 30:
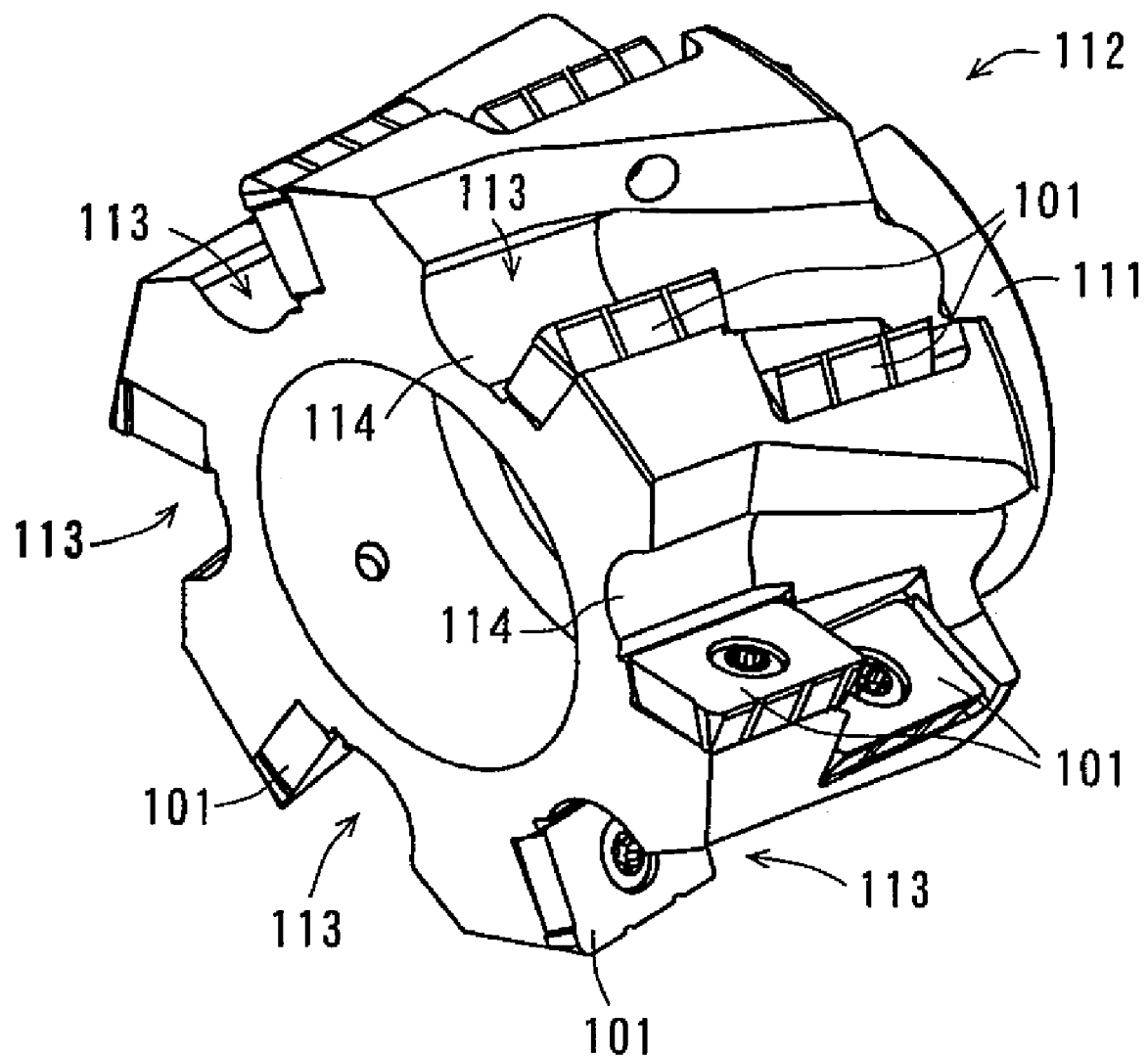
FIG. 30 is a perspective view showing a milling tool 112 fitted with the insert 101 shown in FIG. 28.

FIG. 25 is a general perspective view showing an insert 71 in accordance with a seventh embodiment of the invention. FIG. 26 is an enlarged perspective view showing the milling tool 12 of the invention fitted with the insert. The insert 71 of the seventh embodiment is designed in conformity with the insert 51 of the fifth embodiment, and therefore the components that play the same or corresponding roles as in the fifth embodiment will be identified with the same reference symbols, and overlapping descriptions will be omitted. The insert 71 of the seventh embodiment is provided with, in addition to the above-described constituent elements of the insert 51 of the fifth embodiment, projections 58 that are formed on the rake face 53 so as to adjoin their respective first main cutting edge divisions 55A. At least a single projection 58 is provided in correspondence with each of the first main cutting edge divisions 55A. The projection 58 is so formed as to protrude from the rake face 53 in the direction of thickness of the insert. More specifically, the projection 58 is so formed as to pair up with the first main cutting edge division 55A. The main cutting edge-sided part of the projection 58 is bifurcated to face the second main cutting edge divisions 55a obtained by dividing the first main cutting edge division 55A by the sub-groove 57.

Each of the bifurcations at the main cutting edge-sided part of the projection 58 is tapered; that is, so shaped that its width and height diminish gradually with approach toward its respective second main cutting edge division 55a. Herein, the height of the projection 58 refers to the dimension of the projection 58 with respect to the rake face 53 in the insert thickness direction A. Moreover, the width of the projection 58 refers to the dimension of the projection 58 in the insert length direction B. Further, the distance between the second main cutting edge division 55a and the projection 58 in the insert width direction C is so adjusted as to be shortest in the midportion of the second main cutting edge division 55a in the insert length direction. That is, the front end of the bifurcation is pointed to the midportion of the second main cutting edge division 55a in the insert length direction.

In this embodiment, a narrow chip produced by the action of the second main cutting edge division 55a is brought into contact with the projection 58 formed on the rake face 53, whereupon the chip is slightly deformed curvedly. Therefore, the holder wall 14 inside the chip pocket can be protected from a flaw caused by the chip. Moreover, when the narrow chip is brought into contact with the projection 58 formed on the rake face 53, its radius of curvature is decreased, and correspondingly the size of the chip is reduced. The small-sized chip in the chip pocket 13 is able to move smoothly out of the holder 11 thereby attaining enhanced chip evacuation. Accordingly, occurrence of problems such as packing of the chips in the chip pocket 13 and biting of the chips can be decreased, wherefore the insert 71 and the holder 11 can be used for a longer time. Note that, in a state in which the insert is mounted in the holder 11, the main groove 56 and the sub-groove 57 extend along a plane perpendicular to the axis of the holder and also extend in a direction circumferentially of the holder.

As shown in FIG. 24, in the case of performing a milling with use of the inserts of a plurality of types (51, 61) attached to the holder 11 in an alternating manner that differ in the positioning of the first main cutting edge divisions 55A, part of the machined wall surface of the workpiece is subjected to cutting by the main cutting edge divisions 55A of one of the two inserts, whereas the other part is subjected to cutting by the main cutting edge divisions 55A of both of the inserts. At this time, of the cross section of a chip to be produced, the midportion has the largest thickness, because it conforms to that part of the machined wall surface which undergoes cutting effected only by the main cutting edge divisions of one of the inserts. As exemplified in the seventh embodiment, with the provision of the projections 58 in the insert 71 to be attached to the holder 11, the aforementioned thickest cross-sectional part of the chip is brought into contact with the projection 58 thereby deforming curvedly, namely curling the produced chip in a selective and efficient manner.

The insert 71 of the seventh embodiment is constructed by forming the projections 58 in the insert 51 of the fifth embodiment. Likewise, it is also possible to add the projections 58 to the insert 61 of the sixth embodiment. It is thus preferable that all of the inserts to be attached to the holder 11 are each provided with projections. Regarding the provision of projections, it is essential only that one or more projections be formed in correspondence with each of the main cutting edge divisions 55a. The projection may also be designed in conformity with that of the insert 1 of the first embodiment or the insert 21 of the second embodiment.

Moreover, as shown in FIG. 26, an annular protuberance 15 is formed around the through hole 16 created centrally of the rake face 53. The provision of the protuberance 15 makes it possible to achieve the same effects as achieved in the insert 1 of the first embodiment.

FIG. 27 is a general perspective view showing an insert 71a of an example of a modified form of the insert of the seventh embodiment. In the insert 71 of the seventh embodiment, the projections are formed on the rake face 53 so as to adjoin their respective first main cutting edge divisions 55A. At least a single projection is provided in correspondence with each of the first main cutting edge division 55A. The projection is bifurcated to face the second main cutting edge divisions 55a.

On the other hand, as shown in FIG. 27, the insert 71a of modification example is provided with a plurality of projections 68 that are formed in correspondence with the individual second main cutting edge divisions 55a. The insert 71a, although it has the projections 68 of such an arrangement, is able to offer the same effects as achieved in the insert 71 of the seventh embodiment. That is, irrespective of the configuration of the projection on the side of the center of the rake face, a chip produced by the action of the second main cutting edge division 55a comes into collision with the projection properly to obtain the curling effect. It is preferable that the projection 68 is designed in conformity with the projection 6 of the insert 1 of the first embodiment. While the projection 6 of the first embodiment is disposed face to face with the main cutting edge division, the projection 68 of the insert 71a constituting a modified form of the seventh embodiment is disposed face to face with the second main cutting edge division 55a. Otherwise, the projection 68 may be constructed in the same manner as in the insert 1 of the first embodiment. The provision of the projection 68 makes it possible to achieve the same effects as achieved in the insert 1 of the first embodiment.

Although FIGS. 1 through 27 illustrate the insert whose main body has substantially a rectangular plate shape or a parallelogram plate shape, as another embodiment of the invention, it is possible to adopt an insert whose main body has substantially a polygonal plate shape or a disk shape so long as it is adaptable to the shape of the holder. In this case, the same effects as achieved in the preceding embodiment can be achieved. While particular embodiments of the invention have been shown and described, it is needless to say that it is not so limited but is susceptible of various changes and modifications without departing from the spirit and scope of the invention. For example, in the embodiments, the insert is designed to have a 180° rotationally symmetrical shape. However, the insert may also be designed to have a main cutting edge only at its one edge in the insert width direction. Moreover, the conditions to be fulfilled by the insert such as the inclination of the main cutting edge division, the shape of the groove, and the shape of the projection can be selected arbitrarily without being limited to those suggested in the embodiments. It is also possible to utilize the features of the embodiments in combination. Further, the insert embodying the invention may be used for purposes other than a heavy cutting.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention as set forth in claim 1, a narrow chip produced by the action of the main cutting edge division is brought into contact with the projection, whereupon the chip is curvedly deformed while its radius of curvature is decreased. Being made smaller in radius of curvature, the chip undergoes rupture before making contact with the holder wall formed in the holder, and then moves out of the chip pocket. This helps protect the holder wall from damage resulting from a collision with the chip. Moreover, when the chip is brought into contact with the projection, its radius of curvature is decreased and its size is reduced correspondingly. The small-sized chip in the chip pocket is able to move smoothly out of the holder thereby attaining enhanced chip evacuation. Accordingly, occurrence of problems such as packing of the chips in the chip pocket and biting of the chips can be decreased, wherefore the insert and the holder can be used for a longer time.

According to the invention as set forth in claim 2, the projection is so shaped that its height, namely its dimension with respect to the rake face, increases gradually with distance from the main cutting edge division. Accordingly, the cut ship is guided by the projection in a direction away from the rake face and is then curvedly deformed while its radius of curvature is decreased. In the invention, since the projection is so shaped that its height diminishes gradually with approach toward the main cutting edge division, it is possible to ensure smooth contact between the chip and the projection with a smaller impactive force, and thereby avoid an increase in cutting resistance.

According to the invention as set forth in claim 3, the projection is so shaped that its width increases gradually with distance from the main cutting edge division. With such a broad configuration, the projection exhibits higher strength and is thus avoided being broken off from the insert main body at the time of collision with the chip. This renders possible the long-term use of the insert.

According to the invention as set forth in claim 4, the chip runs along the rake face in a direction away from the main cutting edge division to reach the projection. Upon abutment with the projection, the chip is guided so as to move away from the rake face in the direction of thickness of the insert. At this time, the chip is curvedly deformed while its radius of curvature is decreased. In the invention, the main cutting edge-sided part of the projection is tapered; that is, so shaped that its width and height diminish gradually with approach toward its respective main cutting edge division. That is, the projection is so shaped that its height, namely its dimension with respect to the rake face, increases gradually with distance from the main cutting edge division. This makes it possible to ensure smooth contact between the chip and the projection, in other words reduce the impactive force exerted at the time of collision between the chip and the projection, and thereby avoid an increase in cutting resistance. Moreover, the projection is free from a decline in strength because of its sufficient height and width, and is thus avoided being broken off from the insert main body at the time of guiding the chip in a manner so as to insure that the chip is curvedly deformed. This renders possible the long-term use of the insert.

According to the invention as set forth in claim 5, the intersecting ridge of the projection is so shaped that the distance to the rake face in the thicknesswise direction, namely the height of the projection, is increased gradually with distance from the main cutting edge division. Upon collision with the intersecting ridge of the projection, the chip is moved along the intersecting ridge of the projection and undergoes curved deformation. In this way, by providing, in the projection, the intersecting ridge against which the chip is abutted, it is possible to minimize the area of contact between the chip and the projection, wherefore the chip can be moved more smoothly. This leads to a further reduction in cutting resistance resulting from curved deformation of the chip. In order to achieve a cutting-resistance reduction, the projection should preferably be so designed that the intersecting ridge extends along the perpendicular bisector of the corresponding main cutting edge division and the height diminishes gradually with approach toward the main cutting edge division.

According to the invention as set forth in claim 6, the chip is moved in a direction substantially perpendicular to the main cutting edge division. In the invention, since the projection is so disposed as to extend in a direction substantially perpendicular to the main cutting edge division, it is possible to reduce the cutting resistance caused by the projection upon contact with the chip moving on the rake face.

According to the invention as set forth in claim 7, the projection is so disposed as to be pointed to the lengthwise mid portion of the main cutting edge division. The chip produced by the action of the main cutting edge division has substantially the same width as that of the main cutting edge division. In this case, the projection makes contact with the widthwise midportion of the chip. Accordingly, the chip can be guided by the projection in a direction substantially perpendicular to the main cutting edge division without wobbling from side to side.

According to the invention as set forth in claim 8, the projection is so disposed as to lie in the substantially perpendicular bisector of the main cutting edge division. In this case, the projection is so disposed as to extend in a direction substantially perpendicular to the main cutting edge division while being pointed to the lengthwise midportion of the main cutting edge division. This makes it possible to reduce the cutting resistance caused by the projection upon contact with the chip moving in a direction substantially perpendicular to the main cutting edge division. Moreover, since the projection makes contact with the widthwise midportion of the chip, it follows that the chip can be moved in a direction substantially perpendicular to the main cutting edge division without wobbling from side to side.

According to the invention as set forth in claim 9, around the through hole is formed the protuberance. Thereby, the chip can be curvedly deformed properly upon contact with the protuberance even under the condition that the projection fails to produce the effect of curvedly deforming the chip satisfactorily. Moreover, the head of a screw member threadedly engaged with the through hole is hidden behind the protuberance thereby decreasing contact between the chip and the screw head of the screw member. In this case, the head of the screw member is protected from abrasion, and the screw head is inhibited from disturbing the concave of the chip.

According to the invention as set forth in claim 10, the projection is so formed as to pair up with the main cutting edge division. That is, a single projection is assigned to each of the main cutting edge divisions. In the invention, the chip produced by the action of the main cutting edge division is guidedly abutted against only a single projection. In this case, in contrast to the case where the chip is guidedly abutted against a plurality of projections all at once, a cutting-resistance reduction is even more successful. Moreover, even though the projection is worn away by friction with the chip, or there arises some deviation from the direction in which the chip is produced, the chip is allowed to make contact with the ridge portion of a single, corresponding projection.

According to the invention as set forth in claim 11, the chip produced by the action of the main cutting edge division other than the corner R cutting edge-sided main cutting edge division is moved in a direction substantially perpendicular to the main cutting edge division. In the invention, the projection formed so as to pair up with the main cutting edge division other than the corner R cutting edge-sided main cutting edge division is so disposed as to extend in a direction substantially perpendicular to the main cutting edge division. This makes it possible to reduce the cutting resistance caused by the projection upon contact with the chip moving in a direction substantially perpendicular to the main cutting edge division. Moreover, for example, since the projection is so disposed as to be pointed to the lengthwise midportion of its respective main cutting edge division, it is possible for the chip to move in a direction substantially perpendicular to the main cutting edge division without wobbling from side to side. Accordingly, a plurality of chips are inhibited from making contact with one another, in consequence whereof there results decreasing of packing of chips in the chip pocket.

According to the invention as set forth in claim 12, the main cutting edge division near to the corner of the rake face connects to the corner R cutting edge. Correspondingly, the chip produced by the action of the corner R cutting edge-sided main cutting edge division merges with the chip produced by the action of the corner R cutting edge in the shape of circular arc. The circularly arcuate chip is moved on the rake face at a predetermined inclination angle relative to the main cutting edge division. In the invention, the projection formed so as to pair up with the corner R cutting edge-sided main cutting edge division is so shaped that its width and height diminish gradually with approach toward the corner R cutting edge. In this case, the chip produced by the action of the corner R cutting edge as well as the main cutting edge division merging therewith can be smoothly abutted against the projection with lesser cutting resistance. Moreover, the chip produced by the action of the corner R cutting edge as well as the main cutting edge division merging therewith can be curvedly deformed smoothly.

According to the invention as set forth in claim 13, the projection formed so as to pair up with the corner R cutting edge-sided main cutting edge division is so disposed as to extend along a virtual straight line such that an inclination angle with respect to the corner-sided main cutting edge division falls in a range of from 60° to 85°. This makes it possible for the chip produced by the action of the corner R cutting edge to deform curvedly more reliably while reducing the projection-induced cutting resistance. For example, if the inclination angle is less than 60°, the chips tend to cause clogging, which could lead to an undesired increase in cutting resistance. Furthermore, if the inclination angle is less than 60°, the chip portion produced by the action of the main cutting edge division connecting to the corner R cutting edge induces excessive cutting resistance. On the other hand, if the inclination angle is greater than 85°, the chip cannot be difficult to be curved properly, which could lead not only to a failure of protecting the holder wall from abrasion but also to a decline in chip evacuation due to the size of the chip being oversize. There is also a possibility of occurrence of chipping-off of the cutting edge caused by biting of the chip. Furthermore, if the inclination angle is greater than 85°, the chip portion produced by the action of the corner R cutting edge induces excessive cutting resistance.

In this regard, in the invention, the inclination angle is set to fall in a range of from 60° to 85°. Accordingly, without any problem such as stated above, the chip produced by the action of the corner R cutting edge as well as the main cutting edge division merging therewith can be curvedly deformed more reliably with lesser cutting resistance.

According to the invention as set forth in claim 14, one or more projections are formed in correspondence with each of the main cutting edge divisions. In this case, the chip is abutted against a single or a plurality of projections and it can thereupon be curvedly deformed. Since there are provided a plurality of projections against which the chip is abutted thereby to cause curved deformation, even if the chip is large in cross-sectional area and is high in rigidity, an impactive force exerted by the chip can be distributed among a plurality of projections. This helps decrease chipping-off of the projection, wherefore the chip can be curvedly deformed satisfactorily. For example, in the case where a plurality of main cutting edge divisions are classified into two groups: long length of main cutting edge divisions and short length of main cutting edge divisions, by setting the number of the projection corresponding to the long main cutting edge division to be larger than the number of the projection corresponding to the short main cutting edge division, it is possible for the chip of wider width produced by the action of the long main cutting edge division to deform curvedly more reliably. Moreover, the projection corresponding to the long main cutting edge division can be avoided being chipped off due to a collision with the chip of wider width.

According to the invention as set forth in claim 15, the chip produced by the action of the main cutting edge division other than the corner R cutting edge-sided main cutting edge division is moved in a direction substantially perpendicular to the corresponding main cutting edge division. In the invention, the projection corresponding to the main cutting edge division other than the corner R cutting edge-sided main cutting edge division is so disposed as to extend in a direction substantially perpendicular to the main cutting edge division. This makes it possible to reduce the cutting resistance caused by the projection upon contact with the chip moving in a direction substantially perpendicular to the main cutting edge division. Moreover, for example, since the projection is so disposed as to be pointed to the lengthwise midportion of its respective main cutting edge division, it is possible for the chip to move in a direction substantially perpendicular to the main cutting edge division without wobbling from side to side. Accordingly, a plurality of chips are inhibited from making contact with one another, in consequence whereof there results decreasing of packing of chips in the chip pocket.

According to the invention as set forth in claim 16, the corner R cutting edge-sided main cutting edge division connects to the corner R cutting edge. Correspondingly, the chip produced by the action of the corner R cutting edge-sided main cutting edge division connects to the chip produced by the action of the corner R cutting edge in the shape of circular arc. The circularly arcuate chip is moved on the rake face at a predetermined inclination angle relative to the main cutting edge division. In the invention, of the projections corresponding to the corner R cutting edge-sided main cutting edge division, the one arranged nearest to the corner R cutting edge is so shaped that its width and height diminish gradually with approach toward the corner R cutting edge. In this case, the chip produced by the action of the corner R cutting edge as well as the main cutting edge division connecting can be smoothly abutted against the projection arranged nearest to the corner R cutting edge with lesser cutting resistance. Moreover, the chip produced by the action of the corner R cutting edge as well as the main cutting edge division connecting can be curvedly deformed smoothly. According to the invention as set forth in claim 17, the projection arranged nearest to the corner R cutting edge is so disposed as to extend along a virtual straight line such that an inclination angle with respect to the corner-sided main cutting edge division falls in a range of from 60° to 85°. This makes it possible for the chip produced by the action of the corner R cutting edge to deform curvedly more reliably while reducing the projection-induced cutting resistance. For example, if the inclination angle is less than 60°, the chips tend to cause clogging, which could lead to an undesired increase in cutting resistance. Furthermore, if the inclination angle is less than 60°, the chip portion produced by the action of the main cutting edge division merging with the corner R cutting edge induces excessive cutting resistance. On the other hand, if the inclination angle is greater than 85°, the chip cannot be difficult to be curved properly, which could lead not only to a failure of protecting the holder wall from abrasion but also to a decline in chip evacuation due to the size of the chip being oversize. There is also a possibility of occurrence of chipping-off of the cutting edge caused by biting of the chip. Furthermore, if the inclination angle is greater than 85°, the chip portion produced by the action of the corner R cutting edge induces excessive cutting resistance. In the invention, the inclination angle is set to fall in a range of from 60° to 85°. Accordingly, the chip produced by the action of the corner R cutting edge can be curvedly deformed more reliably without any problem such as stated above.

According to the invention as set forth in claim 18, the chip produced by the action of the main cutting edge division other than the corner R cutting edge-sided main cutting edge division is moved in a direction substantially perpendicular to the corresponding main cutting edge division. In the invention, of a plurality of projections corresponding to the corner R cutting edge-sided main cutting edge division, the one other than the projection arranged nearest to the corner R cutting edge is so disposed as to extend in a direction substantially perpendicular to the main cutting edge division. In this case, the chip moving in direction substantially perpendicular to the main cutting edge division can be smoothly abutted against the projection with lesser projection-induced cutting resistance.

According to the invention as set forth in claim 19, the first main cutting edge division, which is obtained by dividing the main cutting edge by the main grooves, is divided into a plurality of second main cutting edge divisions by the sub-groove. The chip produced by the action thereof has a narrower width because of the shorter length of the second main cutting edge division. That is, the chip is made lighter in weight and is thus able to get out of the chip pocket formed in the holder readily, which leads to enhanced chip evacuation. Accordingly, occurrence of problems such as packing of the chips in the chip pocket and biting of the chips can be decreased, wherefore the insert and the holder can be used for a longer time. Moreover, being lighter in weight, the chip evacuated to the outside from the chip pocket can be moved without being piled up around a workpiece. This helps protect the workpiece from a flaw caused by the chip.

Moreover, the first main cutting edge division is further divided into pieces by the sub-groove. In this case, the cutting resistance exerted on the main cutting edge can be reduced, and also, since the sub-groove is made smaller than the main groove, a significant decline in the cutting-edge strength as observed in the case of forming the main grooves can be suppressed. That is, by virtue of the coexistence of the main groove and the sub-groove, a decline in the cutting-edge strength can be suppressed, and also a cutting-resistance reduction can be achieved in accompaniment with a decrease in the area of contact between the insert and the workpiece. This makes it possible to suppress chattering in the cutting, as well as to improve the chip evacuation, wherefore a heavy cutting that must be carried out under strict cutting conditions can be accomplished.

According to the invention as set forth in claim 20, the sub-groove is made smaller in width than the main groove. That is, two types of grooves of different width can be formed. With the provision of the broad main groove, the proportion of the first main cutting edge divisions to the insert as a whole can be decreased. This renders possible chatter-free operation with lesser cutting resistance. On the other hand, with the provision of the narrow sub-groove, a significant decline in cutting-edge strength as observed in an insert having a plurality of broad main grooves, and ensuing chipping-off, breakage, and the like damage to the cutting edge can be decreased. Accordingly, a decline in the strength of the first main cutting edge division can be avoided while ensuring the effect of breaking the chip into smaller and smaller pieces. In this way, the insert itself enjoys a longer life without suffering from chipping-off of the main cutting edge. Thus, the insert embodying the invention succeeds in achieving a cutting-resistance reduction while suppressing a cutting-edge strength decline and improving the chip evacuation, and is thus suitable for use in a heavy cutting.

According to the invention as set forth in claim 21, the length of the sub-groove is made smaller than the thickness of the insert main body. The relief face located between the two main grooves is divided into a plurality of portions by the sub-groove. A plurality of relief face divisions connect to each other at their bottom surface-sided regions. In this way, the relief face division sandwiched between the two main grooves or the relief face division sandwiched between the main groove and the sub-groove can be protected from chipping-off, wherefore the cutting-edge strength can be increased.

According to the invention as set forth in claim 22, the sub-groove is made smaller in depth than the main groove. This is desirable from the standpoint of striking an excellent balance between a reduction in cutting resistance and maintaining of cutting edge strength thereby to achieve a heavy cutting with significant depth of cut. In this way, the rake face portion sandwiched between the two main grooves or the rake face portion sandwiched between the main groove and the sub-groove can be protected from chipping-off, wherefore the cutting-edge strength can be increased.

According to the invention as set forth in claim 23, the sub-groove is so disposed as to divide the first main cutting edge division into substantially equal portions. In this case, the application of load can be distributed equally among the second main cutting edge divisions obtained by dividing the first main cutting edge division by the sub-groove. This makes it possible to achieve a cutting-resistance reduction while suppressing a decline in cutting-edge strength.

According to the invention as set forth in claim 24, the narrow chip produced by the action of the second main cutting edge division is brought into contact with the projection formed on the rake face, whereupon the chip is slightly deformed curvedly. Therefore, the holder wall inside the chip pocket can be protected from a flaw caused by the chip. Moreover, when the narrow chip is brought into contact with the projection formed on the rake face, its radius of curvature is decreased, and the size of the chip is reduced correspondingly. The small-sized chip in the chip pocket is able to move smoothly out of the holder thereby attaining enhanced chip evacuation. Accordingly, occurrence of problems such as packing of the chips in the chip pocket and biting of the chips can be decreased, wherefore the throwaway insert and the holder can be used for a longer time.

According to the invention as set forth in claim 25, around the through hole is formed the protuberance. Thereby, the chip can be curled properly upon contact with the protuberance even under the condition that the projection fails to produce the effect of giving curl to the chip satisfactorily. Moreover, the head of a screw threadedly engaged with the through hole is hidden behind the protuberance thereby decreasing contact between the chip and the screw head. Accordingly, the head of the screw is protected from abrasion.

According to the invention as set forth in claim 26, by attaching the throwaway insert to the holder, it is possible to realize a milling tool having a positive axial rake. In this construction, since enhanced biteability on the workpiece can be attained, it is possible to reduce the cutting resistance exerted by the workpiece. Accordingly, even in the case of performing a heavy cutting, or a so-called a rough cutting in which the depth of cut at a single cutting operation is even more significant, there is no increase in cutting resistance, wherefore chattering can be suppressed more reliably during the cutting.

Moreover, in the invention, the main cutting edge division is inclined relative to the bottom surface of the insert thereby imparting an axial rake angle. This eliminates the need to bring the bottom surface of the insert seated in the holder into sharp inclination with reference to the rotation axis of the holder in a direction circumferentially of the holder, wherefore several advantages are gained: an undesired reduction in the wall thickness of the holder can be avoided; the holder is free from a decline in rigidity; the life of the milling tool can be prolonged; and the depth of cut at a single cutting operation can be increased.

According to the invention as set forth in claim 27, in the holder are mounted a plurality of throwaway inserts such as described hereinabove capable of breaking the chip into smaller pieces. In this construction, enhanced chip evacuation can be attained. In particular, even in the case of performing a heavy cutting in which the depth of cut at a single cutting operation is high, the chip produced during cutting can be evacuated from the chip pocket to outside the holder smoothly, wherefore the accumulation of the chips can be decreased in the chip pocket. Accordingly, the insert and the holder enjoy a longer life with lesser chipping-off and abrasion. That is, the number of replacement of these components can be reduced thereby attaining enhanced production efficiency.

The invention claimed is:

1. A throwaway insert formed in substantially a plate shape comprising:
    a rake face on one thicknesswise surface;
    a relief face on a side surface;
    a main cutting edge formed along a ridge representing an intersection of the rake face and the relief face, which is divided into a plurality of main cutting edge divisions by a plurality of grooves; and
    a plurality of projections, wherein each projection protrudes from the rake face in correspondence with each of the main cutting edge divisions, wherein each projection is in an area between the two grooves nearest the main cutting edge division to which the projection corresponds.

2. The throwaway insert of claim 1, wherein a main cutting edge-sided part of the projection is so shaped that its height diminishes gradually with approach toward the corresponding main cutting edge division.

3. The throwaway insert of claim 1, wherein a main cutting edge-sided part of the projection is so shaped that its width diminishes gradually with approach toward the corresponding main cutting edge division.

4. The throwaway insert of claim 1, wherein a main cutting edge-sided part of the projection is formed into such a tapered shape that its width and height diminish gradually with approach toward the corresponding main cutting edge division.

5. The throwaway insert of claim 1, wherein a main cutting edge-sided part of the projection has two projection side surfaces, a distance between which is decreased gradually in an upward direction, and an intersecting ridge formed at an intersection of the two projection side surfaces is so shaped that a distance to the rake face is decreased gradually with approach toward the corresponding main cutting edge division.

6. The throwaway insert of claim 1, wherein at least one of the projections is so disposed as to extend in a direction substantially perpendicular to the main cutting edge division.

7. The throwaway insert of claim 1, wherein at least one of the projections is pointed to a midportion of the main cutting edge division.

8. The throwaway insert of claim 1, wherein the projection is so disposed as to lie in a substantially perpendicular bisector of the main cutting edge division.

9. The throwaway insert of claim 1, wherein a through hole is formed substantially centrally of the rake face so as to pass through in the direction of thickness of the insert, and an annular protuberance is formed around the through hole.

10. The throwaway insert of claim 1, wherein the projection is so formed as to pair up with the main cutting edge division.

11. The throwaway insert of claim 10, wherein at one corner of the rake face is formed a corner R cutting edge which connects to a corner-sided main cutting edge division located near to the corner, and the projection formed so as to pair up with the main cutting edge division other than the corner R cutting edge-sided main cutting edge division is so disposed as to extend in a direction substantially perpendicular to the main cutting edge division.

12. The throwaway insert of claim 10, wherein at one corner of the rake face is formed a corner R cutting edge which connects to a corner-sided main cutting edge division located near to the corner, and the projection formed so as to pair up with the corner R cutting edge-sided main cutting edge division is so shaped that its width and height diminish gradually with approach toward the corner R cutting edge.

13. The throwaway insert of claim 12, wherein the projection formed so as to pair up with the corner R cutting edge-sided main cutting edge division is so disposed as to extend along a virtual straight line such that an inclination angle with respect to the corner-sided main cutting edge division falls in a range of from 60° to 85°.

14. The throwaway insert of claim 1, wherein at one corner of the rake face is formed a corner R cutting edge which connects to a corner-sided main cutting edge division located near to the corner, and the projection corresponding to the main cutting edge division other than the corner R cutting edge-sided main cutting edge division is so disposed as to extend in a direction substantially perpendicular to the main cutting edge division.

15. The throwaway insert of claim 1, wherein at one corner of the rake face is formed a corner R cutting edge which connects to a corner-sided main cutting edge division located near to the corner, projections are formed in correspondence with the corner R cutting edge-sided main cutting edge division, and, of these projections, the one disposed nearest to the corner R cutting edge is so shaped that its width and height diminish gradually with approach toward the corner R cutting edge.

16. The throwaway insert of claim 15, wherein the projection disposed nearest to the corner R cutting edge is so disposed as to extend along a virtual straight line such that an inclination angle with respect to the corner-sided main cutting edge division falls in a range of from 60° to 85°.

17. The throwaway insert of claim 15, wherein at one corner of the rake face is formed a corner R cutting edge which connects to a corner-sided main cutting edge division located near to the corner, projections are formed in correspondence with the corner R cutting edge-sided main cutting edge division, and, of these projections, the one other than the projection disposed nearest to the corner R cutting edge is so disposed as to extend in a direction substantially perpendicular to the main cutting edge division.

18. A throwaway insert comprising:
a rake face formed on one thicknesswise surface of a main body formed into a substantially plate shape;
a bottom surface formed on another thicknesswise surface of the main body;
a relief face formed on a side surface of the main body;
a main cutting edge formed along a ridge representing an intersection of the rake face and the relief face; and
a main groove formed on the relief face, which has its one end reached the rake face and the other end reached the bottom surface,
wherein the main cutting edge and the relief face are divided into a plurality of first main cutting edge divisions and a plurality of relief face divisions, respectively, by the main groove,
and wherein the first main cutting edge division is divided into a plurality of second main cutting edge divisions by a sub-groove which is formed on the relief face division abreast of the main groove, one end of the sub-groove being reached the rake face.

19. The throwaway insert of claim 18, wherein the sub-groove is made smaller in width than the main groove.

20. The throwaway insert of claim 18, wherein the length of the sub-groove is made smaller than the thickness of the main body.

21. The throwaway insert of claim 18, wherein the sub-groove is made smaller in depth than the main groove.

22. The throwaway insert of claim 18, wherein the sub-groove is so disposed as to divide the first main cutting edge division into substantially equal portions.

23. The throwaway insert of claim 18, wherein the rake face has, in its several positions each facing the second main cutting edge division, at least one or more projections corresponding to the second main cutting edge division.

24. The throwaway insert of claim 18, wherein a through hole is formed centrally of the rake face so as to pass through in the direction of thickness of the insert, and that an annular protuberance is formed around the through hole.

25. The throwaway insert of claim 1, wherein at one corner of the rake face is formed a corner R cutting edge which connects to a corner-sided main cutting edge division located near to the corner, a bottom surface positioned opposite the rake face is placed in abutment with a holder, and the main cutting edge division is gradually inclined in a direction away from the bottom surface with approach toward the corner R cutting edge.

26. A milling tool equipped with the throwaway insert of claim 1 and a holder to which are attached a plurality of the throwaway inserts.

27. The throwaway insert of claim 18, wherein at one corner of the rake face is formed a corner R cutting edge which connects to a corner-sided main cutting edge division located near to the corner, a bottom surface positioned opposite the rake face is placed in abutment with a holder, and the main cutting edge division is gradually inclined in a direction away from the bottom surface with approach toward the corner R cutting edge.

28. A milling tool equipped with the throwaway insert of claim 18 and a holder to which are attached a plurality of the throwaway inserts.

29. The throwaway insert of claim 1,
wherein the plurality of grooves are spaced from each other in the lengthwise direction,
wherein each grooves has a depth in the widthwise direction, and
wherein a shortest distance between each projection and the main cutting edge division to which the projection corresponds is greater than the depth of the grooves nearest the main cutting edge divisions to which the projection corresponds.

* * * * *